United States Patent
Wu

(10) Patent No.: US 12,289,784 B2
(45) Date of Patent: Apr. 29, 2025

(54) MANAGING A CONDITIONAL CONFIGURATION UPON ADDITION OR RELEASE OF A BEARER

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 390 days.

(21) Appl. No.: 17/793,617

(22) PCT Filed: Jan. 4, 2021

(86) PCT No.: PCT/US2021/012034
§ 371 (c)(1),
(2) Date: Jul. 18, 2022

(87) PCT Pub. No.: WO2021/162802
PCT Pub. Date: Aug. 19, 2021

(65) Prior Publication Data
US 2023/0049140 A1   Feb. 16, 2023

Related U.S. Application Data

(60) Provisional application No. 62/975,902, filed on Feb. 13, 2020.

(51) Int. Cl.
*H04W 76/19* (2018.01)
*H04W 76/34* (2018.01)
*H04W 36/36* (2009.01)

(52) U.S. Cl.
CPC ........... *H04W 76/19* (2018.02); *H04W 76/34* (2018.02); *H04W 36/362* (2023.05)

(58) Field of Classification Search
CPC ... H04W 76/19; H04W 76/34; H04W 36/362; H04W 76/15
USPC ........................................................ 455/437
See application file for complete search history.

(56) References Cited

U.S. PATENT DOCUMENTS

2018/0279193 A1   9/2018 Park et al.
2020/0077314 A1*  3/2020 Hwang .................. H04W 76/27
(Continued)

FOREIGN PATENT DOCUMENTS

CN   107925931 A   4/2018
CN   108668284 A   10/2018
(Continued)

OTHER PUBLICATIONS

"3rd Generation Partnership Project; Technical Specification Group Radio Access Network; Evolved Universal Terrestrial Radio Access (E-UTRA) and NR; Multi-Connectivity; Stage 2 (Release 16)," 3GPP Draft (2020).
(Continued)

*Primary Examiner* — Don N Vo
(74) *Attorney, Agent, or Firm* — MARSHALL, GERSTEIN & BORUN LLP

(57) ABSTRACT

To manage configuration, a UE receives, by processing hardware and from a radio access network (RAN), conditional configuration information including (i) a conditional configuration related to a base station operating in the RAN, and (ii) a condition to be satisfied before the UE applies the configuration (702). The UE receives, by the processing hardware and from the RAN, a message including an indication that the UE is to add, modify, or release a radio bearer (RB) (704), and determines, by the processing hardware, to ignore the conditional configuration in response to receiving the message (706).

21 Claims, 27 Drawing Sheets

(56) References Cited

U.S. PATENT DOCUMENTS

| | | | |
|---|---|---|---|
| 2021/0105690 A1 | 4/2021 | Wu et al. | |
| 2022/0038975 A1* | 2/2022 | Da Silva | H04W 36/08 |
| 2022/0295366 A1* | 9/2022 | Teyeb | H04W 36/00692 |
| 2023/0007553 A1* | 1/2023 | Rugeland | H04W 36/00837 |
| 2023/0354065 A1* | 11/2023 | Zhang | H04W 76/20 |
| 2023/0388864 A1* | 11/2023 | Jang | H04W 72/1268 |

FOREIGN PATENT DOCUMENTS

| | | |
|---|---|---|
| CN | 110622559 A | 12/2019 |
| KR | 20190143782 A | 12/2019 |
| WO | WO-2018175721 A1 | 9/2018 |
| WO | WO-2019024115 A1 | 2/2019 |
| WO | WO-2019245329 A1 | 12/2019 |
| WO | WO-2020015586 A1 | 1/2020 |

OTHER PUBLICATIONS

"3rd Generation Partnership Project; Technical Specification Group Radio Access Network; NG-RAN; E1 Application Protocol (E1AP) (Release 16)," 3GPP Draft (2020).

"3rd Generation Partnership Project; Technical Specification Group Radio Access Network; NG-RAN; NG Application Protocol (NGAP) (Release 16)," 3GPP Draft (2020).

CATT (Rapporteur), "Report on Email Discussion [107b#52] [NR MobE] Open Issues Conditional PSCell Addition/Change (CATT)," 3GPP Draft (2019).

CATT (Rapporteur), "Report on Offline Discussion [108] Agreeable Proposals on Conditional PSCell Addition/Change (CATT)," 3GPP Draft (2019).

Ericsson et al., "Conditional PSCell Addition/Change," 3GPP Draft (2019).

Ericsson, "TP for 38.331 on CHO," 3GPP Draft (2019).

Intel Corporation, "NR Mobility Enhancements," 3GPP Draft (2019).

International Search Report and Written Opinion for Application No. PCT/US2021/012034, dated Apr. 26, 2021.

Oppo, "CHO Configuration Handling Upon Source Configuration Update," 3GPP Draft (2019).

Spreadtrum Communications, "Remaining Issues for Conditional PSCell Change," 3GPP Draft (2019).

ZTE Corporation et al., "Discussion on Conditional PSCell Addition/Change," 3GPP Draft (2019).

ZTE Corporation et al., "Discussion on Conditional PSCell Addition/Change," 3GPP Draft China (2019).

First Chinese Office Action for Application No. 202180014496.6, dated Nov. 29, 2024.

* cited by examiner

MANAGING A CONDITIONAL CONFIGURATION UPON ADDITION OR RELEASE OF A BEARER

CROSS-REFERENCE TO RELATED APPLICATIONS

This application claims priority to and the benefit of the filing date of U.S. Provisional Patent Application No. 62/975,902 entitled "Managing a Conditional Configuration Upon Addition or Release of a Bearer," filed on Feb. 13, 2020, the entire disclosure of which is hereby expressly incorporated by reference.

FIELD OF THE DISCLOSURE

This disclosure relates generally to wireless communications and, more particularly, to managing a conditional configuration when a radio bearer is added, modified or released to a user equipment (UE).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG or and the SCG can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP technical specifications (TS) 36.300 and 38.300 describes procedures for handover (or called reconfiguration with sync) scenarios. These procedures involve messaging (e.g., RRC signaling and preparation) between RAN nodes that generally causes latency, which in turn increases the probability of handover procedures. These procedures do not involve conditions associated with the UE, and can be referred to as "immediate" handover procedures. 3GPP documents R2-1914640 and R2-1914834 propose procedures for conditional handover scenarios.

3GPP specification TS 37.340 (v16.0.0) describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These procedures, which do not involve conditions that are checked at the UE, can be referred to as "immediate" SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 36.300 v16.0.0 and 38.300 v16.0.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an "immediate" handover procedure.

More recently, for both SN or PSCell addition/change and handover, "conditional" procedures have been considered (i.e., conditional SN or PSCell addition/change and conditional handover). Unlike the "immediate" procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., a set of random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

In some scenarios, the UE receives a conditional configuration which is a full configuration from a first base station. The UE with the conditional configuration may add, modify or release a data radio bearer (DRB) in response to an RRC message (e.g., RRC reconfiguration) received from a first base station. For example, the UE with the conditional configuration adds a new DRB in response to an RRC message (e.g., RRC reconfiguration) received from the first base station. Later, the UE detects a condition for connecting a candidate cell configured by the conditional configuration. In response to the detection, the UE connects to the candidate cell and uses the conditional configuration to communicate on the candidate cell with a second base station. However, the conditional configuration does not include any configuration to configure the new DRB so that the UE has to release the new DRB. In the end, any service on the new DRB is disconnected due to the new DRB being released.

SUMMARY

According to the techniques of this disclosure, a UE receives a conditional configuration related to a base station for a procedure such as conditional handover (CHO), conditional PSCell addition or change (CPAC), or conditional SN addition or change (CSAC). When the RAN determines to add, modify, or release a DRB, the UE can determine whether it should release the conditional configuration or retain the conditional configuration.

In some cases, the UE receives an RRC reconfiguration message from the MN and/or the SN with an explicit indication that the UE is to release the conditional configuration. The same RRC reconfiguration can include an indication that the UE is to add, modify, or release a DRB. In other implementations, the RAN provides these two indications in two respective messages, each of which can be an RRC Reconfiguration message.

In other cases, the UE receives an indication that the UE is to add, modify, or release a DRB and uses this indication as an implicit indication that the UE should retain or release the conditional configuration based on whether the conditional configuration is still valid in view of the indication. For example, if the indication is to add or modify the DRB, the UE may determine that the conditional configuration is invalid and thus may release the conditional configuration. If the indication is to release the DRB, the UE may determine that the conditional configuration is valid and thus may retain the conditional configuration.

In yet other cases, the UE receives an RRC reconfiguration message from the MN and/or the SN with a second conditional configuration. The same RRC reconfiguration can include an indication that the UE is to add, modify, or release a DRB. In other implementations, the RAN provides these two indications in two respective messages, each of which can be an RRC Reconfiguration message. The second conditional configuration in some implementations can be a complete and self-contained configuration (i.e. a full configuration). On the other hand, the second conditional configuration in other cases can include a "delta" configuration, or one or more configurations that augment a previously received conditional configuration. The UE 102 in this case can use the delta conditional configuration together with the first conditional configuration to communicate with the MN and/or the SN. The UE then updates the first conditional configuration with the second conditional configuration, which may include releasing the first conditional configuration and storing the second conditional configuration. In some implementations, the UE compares the second conditional configuration to the first conditional configuration to determine whether there are any inconsistencies between the first and second conditional configurations. If there are inconsistencies between the first and second conditional configurations, the UE may release the first conditional configuration and store the second conditional configuration. If the second conditional configuration is consistent with the first conditional configuration, the UE may retain the first conditional configuration.

An example embodiment of these techniques is a method in a UE for configuration management. The method can be executed by processing hardware and includes receiving, from a RAN, conditional configuration information including (i) a conditional configuration related to a base station operating in the RAN, and (ii) a condition to be satisfied before the UE applies the conditional configuration. The method further includes receiving, from the RAN, a message including an indication that the UE is to add, modify, or release a radio bearer (RB), and determining to ignore the conditional configuration in response to receiving the message.

Another example embodiment of these techniques is a UE including processing hardware and configured to implement the method above.

Still another example embodiment of these techniques is a method in a RAN for configuring a UE. The method can be implemented by processing hardware and includes transmitting, to the UE, (i) a conditional configuration related to a base station operating in the RAN, and (ii) a condition to be satisfied before the UE applies the conditional configuration during a conditional procedure. The method further includes receiving an interface message from a core network (CN), determining to add, modify, or release a radio bearer (RB) in response to the interface message, and transmitting a message including an indication that the UE is to add, modify, or release the RB.

Yet another example embodiment of these techniques is a RAN including processing hardware and configured to execute the method above.

DETAILED DESCRIPTION OF THE DRAWINGS

As discussed in detail below, a UE and/or one or more base stations manage conditional configuration for a procedure such as conditional handover (CHO), conditional PSCell addition or change (CPAC), or conditional SN addition or change (CSAC), when the UE operates in DC such as MR-DC or SC. When the RAN notifies the UE that the UE is to add, modify, or release a DRB, the UE determines whether it should also release the conditional configuration. Prior to discussing the techniques the UE can implement to make this determination, example communication systems in which these techniques are considered with reference to FIGS. 1A-C.

Figure 1A:
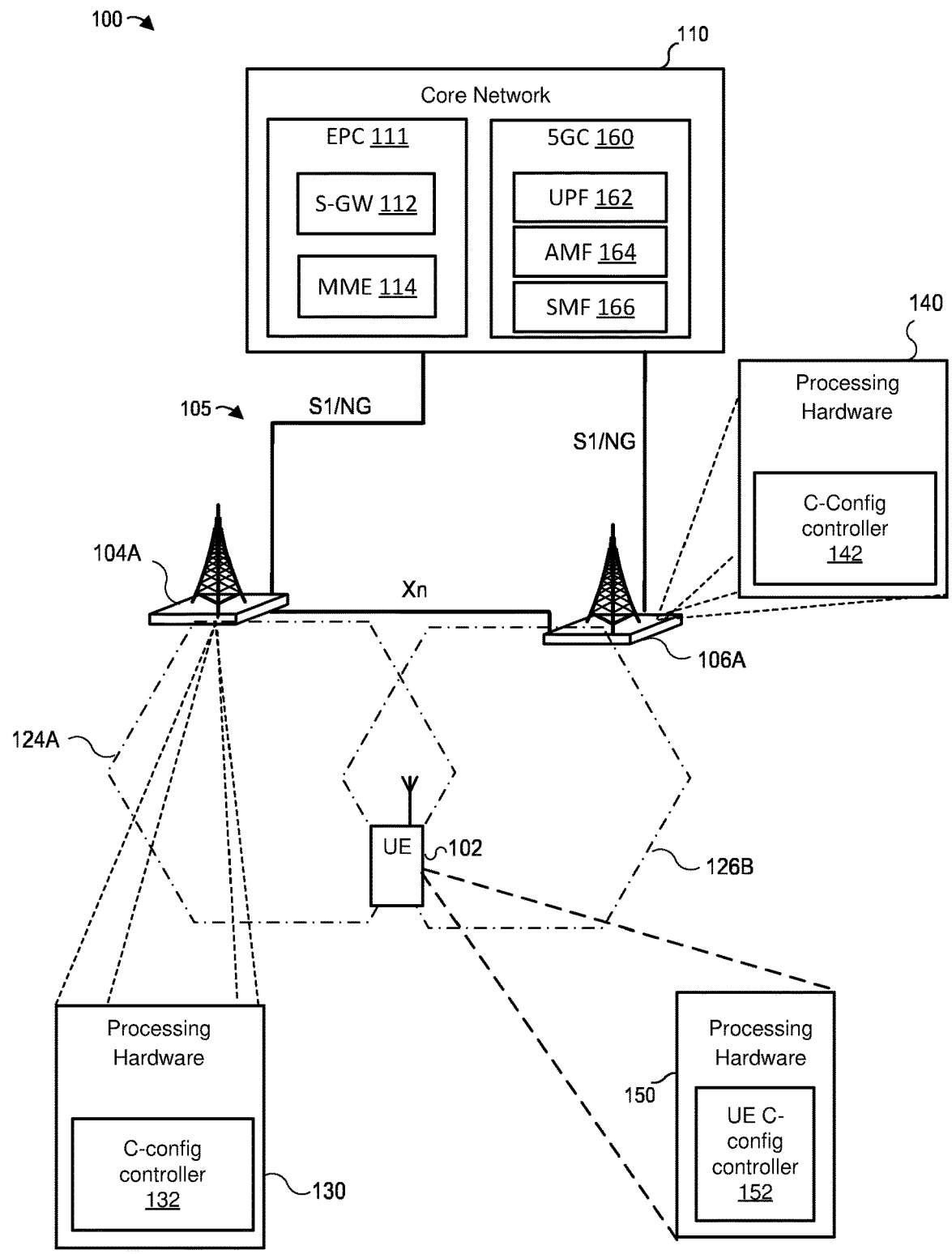
FIG. 1A is a block diagram of an example system in which a radio access network (RAN) and a user device can implement the techniques of this disclosure for managing conditional procedures related to a master node (MN) or a secondary node (SN)

Referring first to FIG. 1A, an example wireless communication system 100 includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104A supports a cell 124A, and the base station 106A supports a cell 126A. The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a conditional configuration controller 132 configured to manage conditional configuration for one or more conditional procedures such as CHO, CPAC, or CSAC, when the base station 104A operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a conditional configuration controller 142 configured to manage conditional configurations for one or more conditional procedures such as CHO, CPAC, or CSAC, when the base station 106A operates as an SN.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE conditional configuration controller 152 configured to manage conditional configuration for one or conditional procedures.

More particularly, the conditional configuration controllers 132, 142, and 152 can implement at least some of the techniques discussed with reference to the messaging and flow diagrams below to receive conditional configuration, release the conditional configuration in response to certain events, apply the conditional configuration, etc. Although FIG. 1A illustrates the conditional configuration controllers 132 and 142 as separate components, in at least some of the scenarios the base stations 104A and 106A can have similar implementations and in different scenarios operate as MN or SN nodes. In these implementations, each of the base stations 104A and 106A can implement both the conditional configuration controller 132 and the conditional configuration controller 142 to support MN and SN functionality, respectively.

In operation, the UE 102 can use a radio bearer (RB) (e.g., a DRB or an SRB) that at different times terminates at the MN 104A or the SN 106A. The UE 102 can apply one or more security keys when communicating on the radio bearer, in the uplink (from the UE 102 to a BS) and/or downlink (from a base station to the UE 102) direction. The UE in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

Figure 1B:
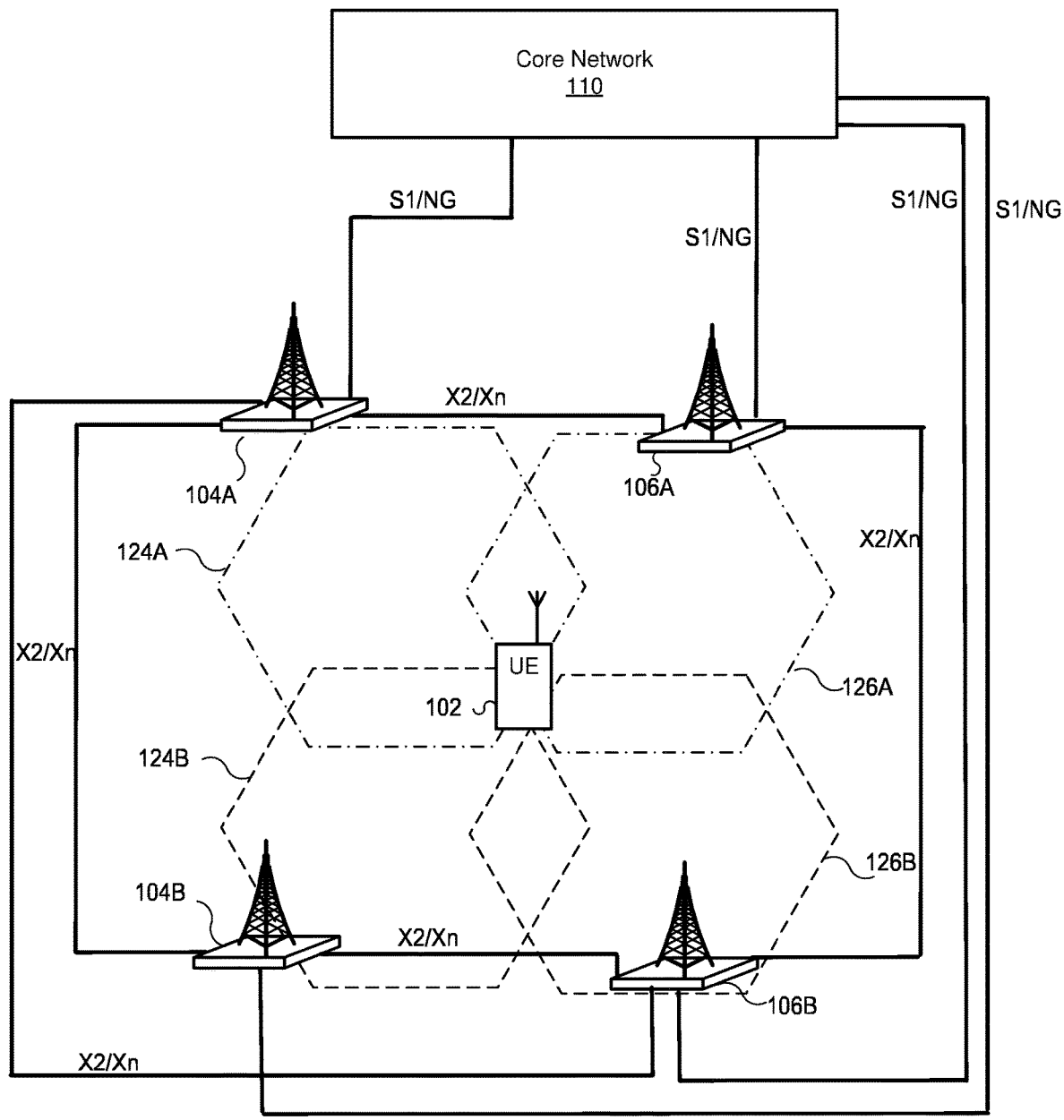
FIG. 1B is another block diagram of an example system in which a radio access network (RAN) and a user device can implement the techniques of this disclosure for managing conditional procedures related to an MN or an SN.

FIG. 1B depicts an example wireless communication system 100 in which communication devices can implement these techniques. The wireless communication system 100 includes a UE 102, a base station 104A, a base station 104B, a base station 106A, a base station 106B and a core network (CN) 110. The UE 102 initially connects to the base station 104A. The BSs 104B and 106B may have similar processing hardware as the base station 106A. The UE 102 initially connects to the base station 104A.

In some scenarios, the base station 104A can perform immediate SN addition to configure the UE 102 to operate in dual connectivity (DC) with the base station 104A (via a PCell) and the base station 106A (via a PSCell other than cell 126A). The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR.

At some point, the MN 104A can perform an immediate SN change to change the SN of the UE 102 from the base station 106A (source SN, or "S-SN") to the base station 104B (target SN, or "T-SN") while the UE 102 is in DC with the MN 104A and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In another implementation, the SN 106A can transmit a configuration changing the PSCell to the cell 126A to the UE 102 via the MN 104A for the immediate PSCell change. The MN 104A may transmit the configuration immediately changing the PSCell to the cell 126A to the UE 102 via SRB1.

In other scenarios, the base station 104A can perform a conditional SN Addition procedure to first configure the base station 106B as a C-SN for the UE 102, i.e. conditional SN addition or change (CSAC). At this time, the UE 102 can be in SC with the base station 104A or in DC with the base station 104A and the base station 106A. If the UE 102 is in DC with the base station 104A and the base station 106A, the MN 104A may determine to perform the conditional SN Addition procedure in response to a request received from the base station 106A or in response to one or more measurement results received from the UE 102 or obtained by the MN 104A from measurements on signals received from the UE 102. In contrast to the immediate SN Addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some implementations, the UE 102 may disconnect from the SN 106A to connect to the C-SN 106B.

In yet other scenarios, the UE 102 is in DC with the MN 104A (via a PCell) and SN 106A (via a PSCell other than cell 126A and not shown in FIG. 1A). The SN 106A can perform conditional PSCell addition or change (CPAC) to configure a candidate PSCell (C-PSCell) 126A for the UE 102. If the UE 102 is configured to use a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. When the SN 106A transmits the configuration for the C-PSCell 126A to the UE 102 via the MN 104A, the MN 104A receives the configuration for the C-PSCell 126A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with CSAC or CPAC can be signal strength/quality, which the UE 102 detects on the C-PSCell 126A of the SN 106A or on a C-PSCell 126B of C-SN 106B, exceeding a certain threshold or otherwise corresponding to an acceptable measurement. For example, when the one or more measurement results the UE 102 obtains on the C-PSCell 126A are above a threshold configured by the MN 104A or the SN 106A or above a pre-determined or pre-configured threshold, the UE 102 determines that the condition is satisfied. When the UE 102 determines that the signal strength/quality on the C-PSCell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. Once the UE 102 successfully completes the random access procedure on the C-PSCell 126A, the C-PSCell 126A becomes a PSCell 126A for the UE 102. The SN 106A then can start communicating data (user-plane data or control-plane data) with the UE 102 through the PSCell 126A. In another example, when the one or more measurement results the UE 102 obtains on the C-PSCell 126B are above a threshold configured by the MN 104A or the C-SN 106B or above a pre-determined or pre-configured threshold, the UE 102 determines that the condition is satisfied. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. Once the UE 102 successfully completes the random access procedure on the C-PSCell 126B, the C-PSCell 126B becomes a PSCell 126B for the UE 102 and the C-SN 106B becomes an SN 106B. The SN 106B then can start communicating data (user-plane data or control-plane data) with the UE 102 through the PSCell 126B.

In various configurations of the wireless communication system 100, the base station 104A can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104A and the base station 106A or 106B (106A/B) via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB or a C-SgNB is implemented as an ng-eNB rather than an eNB. When the base station 104A is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. In this scenario, the Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 106A, and 106B can connect to the same core network (CN) 110 which can be an evolved packet core (EPC) 111 or a fifth-generation core (5GC) 160. The base station 104A can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well an NG interface to the 5GC 160, or a ng-eNB that supports an EUTRA radio interface as well as an NG interface to the 5GC 160. To directly exchange messages during the scenarios discussed below, the base stations 104A, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 124B, so that the UE 102 can communicate in DC with the base station 104A (operating as an MN) and the base station 106A (operating as an SN) and, upon completing an SN change, with the base station 104A (operating as MN) and the SN 106B. More particularly, when the UE 102 is in DC with the base station 104A and the base station 106A, the base station 104A operates as an MeNB, an MNg-eNB or a MgNB, and the base station 106A operates as an SgNB or an SNg-eNB. The cells 124A and 126B can partially overlap. When the UE 102 is in SC with the base station 104A, the base station 104A operates as an MeNB, an MNg-eNB or a MgNB, and the base station 106B operates as a C-SgNB or a C-Sng-eNB. When the UE 102 is in DC with the base station 104A and the base station 106A, the base station 104A operates as an MeNB, an MNg-eNB or a MgNB, the base station 106A operates as an SgNB or an SNg-eNB, and the base station 106B operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

Figure 1C:
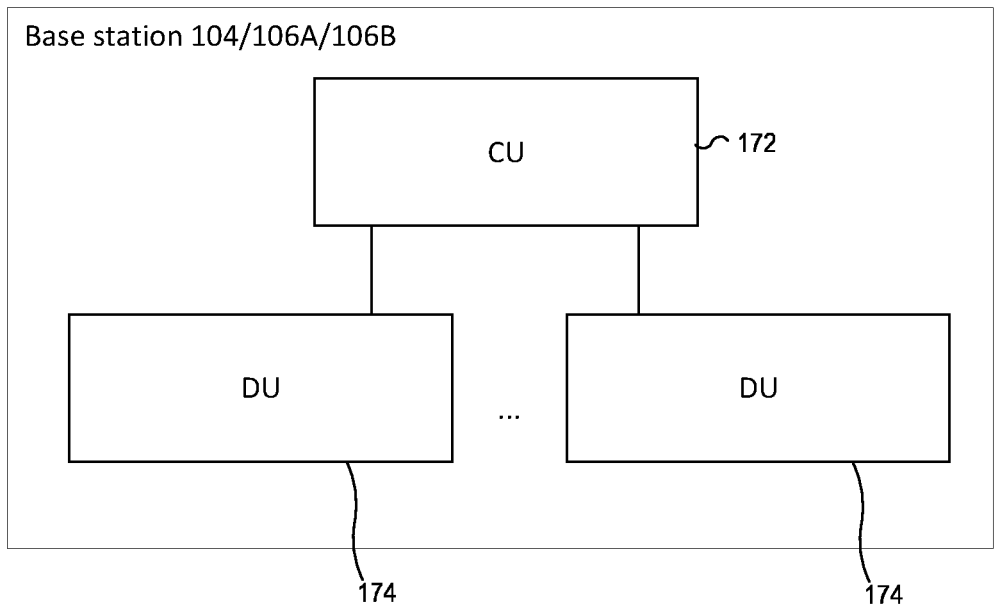
FIG. 1C is a block diagram of an example base station in which a centralized unit (CU) and a distributed unit (DU) can operate in the system of FIG. 1A or FIG. 1B.

FIG. 1C depicts an example distributed implementation of a base station such as the base station 104A, 104B, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware which is the same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as an MN, an SN or a candidate SN (C-SN). The processing hardware may include further a physical layer controller configured to manage or control one or more physical layer operations or procedures.

Figure 2:
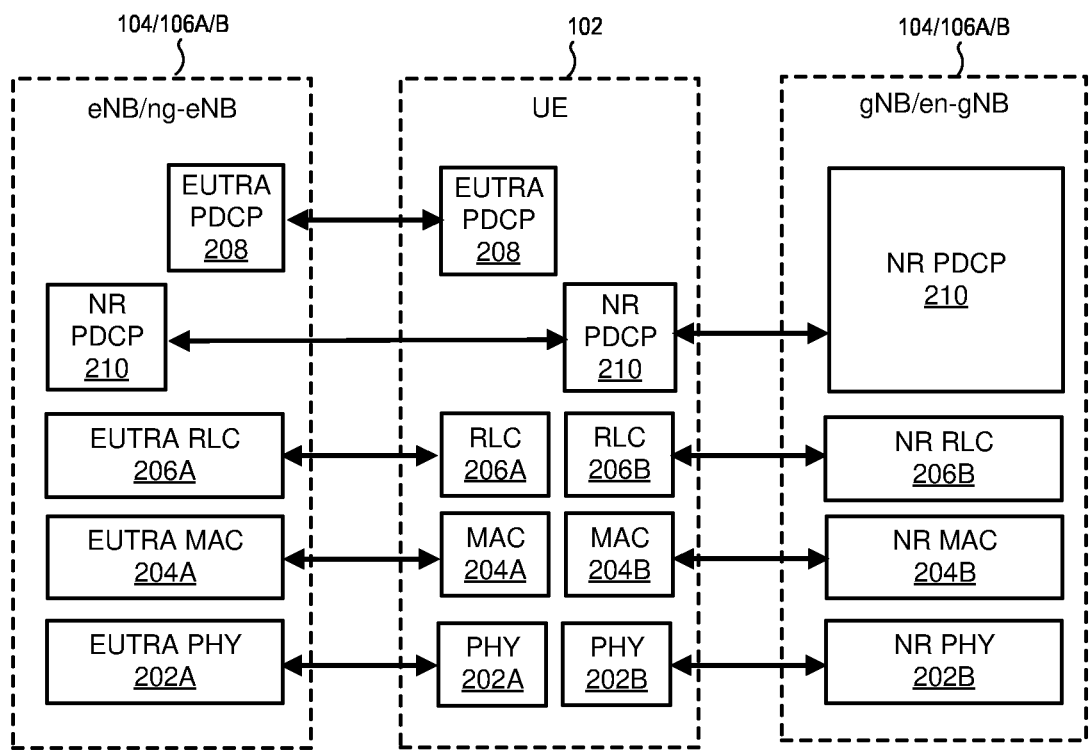
FIG. 2 is a block diagram of an example protocol stack according to which the UE of FIG. 1A communicates with base stations.

FIG. 2 illustrates, in a simplified manner, an example radio protocol stack 200 according to which the UE 102 may communicate with an eNB/ng-eNB or a gNB (e.g., one or more of the base stations 104A, 104B, 106A, 106B). In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104A operating as an MeNB and the base station 106A operating as an SgNB, the wireless communication system 100 can provide the UE 102 with an MN-terminated bearer that uses the EUTRA PDCP sublayer 208, or an MN-terminated bearer that uses the NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can an SRB or a DRB.

Next, several example scenarios in which a UE and/or a base station manage conditional configuration for a conditional procedure are discussed with reference to FIGS. 3A-6C. In each scenario, the RAN 105 determines to add, modify, or release an RB, such as a DRB. As a result, the UE 102 may ignore the first conditional configuration which may include updating the first conditional configuration with a second conditional configuration. In some implementations, the RAN 105 may include an explicit indication to release the conditional configuration. In other implementations, the UE 102 may receive an indication that the UE 102 is to add, modify, or release a DRB and may use this indication as an implicit indication that the UE 102 should release the conditional configuration. In yet other implementations, the UE 102 may receive a second conditional configuration which may be a full configuration or a delta configuration that augments the first conditional configuration. The UE 102 may then update the first conditional configuration according to the second conditional configuration. For example, if the second conditional configuration is a full configuration, the UE 102 may replace the first conditional configuration with the second conditional configuration.

Figure 3A:
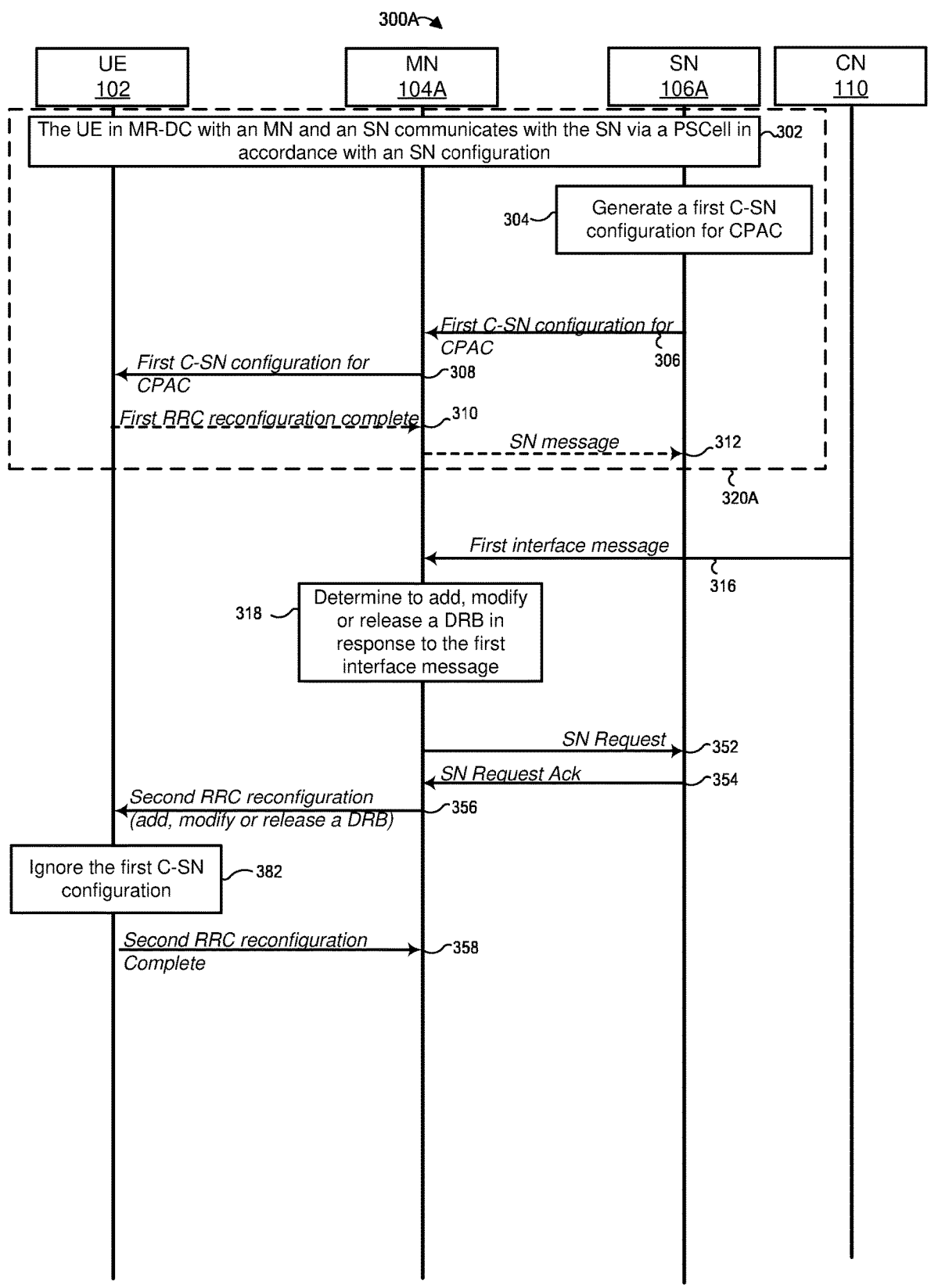
FIG. 3A is a messaging diagram of an example scenario in which the SN of FIG. 1A initiates a conditional PSCell addition or change (CPAC) configuration procedure via the MN of FIG. 1A or 1B to configure a candidate secondary node (C-SN) configuration and the UE ignores the C-SN configuration in response to addition, modification or release of a data radio bearer (DRB), in accordance with the techniques of this disclosure.

More specifically, referring first to FIG. 3A, the base station 104A in a scenario 300A operates 302 as an MN, and the base station 106A operates as an SN. Initially, the UE 102 is in MR-DC with the MN 104A and the SN 106A. The UE 102 communicates 302 UL PDUs and/or DL PDUs with SN 106A via a PSCell (i.e., a cell other than cell 126A) in accordance with a certain SN configuration. The SN 106A then determines 304 that it should generate a first C-SN configuration for conditional PSCell addition or change (CPAC). The SN 106A can make this determination based on one or more measurement results received from the UE 102 via the MN 104A, from the UE directly (e.g., via a signaling radio bearer (SRB) established between the UE 102 and the SN 106A or via a physical control channel), or obtained by the SN 106A from measurements on signals, control channels or data channels received from the UE 102, for example, or another suitable event. More intelligently, the SN 106A can derive or estimate the UE 102 is moving toward coverage of the cell 126A according to uplink signals received from the UE 102 or positioning measurement result(s) received from the UE 102. In response to this determination, the SN 106A generates 304 the first C-SN configuration.

In the example scenario 300A, the SN 106A then transmits 306 the first C-SN configuration to the MN 104A. The MN 104A in turn transmits 308 the first C-SN configuration to the UE 102. In some implementations, the SN 106A at event 304 generates a first conditional configuration including the first C-SN configuration and generates a first RRC reconfiguration message including the first conditional configuration. The SN 106A may assign a first configuration identifier/identity (ID) for identifying the first conditional configuration or the first C-SN configuration and include the first configuration ID in the first conditional configuration. The SN 106A at event 306 then transmits the first RRC reconfiguration message to the MN 104A. The MN 104A in turn at event 308 transmits the first RRC reconfiguration message including the first conditional configuration to the UE 102. In other implementations, the MN 104A generates a first conditional configuration including the first C-SN configuration and generates a first RRC reconfiguration message including the first conditional configuration. The SN 106A may assign a first configuration ID identifying the first conditional configuration or the first C-SN configuration and may include the first configuration ID in the first conditional configuration. The MN 104A at event 308 transmits the first RRC reconfiguration message including the first conditional configuration to the UE 102.

In some implementations, the UE 102 may transmit 310 a first RRC reconfiguration complete message to the MN 104A in response to the first RRC reconfiguration message described above. The MN 104A may transmit 312 an SN message (e.g., SN Reconfiguration Complete message or SN Modification Confirm message) to the SN 106A in response to the first RRC reconfiguration complete message. The events 302-312 collectively can define a CPAC configuration procedure 320A.

To transmit the first RRC reconfiguration message, the MN 104A in one implementation transmits a first RRC container message including the first RRC reconfiguration to the UE 102. In response, the UE 102 in one implementation transmits a first RRC container response message to the MN 104A to transmit 310 the first RRC reconfiguration complete message. The MN 104A may send 312 the SN message to the SN 106A in response to the first RRC container response message or the first RRC reconfiguration complete message. The MN 104A may include the first RRC reconfiguration complete message in the SN message at event 312. In another implementation, the UE 102 does not generate an RRC container response message to wrap the first RRC reconfiguration complete message.

In this example scenario, as well as the scenarios discussed below, a base station can generate a conditional configuration that includes, in addition to a candidate base station configuration (e.g., a C-SN configuration for CPAC or CSAC or a C-MN configuration) related to a cell, one or more conditions ("trigger conditions") that must be satisfied before the UE applies the candidate base station configuration. The base station can transmit a message including the conditional configuration including the candidate base station configuration only or, alternatively, the conditional configuration including (i) the candidate base station configuration and (ii) at least one trigger condition. The base station may also include a configuration identity/identifier (ID) identifying the conditional configuration or the candidate base station configuration. In this example scenario, the MN 104A or the SN 106A can transmit the first RRC reconfiguration message including the first conditional configuration including the first C-SN configuration only or, alternatively, the first conditional configuration including (i) the first C-SN configuration and (ii) at least one trigger condition. Additionally, the MN 104A or the SN 106A can include a configuration ID in the first conditional configuration for identifying the first C-SN configuration or the first conditional configuration.

At a later time, the MN 104A receives 316 a first interface message from a CN 110 (e.g., MME 114 or AMF 164). In response to the first interface message, the MN 104A determines 318 to add, modify, or release a DRB. The MN 104A may send a second interface message to the CN 110 in response to the first interface message. In one implementation, the MN 104A determines to add a new DRB in response to the first interface message. In another implementation, the MN 104A determines to modify or release an existing DRB configured for the UE 102 in response to the first interface message. For example, the MN 104A may determine to modify the DRB by modifying or releasing radio resources for the DRB. The radio resources may include one or more RLC bearers or quality of service (QoS) mapping configurations (e.g., adding a new QoS flow and mapping the new QoS flow to the existing DRB or releasing an existing QoS flow). In one implementation, the DRB can be an SN-terminated DRB. In another implementation, the DRB can be an MN-terminated DRB which utilizes radio resources of the SN 106A. The UE 102 may release or modify the radio resources (i.e., release or modify the DRB) in response to the second RRC reconfiguration message. In the following description, "add, modify or release a DRB" can represent "add a new DRB" or "modify or release an existing DRB".

In some implementations, the first interface message and the second interface message can be NG application protocol messages defined in 3GPP specification 38.413. For example, the first interface message can be a PDU Session Resource Setup Request message, a PDU Session Resource Modify Request message, a PDU Session Resource Release Request message or an Initial Context Setup Request message, and the second interface message can be a PDU Session Resource Setup Response message, a PDU Session Resource Modify Response message, a PDU Session Resource Release Response message or an Initial Context Setup Response message. In other implementations, the first interface message and the second interface message can be S1 application protocol messages defined in 3GPP specification 36.413. For example, the first interface message can be an E-RAB Setup Request message, an E-RAB Modify Request message, an E-RAB Release Command message or an Initial Context Setup Request message, and the second interface message can be an E-RAB Setup Response message, an E-RAB Modify Response message, an E-RAB Release Response message or an Initial Context Setup Response message.

In response to the determination 318, the MN 104A sends 352 an SN Request message to the SN 106A to request the SN 106A to add, modify or release a DRB. In response to the SN Request message, the SN 106A adds, modifies or releases the DRB and sends 354 an SN Request Acknowledge message. The MN 104A transmits 356 a second RRC reconfiguration message adding, modifying or releasing the DRB to the UE 102. The UE 102 ignores 382 the first C-SN configuration in response to adding, modifying or releasing the DRB. The UE 102 transmits 358 a second RRC reconfiguration complete message in response to the second RRC reconfiguration message.

The second RRC reconfiguration message can be generated by the MN 104A or the SN 106A as described below. In some implementations, the SN 106A may generate a radio bearer configuration (e.g., RadioBearerConfig) IE which adds, modifies or releases a DRB and includes the radio bearer configuration in the SN Request Acknowledge message. The MN 104A may generate the second RRC reconfiguration message and include the radio bearer configuration in the second RRC reconfiguration message. In other implementations, the MN 104A may generate a radio bearer configuration (e.g., RadioBearerConfig) IE which adds, modifies or releases a DRB and include the radio bearer configuration in the second RRC reconfiguration message.

In yet other implementations, the SN 106A may generate a cell group configuration (e.g., CellGroupConfig IE or SCG-ConfigPartSCG-r12 IE) which modifies a DRB, i.e., an existing DRB configured to the UE 102. The SN 106A includes the cell group configuration in the second RRC reconfiguration message. Then the SN 106A includes the second RRC reconfiguration message in the SN Request Acknowledge message. In this case, the MN 104A generates a second RRC container message including the second RRC reconfiguration message and transmits 356 the second RRC container message to the UE 102. The UE 102 may transmit 568 a second RRC container response message including the second RRC reconfiguration complete message to the MN 104A and in turn, the MN 104A may send the second RRC reconfiguration complete message to the SN 106A, e.g., in an SN Reconfiguration Complete message. Neither the second RRC reconfiguration nor the second RRC container message configures the UE 102 to release MR-DC, so that the UE 102 is still in MR-DC with the MN 104A and SN 106A.

In the implementations above, neither the second RRC reconfiguration nor the second RRC container message includes a C-SN configuration to release field/IE indicating the UE 102 to release the first C-SN configuration. In other words, neither the MN 104A nor the SN 106A includes the C-SN configuration to release field/IE in the second RRC reconfiguration message or the second RRC container message.

In some implementations, the SN Request message is an SN Modification Request message, and the SN Request Acknowledge message is an SN Modification Request Acknowledge message.

When the SN 106A is implemented as an ng-eNB, the first and second RRC reconfiguration messages (if generated by the SN 106A) are RRCConnectionReconfiguration messages, and the first and second RRC reconfiguration complete messages are RRCConnectionReconfigurationComplete messages. When the SN 106A is implemented as a gNB, the first and second RRC reconfiguration messages (if generated by the SN 106A) are RRCReconfiguration messages, and the first and second RRC reconfiguration complete messages are RRCReconfigurationComplete messages. When the MN 104A is implemented as an eNB or ng-eNB, the RRC container message is an RRCConnectionReconfiguration message, and the RRC container response message is RRCConnectionReconfigurationComplete. When the MN 104A is implemented as a gNB, the RRC container message is an RRCReconfiguration message, and the RRC container response message is an RRCReconfigurationComplete message.

When the MN 104A is implemented as an eNB or ng-eNB, the first and second RRC reconfiguration messages (if generated by the MN 104A) are RRCConnectionReconfiguration messages, and the first and second RRC reconfiguration complete messages are RRCConnectionReconfigurationComplete messages. When the MN 104A is implemented as a gNB, the first and second RRC reconfiguration messages (if generated by the MN 104A) are RRCReconfiguration messages, and the first and second RRC reconfiguration complete messages are RRCReconfigurationComplete messages.

With continued reference to FIG. 3A, the first C-SN configuration in some implementations can be a complete and self-contained configuration (i.e. a full configuration). The first C-SN configuration may include a full configuration indication (an information element (IE) or a field) that identifies the first C-SN configuration as a full configuration. The UE 102 in this case can directly use the first C-SN configuration to communicate with the SN 106A without relying on an SN configuration. On the other hand, the first C-SN configuration in other cases can include a "delta" configuration, or one or more configurations that augment a previously received SN configuration. The UE 102 in this case can use the delta C-SN configuration together with the SN configuration to communicate with the SN 106A.

The first C-SN configuration can include multiple configuration parameters for the UE 102 to apply when communicating with the SN 106A via a C-PSCell 126A. The multiple configuration parameters may configure the C-PSCell 126A and zero, one, or more candidate secondary cells (C-SCells) of the SN 106A to the UE 102. The multiple configuration parameters may configure radio resources for the UE 102 to communicate with the SN 106A via the C-PSCell 126A and zero, one, or more C-SCells of the SN 106A. The multiple configuration parameters may configure zero, one, or more radio bearers. The one or more radio bearers can include an SRB and/or one or more DRBs.

The SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or one or more DRBs.

In some implementations, the SN 106A can include the CPAC configuration in an SN Modification Acknowledge message responding to an SN Modification Request message received from the MN 104A and send the SN Modification Request Acknowledge message to the MN 104A during the event 306. In other implementations, the SN 106A can include the CPAC configuration in an SN Modification Required message and send the SN Modification Required message to the MN 104A during the event 306. The SN 106A may indicate that the SN Modification Request Acknowledge message or the SN Modification Required message is for CPAC, so that the MN 104A can determine that the SN Modification Request Acknowledge message or the SN Modification Required message includes the CPAC configuration. In other implementations, the SN 106A does not indicate CPAC in the SN Modification Request Acknowledge message or the SN Modification Required message, so that the CPAC configuration from the SN 106A is transparent to the MN 104A (in other words, so that the MN 104A simply tunnels the CPAC configuration through to the UE 102, without processing the CPAC configuration).

In some implementations, the first C-SN configuration can include a group configuration (CellGroupConfig) IE that configures the C-PSCell 126A and zero, one, or more C-SCells of the SN 106A. In one implementation, the first C-SN configuration may include a radio bearer configuration. In another implementation, the first C-SN configuration may not include a radio bearer configuration. For example, the radio bearer configuration can be a RadioBearerConfig IE, DRB-ToAddModList IE or SRB-ToAddModList IE, DRB-ToAddMod IE or SRB-ToAddMod IE. In various implementations, the first C-SN configuration can be an RRCReconfiguration message, RRCReconfiguration-IEs, or the CellGroupConfig IE conforming to 3GPP TS 38.331. The full configuration indication may be a field or an IE conforming to 3GPP TS 38.331. In other implementations, the first C-SN configuration can include an SCG-ConfigPartSCG-r12 IE that configures the C-PSCell 126A and zero, one, or more C-SCells of the SN 106A. In some implementations, the first C-SN configuration is an RRC-ConnectionReconfiguration message, RRCConnectionReconfiguration-IEs, or the ConfigPartSCG-r12 IE conforming to 3GPP TS 36.331. The full configuration indication may be a field or an IE conforming to 3GPP TS 36.331.

In some implementations, the SN configuration can include a CellGroupConfig IE that configures the PSCell and may configure zero, one, or more SCells of the SN 106A. In one implementation, the SN configuration can be a RRCReconfiguration message, RRCReconfiguration-IEs or the CellGroupConfig IE conforming to 3GPP TS 38.331. In other implementations, the SN configuration can include a SCG-ConfigPartSCG-r12 IE that configures the PSCell and may configure zero, one, or more SCells of the SN 106A. In one implementation, the SN configuration can be a RRC-ConnectionReconfiguration message, RRCConnectionReconfiguration-IEs or the ConfigPartSCG-r12 IE conforming to 3GPP TS 36.331.

In some cases, the UE 102 may receive one or more conditions (discussed in this disclosure in singular for convenience) in the conditional configuration during the event 308. The UE 102 may use the one or more conditions to determine whether to connect to the C-PSCell 126A. If the UE 102 determines that the condition is satisfied, the UE 102 connects to the C-PSCell 126A. That is, the condition (or "triggering condition") triggers the UE 102 to connect to the C-PSCell 126A or to execute the first C-SN configuration. However, if the UE 102 does not determine that the condition is satisfied, the UE 102 does not connect to the C-PSCell 126A.

Still referring to FIG. 3A, the SN 106A in some cases can include the CU 172 and one or more DUs 174 as illustrated in FIG. 1C. The UE communicates 302 with the SN 106A via a first DU 174 operating the PSCell. The CU 172 may send a UE Context Setup Request message to a second DU 174 operating the C-PSCell 126A in response to the determination 304. In response to the UE Context Setup Request message, the second DU 174 may generate the first C-SN configuration or part of the first C-SN configuration and send the first C-SN configuration or part of the first C-SN configuration to the CU 172 in a UE Context Setup Response message. When the second DU 174 generates a portion of the first C-SN configuration, the CU 172 may generate the rest of the first C-SN configuration. The CU 172 may send a UE Context Modification Request message to the first DU 174 if the first DU 174 also operates the C-PSCell 126A. In response to the UE Context Modification Request message, the first DU 174 may generate the first C-SN configuration or part of the first C-SN configuration and send the first C-SN configuration or part of the first C-SN configuration to the CU 172 in a UE Context Modification Response message. When the first DU 174 generates a portion of the first C-SN configuration, the CU 172 may generate the rest of the first C-SN configuration.

Figure 3B:
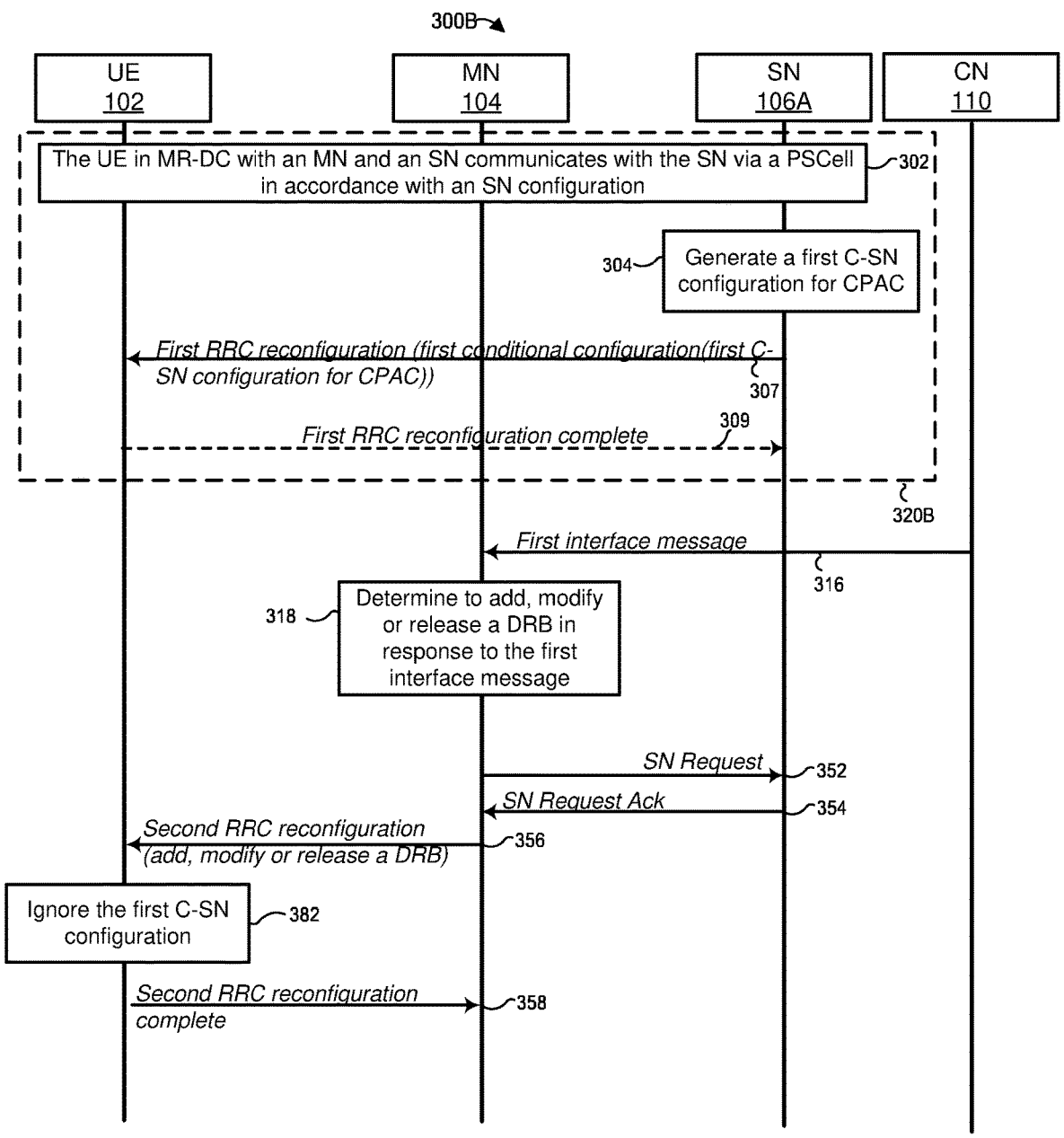
FIG. 3B is a messaging diagram of an example scenario similar to the scenarios of FIG. 3A, but where the SN initiates a CPAC configuration procedure directly with the UE.

Now referring to FIG. 3B, a scenario 300B involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIG. 3A and FIG. 3B are discussed below.

The CPAC configuration procedure 320B is generally similar to the CPAC configuration procedure 320A of FIG. 3A. However, in the scenario 300B the SN 106A directly transmits 307 the first RRC reconfiguration message including the first conditional configuration to the UE 102, rather that transmitting the first RRC reconfiguration message to the UE 102 via the MN 104A, as the SN 106A does in the scenario 300A of FIG. 3A. In some implementations, the SN 106A configures a first SRB for the UE 102 via the MN 104A and transmits the first RRC reconfiguration message via the first SRB to the UE 102. For example, the SN 106A transmits an SRB configuration configuring the first SRB (e.g., SRB3) to the MN 104A, and the MN 104A transmits the SRB configuration to the UE via a second SRB (e.g., SRB1) between the MN 104A and the UE 102. In some implementations, the UE 102 can transmit 309 the first RRC reconfiguration complete message via the first SRB to the SN 106A in response to the first RRC reconfiguration message, rather than transmitting 310 the first RRC reconfiguration complete message to the MN 104A as in the scenario 300A.

When the SN 106A is implemented as an ng-eNB, the first RRC reconfiguration message in the event 307 is a RRCConnectionReconfiguration message, and the first RRC reconfiguration complete message in the event 309 is a RRCConnectionReconfigurationComplete message. When the SN 106A is an gNB, the first RRC reconfiguration message in the event 307 is a RRCReconfiguration message, and the first RRC reconfiguration complete message in the event 309 is an RRCReconfigurationComplete message.

Figure 3C:
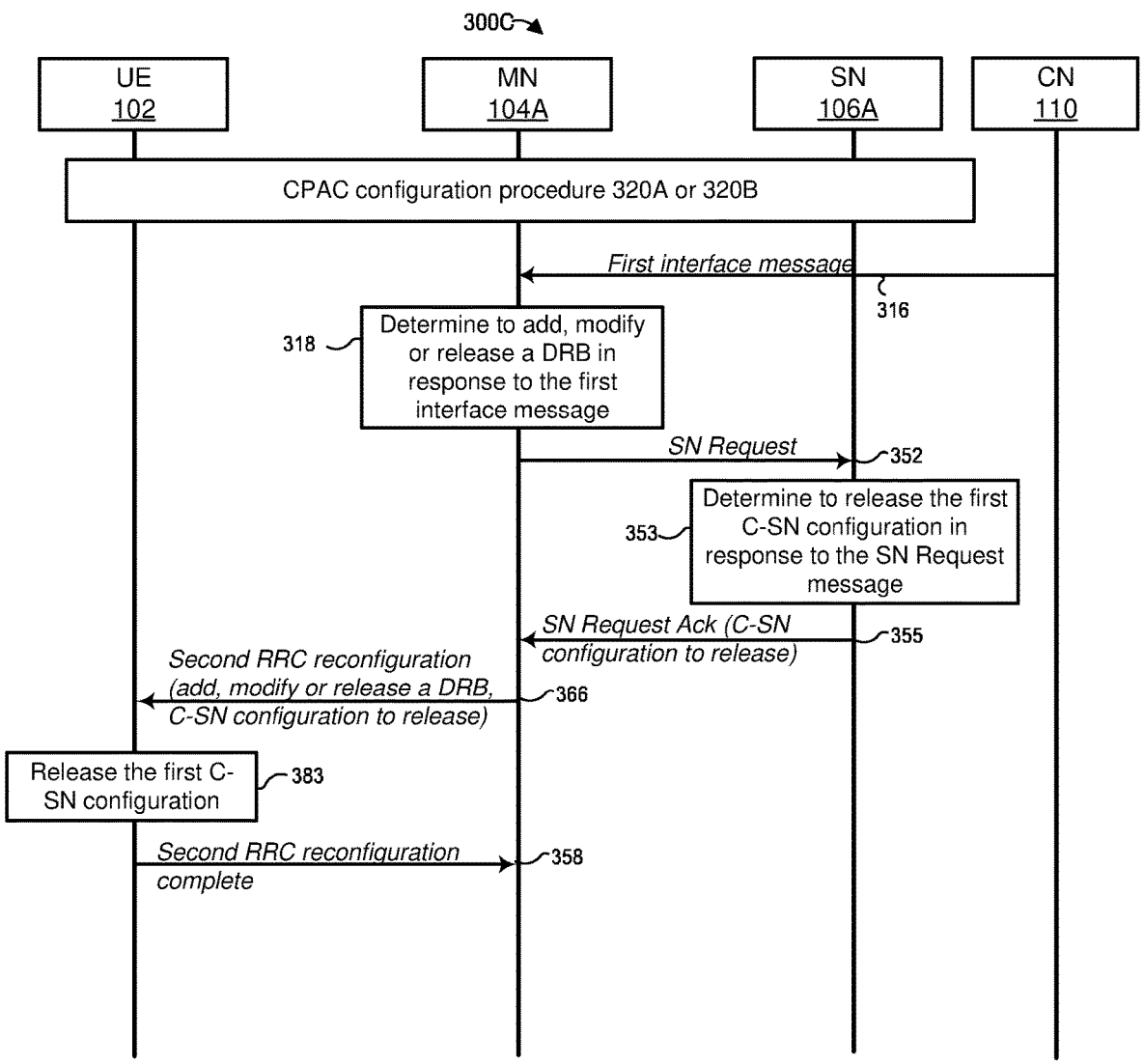
FIG. 3C is a messaging diagram of an example scenario similar to the scenarios of FIGS. 3A and 3B, but where a base station configures the UE to release a C-SN configuration in response to addition, modification or release of a DRB.

Now referring to FIG. 3C, a scenario 300C involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3A-3B and FIG. 3C are discussed below.

In the scenario 300C, the SN 106A determines 353 to release the first C-SN configuration in response to the SN Request message (event 352). In response to the determination, the SN 106A generates a C-SN configuration to release field/IE which indicates the UE 102 to release the first C-SN configuration. The SN 106A sends 355 an SN Request Acknowledge message including the C-SN configuration to release field/IE to the MN 104A. The MN 104A includes the C-SN configuration to release field/IE in the second RRC reconfiguration message which adds, modifies or releases a DRB and transmits 366 the second RRC reconfiguration message to the UE 102. The UE 102 releases 383 the first C-SN configuration in response to the C-SN configuration to release field/IE. The C-SN configuration to release field/IE may include the first configuration ID so that the UE 102 can use the C-SN configuration to release field/IE (or the first configuration ID) to identify and release the first C-SN configuration or the first conditional configuration including the first C-SN configuration.

In some implementations, the SN 106A may include the C-SN configuration to release field/IE in the radio bearer configuration, the cell group configuration or in the second RRC reconfiguration message generated by the SN 106A.

Figure 3D:
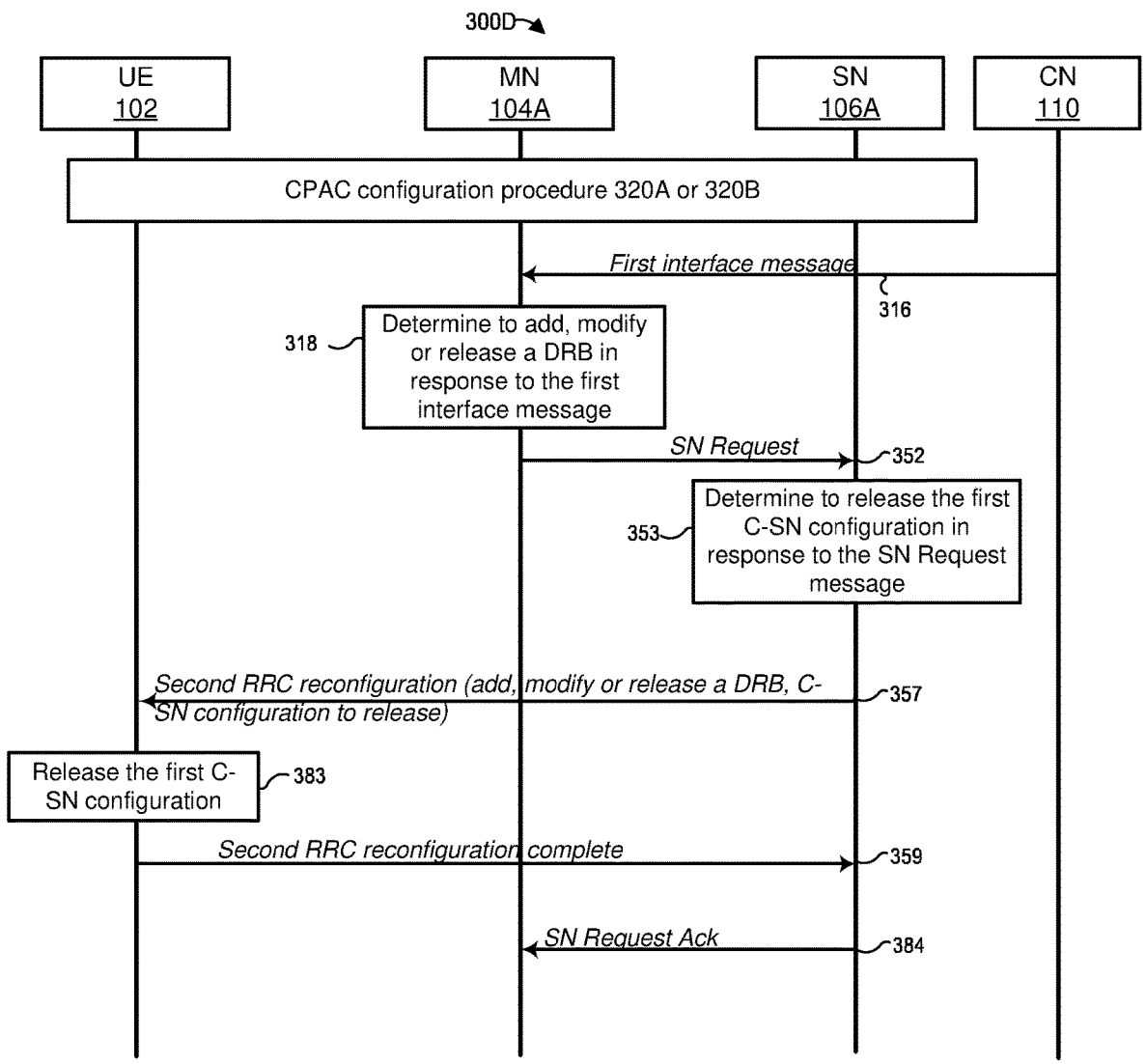
FIG. 3D is a messaging diagram of another example scenario similar to the scenarios of FIGS. 3A and 3B, but where a base station configures the UE to release a C-SN configuration in response to addition, modification or release of a DRB.

Now referring to FIG. 3D, a scenario 300D involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3A-3C and FIG. 3D are discussed below.

In the scenario 300D, in response to the determination 353, the SN 106A generates the second RRC reconfiguration message which adds, modifies or releases the DRB, and includes the C-SN configuration to release field/IE in the second RRC reconfiguration message. The SB 106A sends 384 an SN Request Acknowledge message to the MN 104A in response to the SN Request message. The SN Request Acknowledge message 384 and the SN Request Acknowledge message 354 can be the same message with different content. Then the SN 106A directly transmits 357 the second RRC reconfiguration message to the UE 102, e.g., via the first SRB (e.g., SRB3). The UE 102 transmits 359 the second RRC reconfiguration complete message to the SN 106A, e.g. via the first SRB, in response to the second RRC reconfiguration message. The SN 106A may send the second RRC reconfiguration message before, during or after transmitting the SN Request Acknowledge message (event 384). The SN 106A may receive the second RRC reconfiguration complete message before, during or after transmitting the SN Request Acknowledge message (event 384).

Figure 3E:
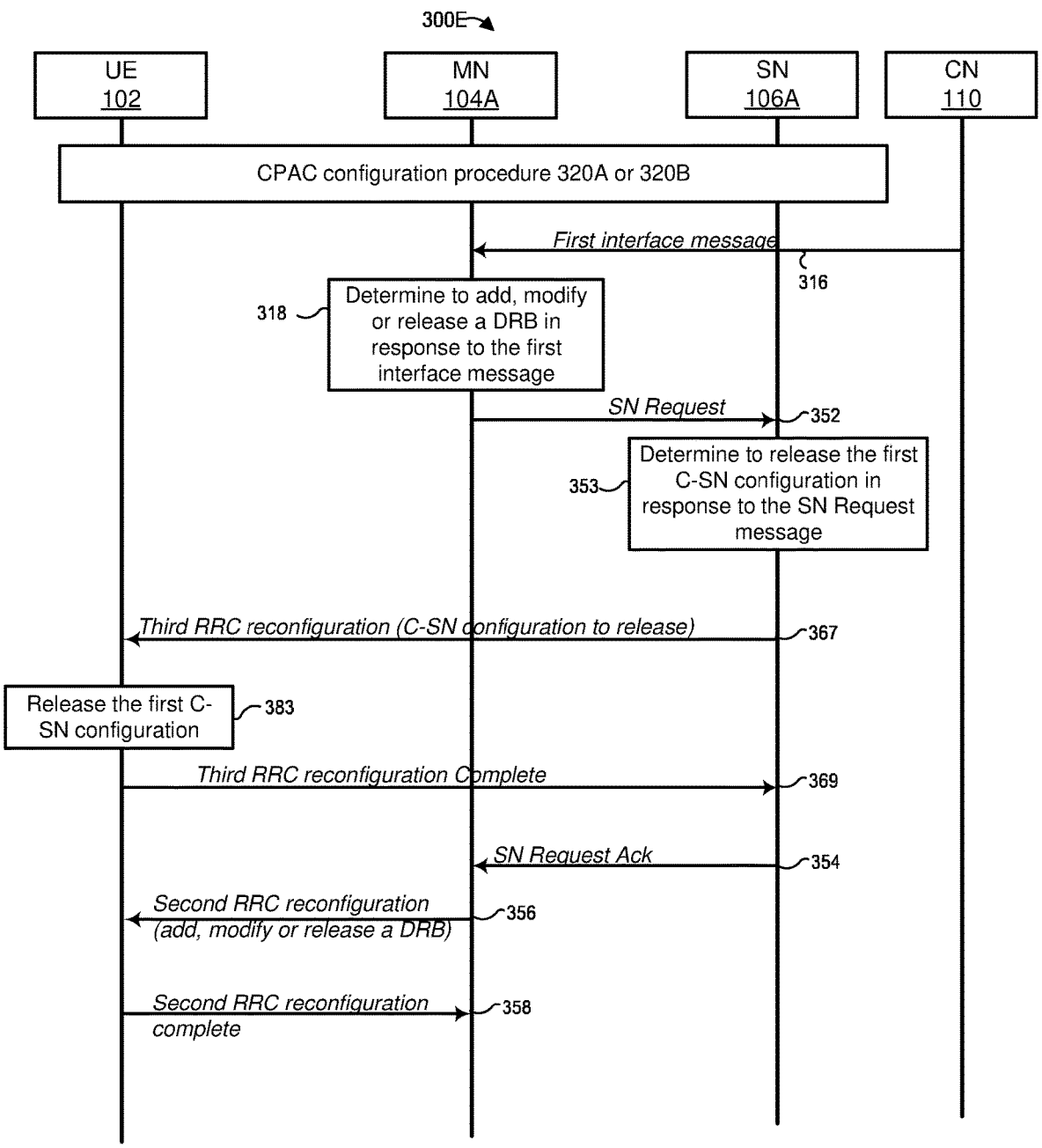
FIG. 3E is a messaging diagram of another example scenario similar to the scenarios of FIGS. 3A and 3B, but where a base station configures the UE to release a C-SN configuration in response to addition, modification or release of a DRB.

Now referring to FIG. 3E, a scenario 300E involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3A-3C and FIG. 3E are discussed below.

In the scenario 300E, in response to the determination 353, the SN 106A generates a third RRC reconfiguration message which includes the C-SN configuration to release field/IE. Then the SN 106A directly transmits 367 the third RRC reconfiguration message to the UE 102, e.g., via the first SRB (e.g., SRB3). The UE 102 transmits 369 a third RRC reconfiguration complete message to the SN 106A, e.g., via the first SRB in response to the third RRC reconfiguration message. The SN 106A may send the third RRC reconfiguration message before, during or after transmitting the SN Request Acknowledge message (event 354). The SN 106A may receive the second RRC reconfiguration complete message before, during or after transmitting the SN Request Acknowledge message (event 354).

When the SN 106A is implemented as an ng-eNB, the third RRC reconfiguration message is a RRCConnectionReconfiguration message, and the third RRC reconfiguration complete message is a RRCConnectionReconfigurationComplete message. When the SN 106A is implemented as a gNB, the third RRC reconfiguration message is an RRCReconfiguration message, and the third RRC reconfiguration complete message is an RRCReconfigurationComplete message.

Figure 3F:
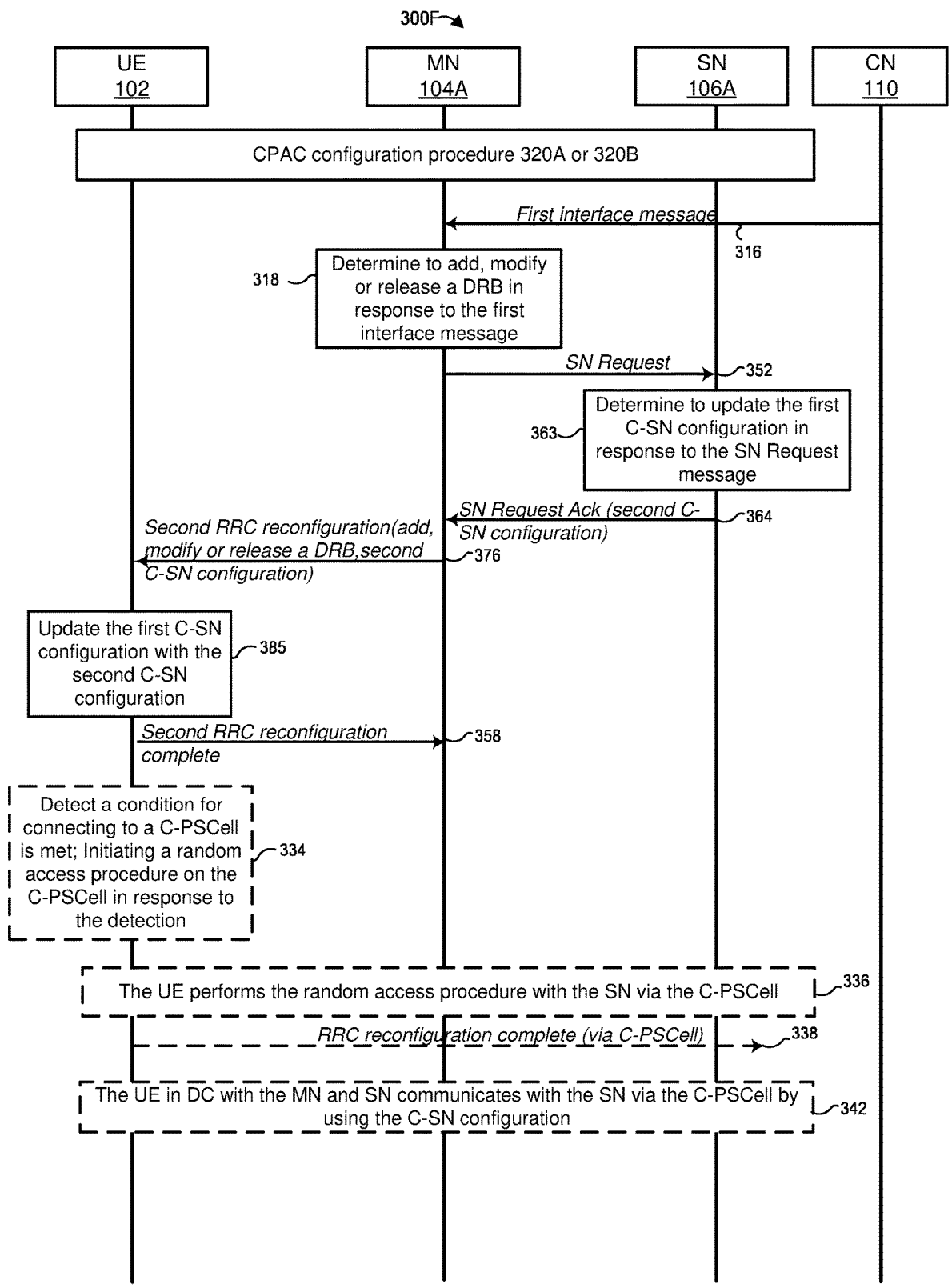
FIG. 3F is a messaging diagram of an example scenario similar to the scenarios of FIGS. 3A and 3B, but where a base station updates a first C-SN configuration in the UE with a second C-SN configuration in response to addition, modification or release of a DRB.

Now referring to FIG. 3F, a scenario 300F involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3A-3C and FIG. 3F are discussed below.

In the scenario 300F, the SN 106A determines 363 to update the first C-SN configuration in response to the SN Request message (event 352). In response to the determination, the SN 106A generates an SN Request Acknowledge message including a second C-SN configuration and sends 364 the SN Request Acknowledge message to the MN 104A. The MN 104A transmits 376 a second RRC reconfiguration message which adds, modifies or releases the DRB and includes the second C-SN configuration. The UE 102 updates 385 the first C-SN configuration with the second C-SN configuration in response to the second RRC reconfiguration message. The second RRC reconfiguration message at event 376 is similar to the second RRC reconfiguration message at event 366 of the scenario 300C, except the second RRC reconfiguration at event 366 releases the first C-SN configuration.

In some implementations, the SN 106A at event 363 generates a second conditional configuration including the second C-SN configuration and generates the second RRC reconfiguration message including the second conditional configuration. The SN 106A includes the second RRC reconfiguration in the SN Request Acknowledge message at event 364. The SN 106A may assign a second configuration ID for identifying the second conditional configuration or the second C-SN configuration and include the second configuration ID in the second conditional configuration. The SN 106A assigns a value of the second configuration ID which is the same as the value of the first configuration ID or assigns a value of the second configuration different from the value of the first configuration ID. In other implementations, the SN 106A includes the second conditional configuration in the SN Request Acknowledge message at event 364. The MN 104A generates the second RRC reconfiguration message including the second conditional configuration. In yet other implementations, the SN 106A includes the second conditional configuration in the SN Request Acknowledge message at event 364. The MN 104A or the SN 106A generate a fourth RRC reconfiguration message including the second conditional configuration and includes the fourth RRC reconfiguration message in the SN Request Acknowledge message at event 364. In turn, the MN 104 generates the second RRC reconfiguration message including the fourth RRC reconfiguration message and transmits the second RRC reconfiguration message at event 376. In the second RRC reconfiguration complete message, the UE 102 may or may not include a fourth RRC reconfiguration complete message to respond to the fourth RRC reconfiguration message. In this case, the second RRC reconfiguration message can be an RRC container message and the second RRC reconfiguration complete message can be an RRC container response message as similarly described above.

In some implementations, the UE 102 replaces the first C-SN configuration with the second C-SN configuration, i.e., the UE 102 releases the first C-SN configuration and stores the second C-SN configuration. In other implementations, the UE 102 replaces the first conditional configuration with the second conditional configuration, i.e., the UE 102 releases the first conditional configuration and stores the second conditional configuration. In one implementation, the MN 104A or the SN 106A may include the C-SN configuration to release field/IE to release the first C-SN configuration (or the first conditional configuration) in the second RRC reconfiguration message or the fourth RRC reconfiguration message. In another implementation, neither the MN 104A nor the SN 106A includes the C-SN configuration to release field/IE to release the first C-SN configuration (or the first conditional configuration) in the second RRC reconfiguration message or the fourth RRC reconfiguration message. In this case, the second configuration ID in the second conditional configuration has the same value as the first configuration ID in the first conditional configuration so that the UE 102 can identify the first C-SN configuration or the first conditional configuration to replace.

Optionally, the UE 102 may detect (or determines) 334 a condition for connecting to a C-PSCell 126A is met at a later time and initiates a random access procure on the C-PSCell 126A in response to the detection. For convenience, this discussion may refer to the condition or a configuration in singular, but it will be understood that there may be multiple conditions, and that the conditional configuration can include one or multiple configuration parameters to specify the condition or the multiple conditions. The UE 102 then performs 336 the random access procedure with the SN 106A via the C-PSCell 126A, e.g., by using one or more random access configurations in the second C-SN configuration. The UE 102 may transmit 338 an RRC reconfiguration complete message via the C-PSCell 126A during or after the random access configuration to connect to the C-PSCell 126A. Alternatively, the UE 102 may transmit 338 the RRC reconfiguration complete message to the MN 104A and in turn, the MN 104A may send the RRC reconfiguration complete message to the SN 106A. If the UE 102 successfully completes the random access procedure, the UE 102 communicates 342 with the SN 106A via the C-PSCell 126A by using configurations in the C-SN configuration. If the SN 106A identifies the UE 102 in the random access procedure, the SN 106A communicates with the UE 102 via the C-PSCell 126A. The UE 102 may disconnect from the PSCell to perform the random access procedure, i.e., to connect the C-PSCell 126A.

In some implementations, the random access procedure can be a four-step random access procedure or a two-step random access procedure. In other implementations, the random access procedure can be a contention-based random access procedure or a contention-free random access procedure. After the UE 102 successfully completes 336 the random access procedure, the C-PSCell 126A begins to operate as the PSCell 126A, and the UE 102 begins to operate 342 in DC with the MN 104A via the PCell 124A and the SN 106A via the PSCell 126A. In particular, the UE 102 communicates 342 with the SN 106A via the C-PSCell 126A (i.e., new PSCell 126A) in accordance with the second C-SN configuration for the CPAC.

The SN 106A in some cases can include the CU 172 and one or more DUs 174 as illustrated in FIG. 1C. The UE communicates 302 with the SN via a first DU 174 operating the PSCell. The CU 172 may send a UE Context Setup Request message or a UE Context Modification Request message to a second DU 174 operating the C-PSCell 126A in response to the determination 363. In response to the UE Context Setup Request message or UE Context Modification Request message, the second DU 174 may generate the second C-SN configuration or part of the second C-SN configuration and send the second C-SN configuration or part of the second C-SN configuration to the CU 172 in a UE Context Setup Response message or a UE Context Modification Response message. When the second DU 174 generates a portion of the second C-SN configuration, the CU 172 may generate the rest of the second C-SN configuration. The UE 102 performs 336 the random access procedure with the second DU 172 and the second DU 174 may identify the UE 102 in the random access procedure. The second DU 174 may send an indication (e.g., Downlink Data Delivery Status message) to the CU 172 if the second DU 174 may identify the UE 102 in the random access procedure. The second DU 174 may receive 338 the RRC reconfiguration complete message via the C-PSCell from the UE 102 during or after the random access procedure. In turn, the second DU 174 may include the RRC reconfiguration complete in a F1 application protocol (F1AP) message (e.g., UL RRC Message Transfer message) and send the F1AP message to the CU 172. The CU 172 communicates 342 with the UE via the second DU 174 in response to the F1AP message or the RRC reconfiguration complete message 338. The CU 172 may send a UE Context Release Command message to the first DU 174 to command the first DU 174 to release a UE context of the UE 102 in response to the indication or the RRC reconfiguration complete message 338 in the F1AP message or received from the MN 104A. In response to the UE Context Release Command message, first DU 174 releases the UE context of the UE 102 and sends a UE Context Release Complete message. The CU 172 may start to transmit DL PDUs (e.g., PDCP PDUs) to the UE 102 via the C-PSCell 126A of the first DU 174 or the second DU 174 in response to the indication (e.g., Downlink Data Delivery Status message) or the RRC reconfiguration complete message 338. The second DU 174 and the first DU 174 can be the same DU 174 if the first DU 174 operates the C-PSCell 126A. Otherwise, the second DU 174 and the first DU 174 are different DUs.

Example implementations of the second C-SN configuration can be similar to the first C-SN configuration. Example implementations of the second conditional configuration can be similar to the first conditional configuration. In some implementations, the MN 104A or the SN 106A can include the condition or a new condition for the UE 102 to evaluate in the second conditional configuration or the second RRC reconfiguration message. The UE 102 reuses the condition or uses the new condition in the second conditional configuration or the second RRC reconfiguration message at event 334. In other implementations, neither the MN 104A nor the SN 106A includes a condition for the UE 102 to evaluate in the second conditional configuration or the second RRC reconfiguration message so that the UE 102 reuses the condition in the first conditional configuration or the first RRC reconfiguration message at event 334.

Figure 3G:
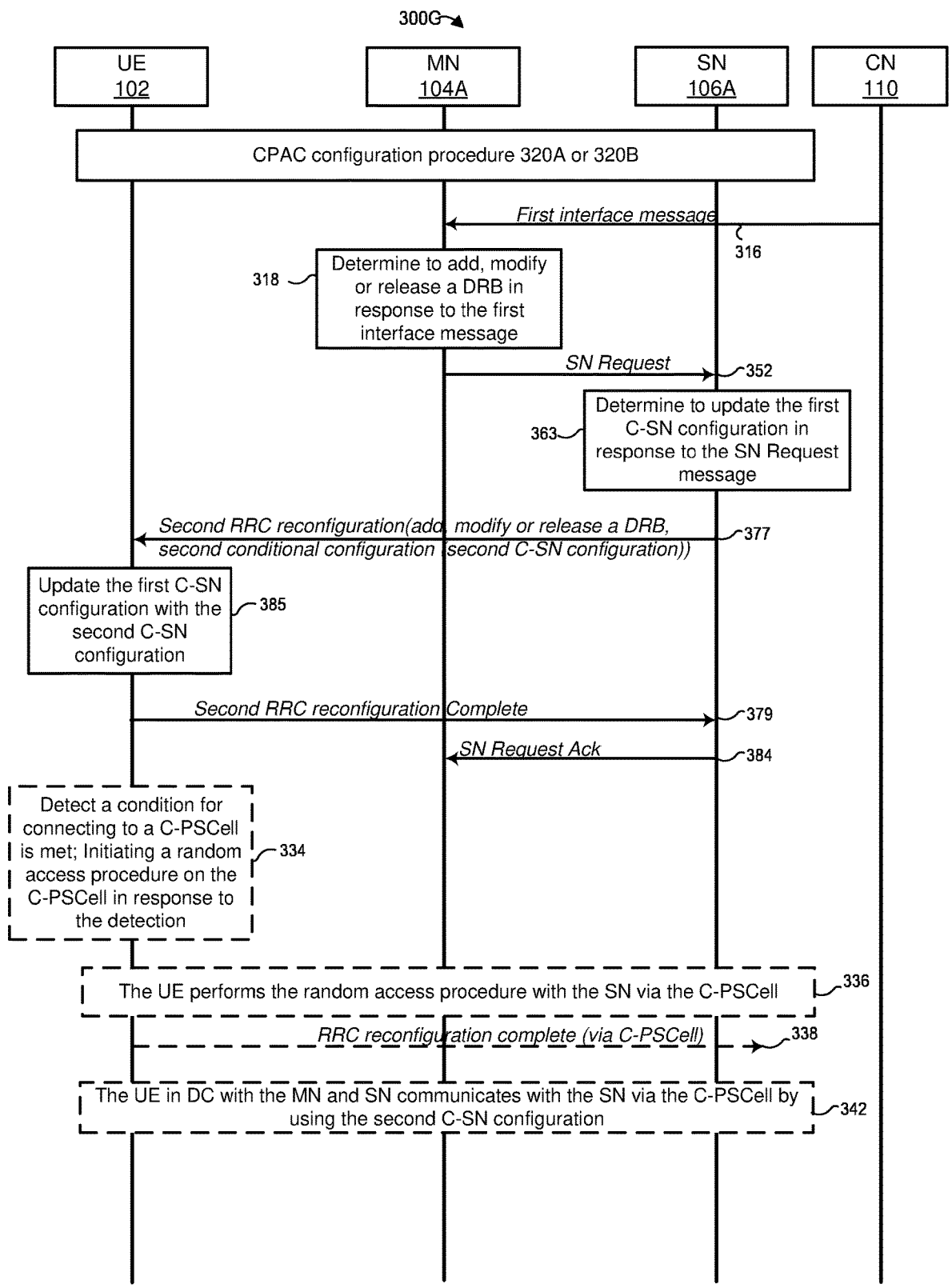
FIG. 3G is a messaging diagram of another example scenario similar to the scenarios of FIGS. 3A and 3B, but where a base station updates a first C-SN configuration in the UE with a second C-SN configuration in response to addition, modification or release of a DRB.

Now referring to FIG. 3G, a scenario 300G involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3D-3F and FIG. 3G are discussed below.

In the scenario 300G, in response to the determination 363, the SN 106A generates the second RRC reconfiguration message which adds, modifies or releases the DRB, and includes the second conditional configuration in the second RRC reconfiguration message. Then the SN 106A directly transmits 377 the second RRC reconfiguration message to the UE 102 via the first SRB. The UE 102 transmits 379 the second RRC reconfiguration complete message to the SN 106A via the first SRB in response to the second RRC reconfiguration message. The SN 106A may send the second RRC reconfiguration message before, during or after transmitting the SN Request Acknowledge message (event 384). The SN 106A may receive the second RRC reconfiguration complete message before, during or after transmitting the SN Request Acknowledge message (event 384).

Figure 3H:
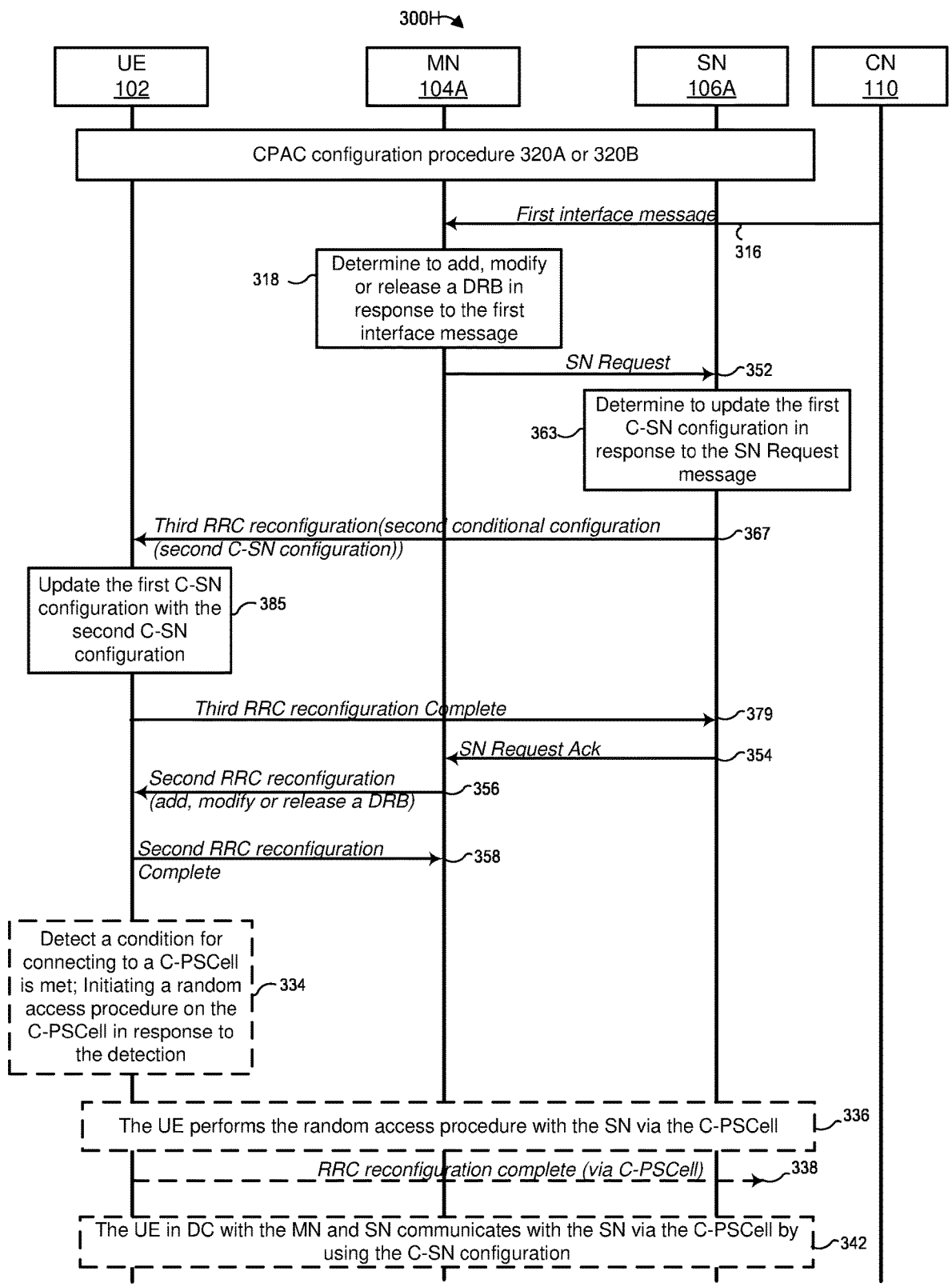
FIG. 3H is a messaging diagram of another example scenario similar to the scenarios of FIGS. 3A and 3B, but where a base station updates a first C-SN configuration in the UE with a second C-SN configuration in response to addition, modification or release of a DRB.

Now referring to FIG. 3H, a scenario 300H involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3F-3G and FIG. 3H are discussed below.

In the scenario 300H, in response to the determination 363, the SN 106A generates a third RRC reconfiguration message which includes the second conditional configuration. Then the SN 106A directly transmits 367 the third RRC reconfiguration message to the UE 102, e.g., via the first SRB (e.g., SRB3). The UE 102 transmits 369 a third RRC reconfiguration complete message to the SN 106A, e.g. via the first SRB, in response to the third RRC reconfiguration message. The SN 106A may send the third RRC reconfiguration message before, during or after transmitting the SN Request Acknowledge message (event 354). The SN 106A may receive the second RRC reconfiguration complete message before, during or after transmitting the SN Request Acknowledge message (event 354).

Several example scenarios involving CSAC are discussed next with reference to FIGS. 4A-C.

Figure 4A:
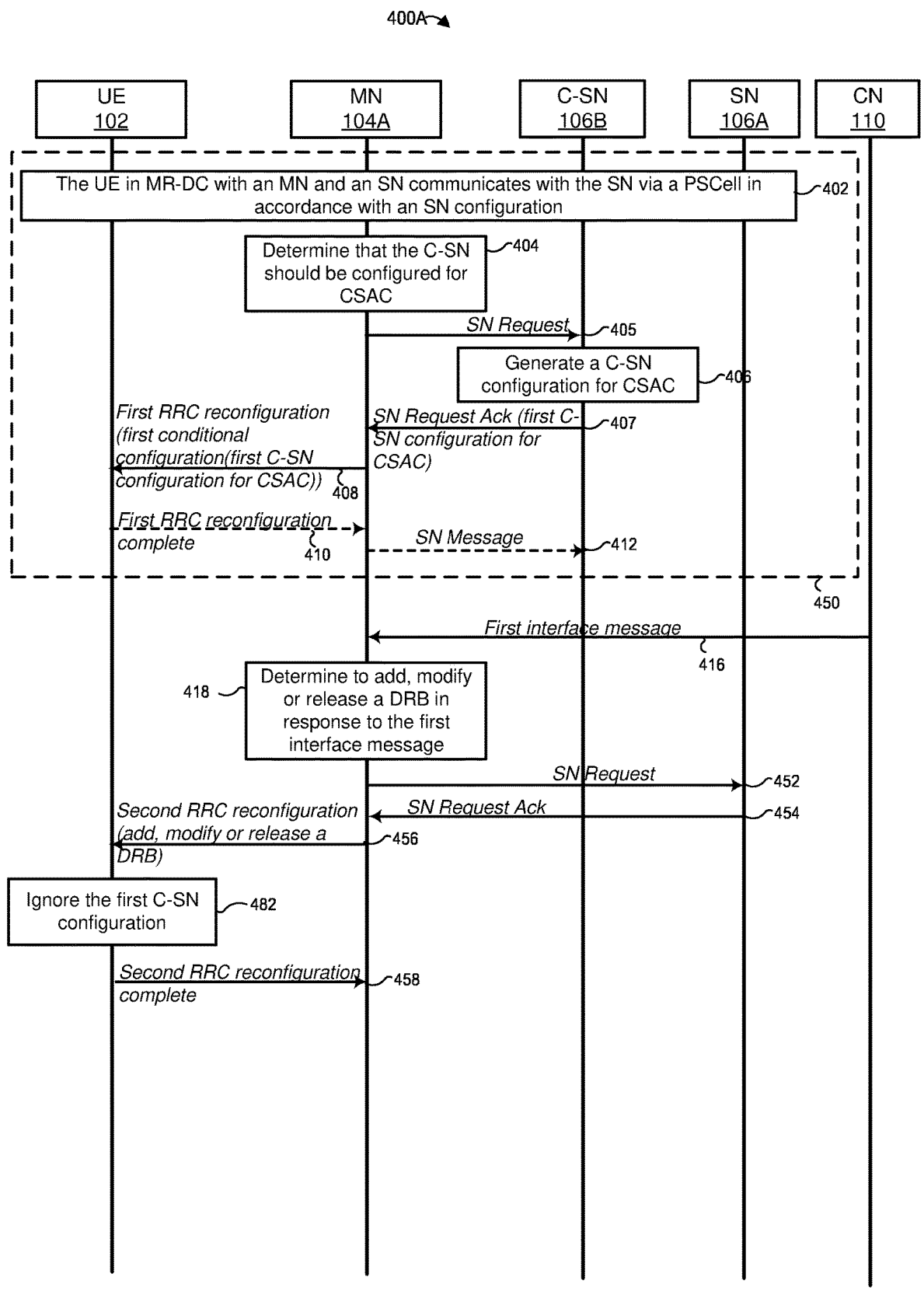
FIG. 4A is a messaging diagram of an example scenario in which the MN of FIG. 1A or 1B initiates a conditional SN addition or change (CSAC) configuration procedure to configure a candidate secondary node (C-SN) configuration and the UE ignores the C-SN configuration in response to addition, modification or release of a DRB, in accordance with the techniques of this disclosure.

Referring first to a scenario 400A of FIG. 4A, which involves a CSAC, i.e., a conditional change of a PSCell of an SN to a C-PSCell of a C-SN when the UE is already in DC with the MN and SN. In this scenario, the base station 104A operates as an MN, the base station 106A operates as an SN, and the base station 106B operates as a C-SN. At the beginning of this scenario, the UE 102 operates 402 in DC with the MN 104A and SN 106A and communicates UL PDUs and/or DL PDUs with MN 104A via a PCell, and communicates UL PDUs and/or DL PDUs with the SN 106A via a PSCell (i.e., a cell other than cell 126A). Events 402, 416, 418, 452, 454, 456, 458 and 482 are similar to events 302, 316, 318, 352, 354, 356, 358 and 382. The differences between the scenarios of FIG. 3A and FIG. 4A are discussed below.

The MN 104A determines 404 that it should configure the base station 106B as a C-SN for CSAC, such that the SN for the UE 102 would change from the SN 106B to the C-SN 106B. The MN 104A may determine that it should do so based on measurement result(s) from the UE 102, for example, or in response to an indication that the SN 106A requires a conditional SN change (e.g., SN Change Required message), which the SN 106A can send to the MN 104A. More intelligently, the MN 104A or SN 106A can derive or estimate the UE 102 is moving toward coverage of the cell 126B or the base station 106B according to uplink signals received from the UE 102 or positioning measurement result(s) received from the UE 102 so that the MN 104A can make the determination or the SN 106A sends the indication to the MN 104A. In response to the determination, the MN 104A sends 405 an SN Request message to the C-SN 106A for the CSAC. In response to receiving 405 the SN Request message, the C-SN 106B determines 406 that it should generate a first C-SN configuration for CSAC for the UE 102. The C-SN 106B transmits 407 an SN Request Acknowledge message including the first C-SN configuration for the CSAC to the MN 104A. The first C-SN configuration can include a configuration for a C-PSCell (e.g., C-PSCell 126B) and for zero, one, or more C-SCells. In some implementations, the MN 104A may include the first C-SN configuration message in an RRC container message. The MN 104A then includes the first C-SN configuration for CSAC or the RRC container message in a first conditional configuration field/IE and transmits 408 a first RRC reconfiguration message including the first conditional configuration field/IE to the UE 102. In some implementations, the UE 102 transmits 410 a first RRC reconfiguration complete message to the MN 104A in response to the first RRC reconfiguration message. The MN 104A can transmit 412 an SN message (e.g., SN Reconfiguration Complete message or SN Change Confirm message) to the C-SN 106B in response to the first RRC reconfiguration complete message. Events 402-412 collectively define a CSAC configuration procedure 450.

In this example scenario, the MN 104A can transmit the first RRC reconfiguration message including the first conditional configuration including the first C-SN configuration only or, alternatively, the first conditional configuration including (i) the first C-SN configuration and (ii) at least one trigger condition. Additionally, the MN 104A can include a configuration ID in the first conditional configuration for identifying the first C-SN configuration or the first conditional configuration.

In some implementations, the C-SN 106B includes a radio bearer configuration for the conditional configuration in the SN Request Acknowledge message in event 407, and in turn the MN 104A may include the radio bearer configuration in the first RRC reconfiguration message in event 408. The MN 104A may include the radio bearer configuration at the level of the first RRC reconfiguration message, at the level of the first conditional configuration or at the level of the RRC container message described above.

When transmitting 408 the first RRC reconfiguration message to the UE 102, the MN 104A can specify a condition that must be satisfied before the UE 102 applies the first C-SN configuration for CSAC. The MN 104A can specify this condition at the level of the first RRC reconfiguration message, at the level of the RRC container message, at the level of the first conditional configuration, or at the level of the first C-SN configuration for CSAC. In the first conditional configuration, the MN 104A for example can include a first configuration ID to identify the first C-SN configuration for CSAC.

In some implementations, the SN Request message 405 can be an SN Addition Request message, and the SN Request Acknowledge message 407 can be an SN Addition Request Acknowledge message. In other implementations, the SN Request message 405 can be an SN Modification Request message, and the SN Request Acknowledge message 407 can be an SN Modification Request Acknowledge message. In some implementations, the MN 104A indicates to the base station 106B, in the SN Request message 405, that the MN 104A requests that the base station 106A operate as a C-SN for the UE 102. The UE 102 may determine or identify that the first conditional configuration includes the first C-SN configuration so that the UE 102 may apply the first C-SN configuration for the CSAC to communicate with the C-SN 106B.

In some implementations, the C-SN 106B specifies the one or more conditions ("trigger condition") in the C-SN configuration for CSAC. In other implementations, the MN 104A includes the C-SN configuration along with the one or more conditions in the first conditional configuration or in the first RRC reconfiguration message. The MN 104A may generate the first conditional configuration for the UE 102A or receive the first conditional configuration from the C-SN 106B at event 407.

In some implementations, the MN 104A may determine to release the first C-SN configuration in response to the first interface message or the determination 418. In response to the determination, the MN 104A may send a Conditional SN Request message to indicate to the C-SN 106B to release the first C-SN configuration and to send a Conditional SN Request Acknowledge message to the MN 104A in response. In some implementations, the Conditional SN Request message can be an SN Release Request message and the Conditional SN Request Acknowledge message can be an SN Release Request Acknowledge message. In other implementations, the Conditional SN Request message can be an SN Modification Request message and the Conditional SN Request Acknowledge message can be an SN Modification Request Acknowledge message.

In some implementations, the C-SN configuration includes a group configuration (CellGroupConfig) IE that configures the C-PSCell 126B and zero, one, or more C-SCells of the C-SN 106B. In one implementation, the C-SN configuration can be a RRCReconfiguration message, RRCReconfiguration-IEs or the CellGroupConfig IE conforming to 3GPP TS 38.331. In other implementations, the C-SN configuration includes a SCG-ConfigPartSCG-r12 IE that configures the C-PSCell and may configure zero, one, or more C-SCells of the C-SN 106B. In one implementation, the C-SN configuration is an RRCConnectionReconfiguration message, RRCConnectionReconfiguration-IEs or the ConfigPartSCG-r12 IE conforming to 3GPP TS 36.331.

In some implementations, the C-SN 106B can include a CU 172 and one or more DUs 174 as illustrated in FIG. 1C. The CU 172 receives the SN Request message from the MN 104A and sends the SN Request Acknowledge message. The CU 172 may send a UE Context Setup Request message to the DU 174 in response to the SN Request message. In response to the UE Context Setup Request message, the DU 174 may generate the first C-SN configuration or part of the first C-SN configuration (e.g., the identity of the UE 102, the dedicated random access preamble, the random access configuration) and send the first C-SN configuration or part of the first C-SN configuration to the CU 172 in a UE Context Setup Response message. When the DU 174 generates part of the first C-SN configuration, the CU 172 may generate the rest of the first C-SN configuration.

Figure 4B:
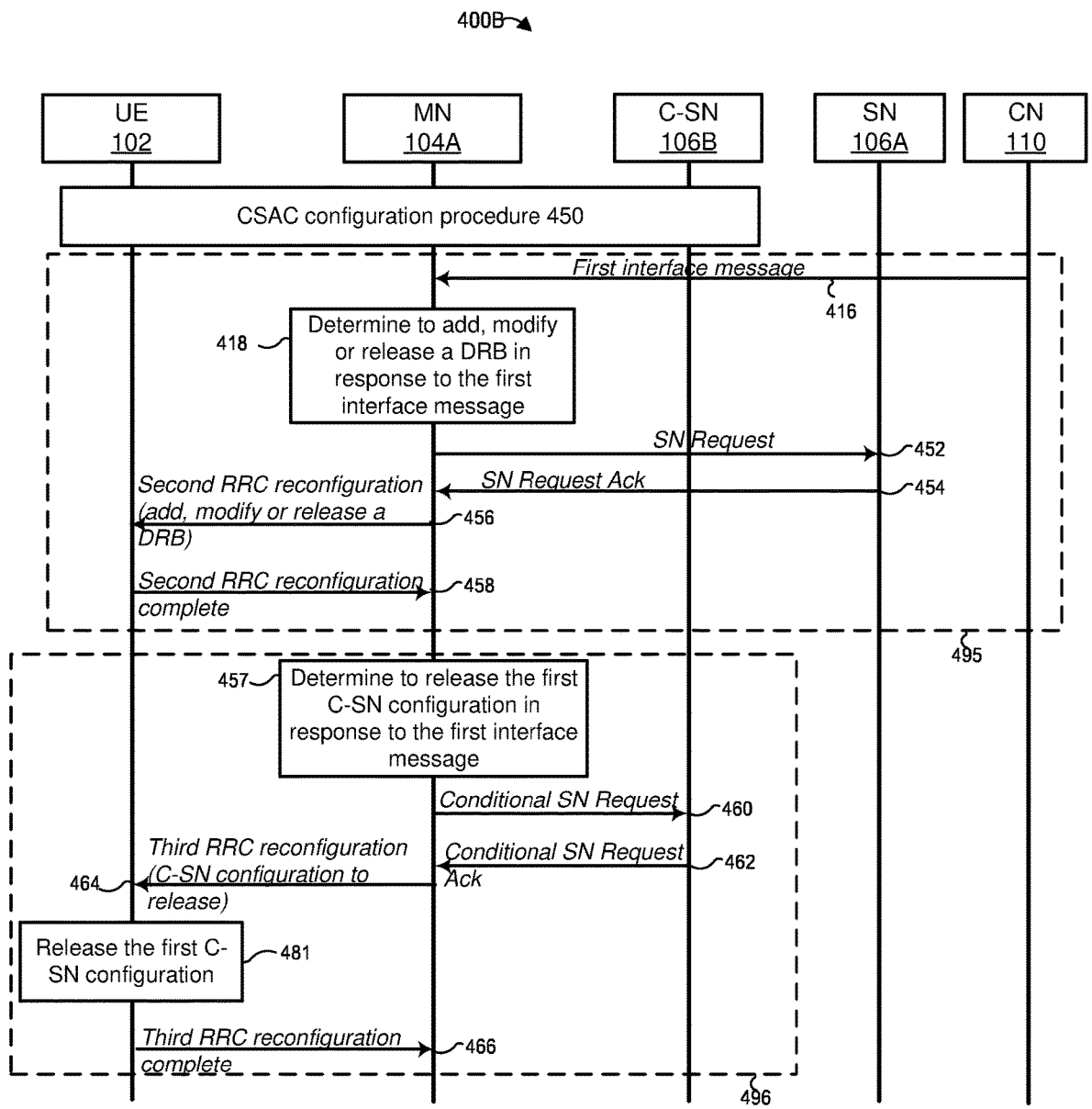
FIG. 4B is a messaging diagram of an example scenario similar to the scenario of FIG. 4A, but where a base station configures the UE to release a C-SN configuration in response to addition, modification or release of a DRB.

Now referring to FIG. 4B, a scenario 400B involves a CSAC, i.e., a conditional change of a PSCell of an SN to a C-PSCell of a C-SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIG. 4A and FIG. 4B are discussed below.

In the scenario 400B, the UE 102 does not release the first C-SN configuration in response to the second RRC reconfiguration message (event 456) if the second RRC reconfiguration does not include a C-SN configuration to release field/IE which indicates to the UE 102 to release the C-SN configuration. The MN 104A determines 457 to release the first C-SN configuration in response to the first interface message or the determination 418. In response to the determination 457, the MN 104A may send 460 a Conditional SN Request message to indicate the C-SN 106B to release the first C-SN configuration and the C-SN 106B may send 462 a Conditional SN Request Acknowledge message to the MN 104A in response. In response to the determination 457, the MN 104A generates a third RRC reconfiguration message including the C-SN configuration to release field/IE, and transmits 464 the third RRC reconfiguration message to the UE 102. The UE 102 releases 481 the first C-SN configuration in response to the C-SN configuration to release field/IE and transmits 466 a third RRC reconfiguration complete message in response to the third RRC reconfiguration message. Events 416, 418, 452, 454, 456 and 458 collectively define a DRB reconfiguration procedure 495. Events 457, 460, 462, 464, 481 and 466 collectively define a conditional configuration release procedure 496. The DRB reconfiguration procedure 495 and the conditional configuration release procedure 496 can be performed in any order or in parallel.

In some implementations, the MN 104A includes the C-SN configuration to release field/IE in the second RRC reconfiguration message which adds, modifies or releases a DRB. Therefore, the MN 104A does not transmit the third RRC reconfiguration message and the UE 102 does not transmit the third RRC reconfiguration complete message. The UE 102 releases 481 the first C-SN configuration in response to the C-SN configuration to release field/IE in the second RRC reconfiguration message.

The C-SN configuration to release field/IE may include the first configuration ID so that the UE 102 can use the C-SN configuration to release field/IE (or the first configuration ID) to identify and release the first C-SN configuration or the first conditional configuration including the first C-SN configuration.

In some implementations, the MN 104A may include the C-SN configuration to release field/IE in the radio bearer configuration, the cell group configuration or in the second or third RRC reconfiguration message. In some implementations, the Conditional SN Request message can be an SN Release Request message and the Conditional SN Request Acknowledge message can be an SN Release Request Acknowledge message. In other implementations, the Conditional SN Request message can be an SN Modification Request message and the Conditional SN Request Acknowledge message can be an SN Modification Request Acknowledge message.

When the MN 104A is implemented as an eNB or ng-eNB, the third RRC reconfiguration message is a RRCConnectionReconfiguration message, and the third RRC reconfiguration complete message is a RRCConnectionReconfigurationComplete message. When the MN 104A is implemented as a gNB, the third reconfiguration messages is a RRCReconfiguration message, and the third RRC reconfiguration complete message is a RRCReconfigurationComplete message.

Figure 4C:
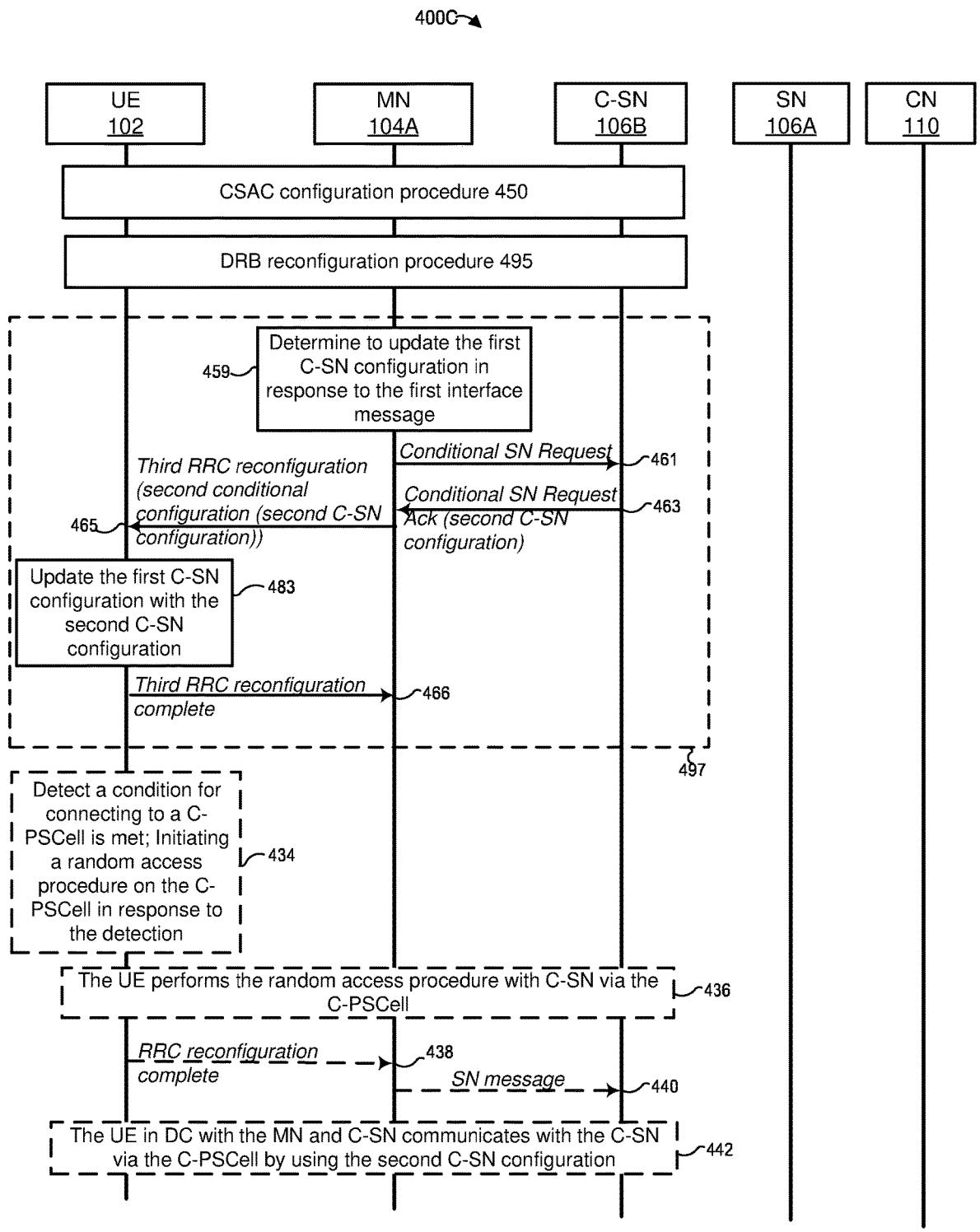
FIG. 4C is a messaging diagram of an example scenario similar to the scenario of FIG. 4A, but where a base station updates a first C-SN configuration in the UE with a second C-SN configuration in response to addition, modification or release of a DRB.

Now referring to FIG. 4C, a scenario 400C involves a CSAC, i.e., a conditional change of a PSCell of an SN to a C-PSCell of a C-SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3F, 4A-4B and FIG. 4C are discussed below.

The MN 104A determines 459 to update the first C-SN configuration in response to the first interface message or the determination 418. In response to the determination 459, the MN 104A may send 461 a Conditional SN Request message to indicate to the C-SN 106B to update the first C-SN configuration and the C-SN 106B may send a Conditional SN Request Acknowledge message including a second C-SN configuration to the MN 104A in response. In response to the Conditional SN Request Acknowledge message, the MN 104A generates a second conditional configuration field/IE including the second C-SN configuration and includes the second conditional configuration in a third RRC reconfiguration message. Then the MN 104A transmits 465 the third RRC reconfiguration message to the UE 102. The UE 102 updates 483 the first C-SN configuration or the first conditional configuration with the second C-SN configuration or the second conditional configuration, and transmits 467 a third RRC reconfiguration complete message in response to the third RRC reconfiguration message. Events 459, 461, 463, 465, 483 and 466 collectively define a conditional reconfiguration procedure 497. The DRB reconfiguration procedure 495 and the conditional reconfiguration procedure 497 can be performed in any order or in parallel.

The second C-SN configuration can include a configuration for a C-PSCell (e.g., C-PSCell 126B) and for zero, one, or more C-SCells. In some implementations, the MN 104A may include the second C-SN configuration message in an RRC container message. The MN 104A then includes the second C-SN configuration for CSAC or the RRC container message in a second conditional configuration field/IE and transmits 465 the first RRC reconfiguration message including the second conditional configuration field/IE to the UE 102. In some implementations, the UE 102 transmits 466 the third RRC reconfiguration complete message to the MN 104A in response to the third RRC reconfiguration message. The MN 104A can transmit an SN message (e.g., SN Reconfiguration Complete message) to the C-SN 106B in response to the third RRC reconfiguration complete message.

In some implementations, the MN 104A includes the second C-SN configuration in the second RRC reconfiguration message which adds, modifies or releases a DRB, in a similar way as the third RRC reconfiguration message. Therefore, the MN 104A does not transmit the third RRC reconfiguration message and the UE 102 does not transmit the third RRC reconfiguration complete message. The UE 102 updates 483 the first C-SN configuration or the first conditional configuration with the second C-SN configuration or the second conditional configuration in response to the second RRC reconfiguration message.

When the MN 104A is implemented as an ng-eNB, the third RRC reconfiguration message is a RRCConnectionReconfiguration message, and the third RRC reconfiguration complete message is a RRCConnectionReconfigurationComplete message. When the MN 104A is implemented as a gNB, the third RRC reconfiguration message is a RRCReconfiguration message, and the third RRC reconfiguration complete message is a RRCReconfigurationComplete message.

In some implementations, the Conditional SN Request message can be an SN Addition Request message and the Conditional SN Request Acknowledge message can be an SN Addition Request Acknowledge message. In other implementations, the Conditional SN Request message can be an SN Modification Request message and the Conditional SN Request Acknowledge message can be an SN Modification Request Acknowledge message. In some implementations, the MN 104A may include the SN configuration in the SN Addition Request message. In other implementations, the MN 104A may not include the SN configuration in the SN Addition Request message. In one implementation, the MN 104A may include the cell identity associated to the first C-SN configuration in the Conditional SN Request message so that the C-SN 106B can use the cell identity to identify the first C-SN configuration based on the cell identity and update the first C-SN configuration with the second C-SN configuration. In another implementation, the MN 104A may include the first C-SN configuration in the Conditional SN Request message so that the C-SN 106B can identify the first C-SN configuration and update the first C-SN configuration with the second C-SN configuration.

In some implementations, the UE 102 replaces the first C-SN configuration with the second C-SN configuration, i.e., the UE 102 releases the first C-SN configuration and stores the second C-SN configuration. In other implementations, the UE 102 replaces the first conditional configuration with the second conditional configuration, i.e., the UE 102 releases the first conditional configuration and stores the second conditional configuration. In one implementation, the MN 104A may include the C-SN configuration to release field/IE to release the first C-SN configuration in the second RRC reconfiguration message or the third RRC reconfiguration message. In another implementation, the MN 104A does not include the C-SN configuration to release field/IE to release the first C-SN configuration in the second RRC reconfiguration message and the third RRC reconfiguration message. In this case, the second configuration ID in the second conditional configuration has the same value as the first configuration ID in the first conditional configuration so that the UE 102 can identify the first C-SN configuration or the first conditional configuration to replace.

Optionally, the UE 102 can detect 434 a condition for connecting to a C-PSCell 126B is met and initiates a random access procure on the C-PSCell 126B in response to the detection. For convenience, this discussion may refer to the condition or a configuration in singular, but it will be understood that there may be multiple conditions, and that the conditional configuration can include one or multiple configuration parameters to specify the condition or the multiple conditions. In any case, the UE 102 performs 436 the random access procedure with the C-SN 106B via the C-PSCell 126B using a random access configuration included in the second C-SN configuration. The UE 102 in DC may disconnect from the SN 106A (i.e., the PSCell and all of SCell(s) of the SN 106A if configured) in response to the event 434 or 436. The UE 102 may transmit 438 an RRC reconfiguration complete message to the MN 104A in response to the event 434 or 436. The UE 102 may transmit 438 the RRC reconfiguration complete message before or after the event 436 or while the UE 102 performs 436 the random access procedure. In response to the RRC reconfiguration complete message 438, the MN 104A may transmit 440 an SN message (e.g., SN Reconfiguration Complete message) to the C-SN 106B.

In some implementations, the random access procedure can be a four-step random access procedure or a two-step random access procedure. In other implementations, the random access procedure can be a contention-based random access procedure or a contention-free random access procedure. After the UE 102 successfully completes 436 the random access procedure, the C-SN 106B begins to operate as the SN 106B, and the UE 102 begins to operate 442 in DC with the MN 104A and the SN 106B. In particular, the UE 102 communicates 442 with the SN 106B via the C-PSCell 126B (i.e., new PSCell 126B) in accordance with the second C-SN configuration for the CSAC.

In some implementations, the C-SN 106B identifies the UE 102 if the C-SN 106B finds an identity of the UE 102 in a medium access control (MAC) protocol data unit (PDU) received from the UE 102 in the random access procedure (event 436). The C-SN 106B includes the identity of the UE 102 in the second C-SN configuration. In other implementations, the C-SN 106B identifies the UE 102 if the C-SN 106B receives a dedicated random access preamble from the UE 102 in the random access procedure. The C-SN 106B includes the dedicated random access preamble in the second C-SN configuration.

In some implementations, the C-SN 106B can include a CU 172 and one or more DUs 174 as illustrated in FIG. 1C. The CU 172 receives the SN Request message and the Conditional SN Request message from the MN 104A and sends the SN Request Acknowledge message and the Conditional SN Request Acknowledge message to the MN 104A in response. The CU 172 may send a UE Context Setup Request message or a UE Context Modification Request message to the DU 174 in response to the Conditional SN Request message. In response to the UE Context Setup Request message or UE Context Modification Request message, the DU 174 may generate the second C-SN configuration or part of the second C-SN configuration (e.g., the identity of the UE 102, the dedicated random access preamble, the random access configuration) and send the C-SN configuration or part of the C-SN configuration to the CU 172 in a UE Context Setup Response message or a UE Context Modification Response message. When the DU 174 generates part of the second C-SN configuration, the CU 172 may generate the rest of the second C-SN configuration. In one implementation, the DU 174 can perform the random access procedure (event 436) with the UE 102 and identify the UE 102 in the random access procedure. In response to the identification, the DU 174 communicates with the UE 102 using the second C-SN configuration or part of the second C-SN configuration. The DU 174 may send an indication (e.g., Downlink Data Delivery Status message) to the CU 172 if the DU 174 may identify the UE 102 in the random access procedure. In another implementation, the DU 174 can perform the random access procedure (event 436) with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the rest of the second C-SN configuration and part of the second C-SN configuration respectively.

If the C-SN 106B (or the DU 174) identifies the UE 102 on the C-PSCell 126B during the event 436, the C-SN 106B (or the DU 174) begins to transmit downlink control information (DCI) command(s) on physical downlink control channel(s) (PDCCH(s)), reference signal(s) or data to the UE 102 via the C-PSCell 126B and/or one or more C-SCells (if configured in the second C-SN configuration) according to some configuration parameters in the second C-SN configuration. If the C-SN 106B (or the DU 174) identifies the UE 102 on the C-PSCell 126B during the event 436, the C-SN 106B (or the DU 174) can receive signal(s) on physical uplink control channel(s) (PUCCH(s)), sounding reference signal(s) or data from the UE 102 via the C-PSCell 126B and/or one or more C-SCells (if configured in the second C-SN configuration) according to some configuration parameters in the second C-SN configuration. The UE 102 receives the DCI command(s) on PDCCH(s), reference signal(s) or data from the C-SN 106B (or the DU 174) via the C-PSCell 126B and/or one or more C-SCells (if configured in the C-SN configuration) according to some configuration parameters in the second C-SN configuration. The UE 102 may transmit signal(s) on PUCCH(s), sounding reference signal(s) or data to the C-SN 106B (or the DU 174) via the C-PSCell 126B and one or more C-SCells (if configured in the C-SN configuration) according to some configuration parameters in the second C-SN configuration. In response to the identification, the C-SN 106B becomes SN 106B and determines that the C-PSCell 126B becomes PSCell 126B and the one or more C-SCells becomes one or more SCells. The CU 172 may start to transmit DL PDUs (e.g., PDCP PDUs) to the UE 102 via the DU 174 in response to the indication (e.g., Downlink Data Delivery Status message), the SN message 440 or the RRC reconfiguration complete message 438 received from the MN 104A.

As described above, the MN 104A and C-SN 106B configures the C-PSCell (e.g., C-PSCell 126B) to the UE 102 during the events 461 and 463 in advance, before the C-PSCell 126B becomes suitable for the UE 102. When the C-PSCell becomes suitable for the UE 102 (i.e., the UE 102 detects the corresponding condition), the UE 102 performs the random access procedure with the C-PSCell to quickly change PSCell (i.e., change SN). In contrast to the immediate SN Change procedure, the conditional SN Change technique discussed in this disclosure significantly reduces latency associated with DC configuration.

Example implementations of the second C-SN configuration can be similar to the first C-SN configuration. Example implementations of the second conditional configuration can be similar to the first conditional configuration. In some implementations, the MN 104A can include the condition or a new condition for the UE 102 to evaluate in the second conditional configuration or the second RRC reconfiguration message. The UE 102 reuses the condition or use the new condition in the second conditional configuration or the second RRC reconfiguration message at event 434. In other implementations, the MN 104A does not include a condition for the UE 102 to evaluate in the second conditional configuration or the second RRC reconfiguration message so that the UE 102 reuses the condition in the first conditional configuration or the first RRC reconfiguration message at event 434.

Several example scenarios involving conditional handover (CHO) are discussed next with reference to FIGS. 5A-6C.

Figure 5A:
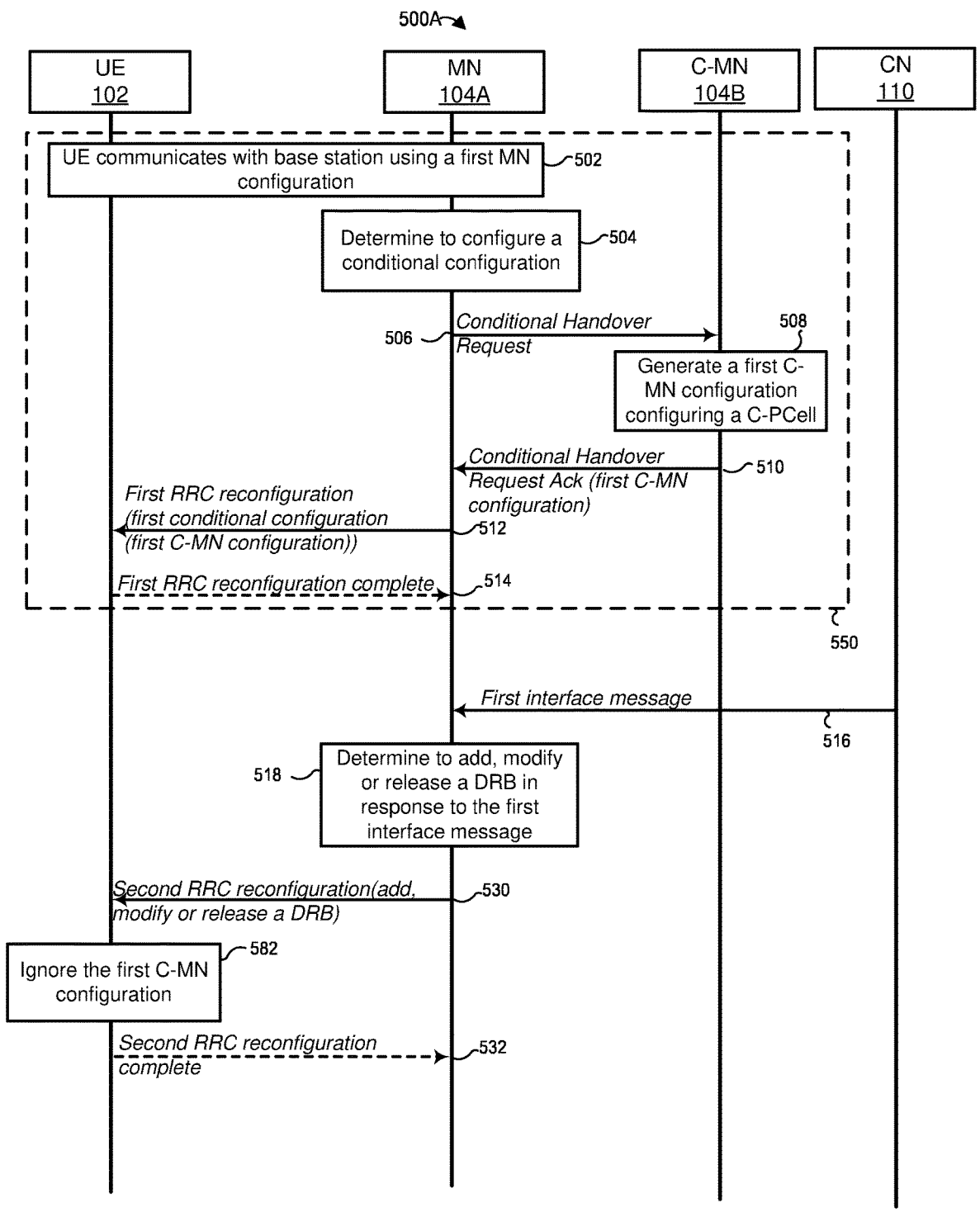
FIG. 5A is a messaging diagram of an example scenario in which the MN of FIG. 1A or 1B initiates a conditional handover (CHO) procedure to configure a candidate master node (C-MN) configuration and the UE ignores the C-MN configuration in response to addition, modification or release of a DRB, in accordance with the techniques of this disclosure.

FIG. 5A illustrates a scenario 500A that involves conditional handover. In this scenario, the base station 104A operates as an MN, and the base station 104B operates as a candidate base station (C-MN) for the conditional handover. Events 516 and 518 are similar to events 316 and 318.

In this scenario, the UE 102 communicates 502 with the MN 104A in accordance with an MN configuration. The UE 102 may be in SC with the MN 104A or in DC with the MN 104A and SN 106A. The MN 104A determines 504 that it should request a first C-MN configuration for the UE 102. The first C-MN configuration configures a candidate PCell (C-PCell) 124B of the C-MN 104B. The MN 104A can make this determination based on one or more measurement results received from the UE directly (e.g., via an SRB established between the UE 102 and the MN 104A or via a physical control channel), or obtained by the MN 104A from measurements of signals, control channels or data channels received from the UE 102, for example, or another suitable event. More intelligently, the MN 104A can derive or estimate the UE 102 is moving toward coverage of the cell 124B or the C-MN 104B according to uplink signals received from the UE 102 or positioning measurement result(s) received from the UE 102. In response to the determination, the MN 104A sends 506 a Conditional Handover Request message to the C-MN 104B.

In response to the Conditional Handover Request message, the C-MN 104B generates 508 a first C-MN configuration. The C-MN 104B then sends a 510 Conditional Handover Request Acknowledge message including the first C-MN configuration to the MN 104A. The MN 104A includes the first C-MN configuration in a first conditional configuration and transmits 512 a first RRC reconfiguration message including the first conditional configuration to the UE 102. The UE 102 may transmit 514 a first RRC reconfiguration complete message to the MN 104A in response to the first RRC reconfiguration message 512. The events 502-514 collectively can define a conditional handover procedure 550.

In some implementations, the Conditional Handover Request message can be a Handover Request message and the Conditional Handover Request Acknowledge message can be a Handover Request Acknowledge message as defined in 3GPP specification 36.423 or 38.423. The MN 104A may include a conditional handover request indication in the Handover Request message. In some implementations, the MN 104A may include the MN configuration in the Handover Request message. In other implementations, the MN 104A may not include the MN configuration in the Handover Request message.

In this example scenario, the MN 104A can transmit the first RRC reconfiguration message including the first conditional configuration including the first C-MN configuration only or, alternatively, the first conditional configuration including (i) the first C-MN configuration and (ii) at least one trigger condition. In some implementations, the MN 104A may assign a first configuration ID for identifying the first conditional configuration or the first C-MN configuration and include the first configuration ID in the first conditional configuration. Additionally, the MN 104A can include a configuration ID in the first conditional configuration for identifying the first C-MN configuration or the first conditional configuration.

At a later time, the MN 104A receives 516 a first interface message from a CN 110 (e.g., MME 114 or AMF 164). In response to the first interface message, the MN 104A determines 518 to add, modify, or release a DRB. The MN 104A may send a second interface message to the CN 110 in response to the first interface message. In one implementation, the MN 104A determines to add a new DRB in response to the first interface message. In another implementation, the MN 104A determines to modify or release an existing DRB configured to the UE 102 in response to the first interface message. For example, the MN 104A may determine to modify the DRB by modifying or releasing radio resources for the DRB. The radio resources may include one or more RLC bearers or quality of service (QoS) mapping configurations (e.g., adding a new QoS flow and mapping the new QoS flow to the existing DRB or releasing an existing QoS flow). In one implementation, the DRB can be an MN-terminated DRB. In another implementation, the DRB can be an SN-terminated DRB which utilizes radio resources of the SN 106A. The UE 102 may release or modify the radio resources in response to the second RRC reconfiguration message. In the following description, "add, modify or release a DRB" can represent "add a new DRB" or "modify or release an existing DRB".

In response to the determination 518, the MN 104A transmits 530 a second RRC reconfiguration message adding, modifying or releasing the DRB to the UE 102. The UE 102 ignores 582 the first C-MN configuration in response to the second RRC reconfiguration message adding, modifying or releasing the DRB. The UE 102 transmits 532 a second RRC reconfiguration complete message in response to the second RRC reconfiguration message. In the second RRC reconfiguration, the MN 104A does not include a C-MN configuration to release field/IE indicating to the UE 102 to release the first C-MN configuration.

The second RRC reconfiguration message can be generated by the MN 104A as described below. In some implementations, the MN 104A may generate a radio bearer configuration (e.g., RadioBearerConfig) IE which adds, modifies or releases a DRB. The MN 104A may generate the second RRC reconfiguration message and include the radio bearer configuration in the second RRC reconfiguration message.

In yet other implementations, the MN 104A may generate a cell group configuration (e.g., CellGroupConfig IE or RadioResourceConfigDedicated IE) which modifies a DRB, i.e., an existing DRB configured to the UE 102. The MN 104A includes the cell group configuration in the second RRC reconfiguration message.

Similar to the C-SN configuration discussed above, the first C-MN configuration can be a complete and self-contained configuration (i.e. full configuration). In the first C-MN configuration, the C-MN 104B may include a full configuration indication (an information element (IE) or a field) which indicates the first C-MN configuration is a complete and self-contained configuration (i.e. full configuration). If the UE 102 connects to the C-MN 104B, the UE 102 can directly use the first C-MN configuration to communicate with the C-MN 104B without referring to the previously received MN configuration. In other implementations, the first C-MN configuration can include one or more configurations on top of the MN configuration (i.e., delta configuration). If the UE 102 connects to the C-MN 104B, the UE 102 can use the first C-MN configuration together with the MN configuration to communicate with the C-MN 104B.

The first C-MN configuration can include multiple configuration parameters for the UE 102 to communicate with the C-MN 104B via the C-PCell 124B. The multiple configuration parameters may configure radio resources for the UE 102 to communicate with the C-MN 104B via the C-PCell 124B and zero, one, or more candidate secondary cells (C-SCells) of the C-MN 104B. The multiple configuration parameters may configure zero, one, or more radio bearers. The one or more radio bearers can include SRB(s) and/or DRB(s). The SRB(s) may include SRB1 and/or SRB2.

In some implementations, the C-MN 104B may be pre-configured to generate a complete configuration for a C-MN configuration and include a full configuration indication in the C-MN configuration. In other implementations, the C-MN 104B may determine to generate a complete configuration for a C-MN configuration and include a full configuration indication in the C-MN configuration if the C-MN 104B determines that the MN 104A is from a different manufacturer. In yet other implementations, the C-MN 104B may determine it should generate a complete configuration for a C-MN configuration and include a full configuration indication in the C-MN configuration if the C-MN 104B cannot generate a delta configuration for a C-MN configuration according to the MN configuration received 506 in the Conditional Handover Request message. For example, the MN 104A may indicate the MN configuration is not up-to-date so that the C-MN 104B cannot use the MN configuration to generate a delta configuration for a C-MN configuration. In further implementations, the MN 104A may instruct the C-MN 104B to generate a complete configuration for a C-MN configuration and include a full configuration indication in the C-MN configuration. In additional implementations, the C-MN 104B may determine it should generate a delta C-MN configuration in a Conditional Handover Request Acknowledge message during a conditional handover procedure if the C-MN 104B determines that the MN 104A operates from the same manufacturer or is pre-configured to do so.

Similar to the delta C-SN configuration, the delta C-MN configuration is not a complete configuration and does not include a full configuration indication. The UE 102 cannot use only the delta C-MN configuration to communicate with the C-MN 104B; the UE 102 must also refer to the MN configuration stored in the UE 102. The delta C-MN configuration can include one or multiple configuration parameters for the UE 102 to communicate with the C-MN 104B via the C-PCell 124B. The multiple configuration parameters may configure radio resources for the UE 102 to communicate with the C-MN 104B via the C-PCell 124B and zero, one, or more C-SCells of the C-MN 104B. The multiple configuration parameters may or may not configure zero, one, or more radio bearers. The one or more radio bearers can include an SRB and/or DRB(s). The multiple configuration parameters may or may not include a measurement configuration and/or a security configuration.

The MN configuration can include multiple configuration parameters for the UE 102 to communicate with the MN 104A via the PCell 124A and zero, one, or more secondary cells (SCells) of the MN 104A. The multiple configuration parameters may configure radio resources for the UE 102 to communicate with the MN 104A via the PCell 124A and zero, one, or more SCells of the MN 104A. The multiple configuration parameters may configure zero, one, or more radio bearers. The one or more radio bearers can include SRB(s) and/or DRB(s). The SRB(s) may include SRB1 and/or SRB2.

The MN 104A can include the condition for the UE 102 to evaluate in the first conditional configuration or the first RRC reconfiguration message.

Also, generally similar to the C-SN configuration, the first C-MN configuration can include a group configuration (CellGroupConfig) IE that configures the C-PCell 124B and may configure zero, one, or more C-SCells of the C-MN 104B. In one implementation, the first C-MN configuration can be a RRCReconfiguration message, RRCReconfiguration-IEs or the CellGroupConfig IE conforming to 3GPP TS 38.331. The full configuration indication may be a field or an IE conforming to 3GPP TS 38.331. In other implementations, the first C-MN configuration can include a RadioResourceConfigDedicated IE and/or a MobilityControlInfo IE configuring the C-PCell 124B and may or may not include SCellToAddModList IE configuring one or more C-SCells of the C-MN 104B. In one implementation, the first C-MN configuration can be a RRCConnectionReconfiguration message or RRCConnectionReconfiguration-IEs conforming to 3GPP TS 36.331. The full configuration indication may be a field or an IE conforming to 3GPP TS 36.331.

In some implementations, the MN configuration can include a CellGroupConfig IE that configures the PCell 124A and may configure zero, one, or more SCells of the MN 104A. In one implementation, the MN configuration is an RRCReconfiguration message, RRCReconfiguration-IEs or the CellGroupConfig IE conforming to 3GPP TS 38.331. In other implementations, the MN configuration can include a RadioResourceConfigDedicated IE and/or a MobilityControlInfo IE configuring the PCell 124A and may or may not include SCellToAddModList IE configuring one or more SCells of the MN 104A.

If the MN 104A is implemented as a gNB, the first and second RRC reconfiguration messages and the first and second RRC reconfiguration complete messages can be RRCReconfiguration messages and RRCConnectionReconfigurationComplete messages, respectively. If the MN 104A is implemented as an eNB or a ng-eNB, the first and second RRC reconfiguration messages and the first and second RRC reconfiguration complete messages can be implemented as RRCReconfiguration messages and RRCConnectionReconfigurationComplete messages, respectively.

In some implementations, the C-MN 104B can include a CU 172 and one or more DU 174 as shown in FIG. 1B. The CU 172 receives the Conditional Handover Request message from the MN 104A and sends the Conditional Handover Request Acknowledge message. The CU 172 may send a UE Context Setup Request message to the DU 174 in response to the Conditional Handover Request message. In response to the UE Context Setup Request message, the DU 174 may generate the first C-MN configuration or part of the first C-MN configuration and send the first C-MN configuration or part of the first C-MN configuration to the CU 172 in a UE Context Setup Response message. When the DU 174 generates the part of the first C-MN configuration, the CU 172 may generate the rest of the first C-MN configuration.

Figure 5B:
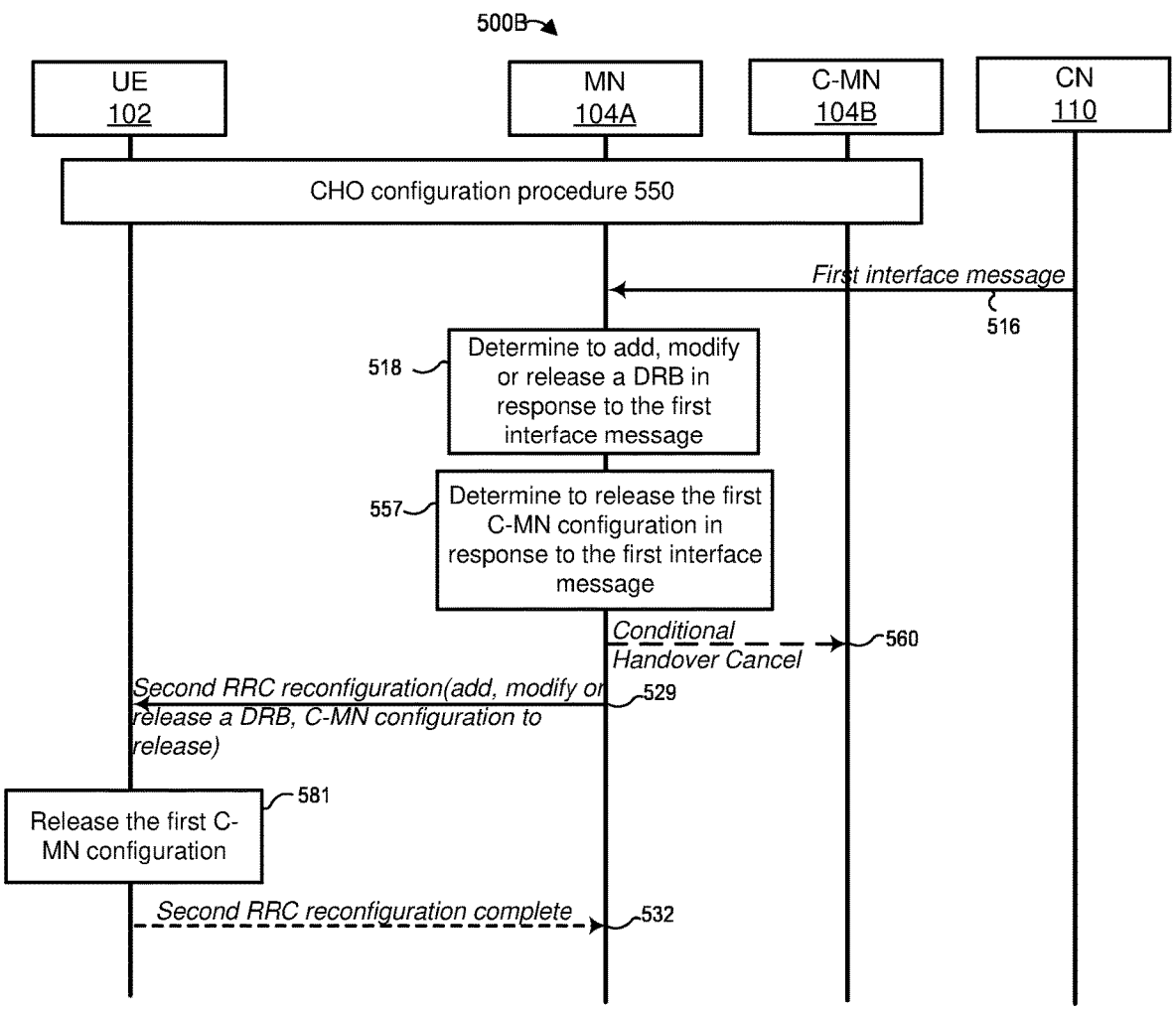
FIG. 5B is a messaging diagram of an example scenario similar to the scenario of FIG. 5A, but where a base station configures the UE to release a C-MN configuration in response to addition, modification or release of a DRB.

Now referring to FIG. 5B, a scenario 500B involves a conditional handover. In this scenario, the base station 104A operates as an MN, and the base station 104B operates as a candidate base station (C-MN) for the conditional handover. Events in this scenario similar to those discussed above are labeled with the same reference numbers. The differences between the scenarios of FIG. 5A and FIG. 5B are discussed below.

In the scenario 500B, the MN 104A determines 557 to release the first C-MN configuration in response to the first interface message or the determination 518. In response to the determination 557, the MN 104A may send 560 a Conditional Handover Cancel message to indicate the C-MN 104B to release the first C-MN configuration and generates a C-MN configuration to release field/IE which indicates the UE 102 to release the first C-MN configuration or the first conditional configuration. In some implementations, the MN 104A may send the Conditional Handover Cancel message before, during or after transmitting the second RRC reconfiguration message. In response to the determination 518, the MN 104A transmits 530 a second RRC reconfiguration message adding, modifying or releasing the DRB to the UE 102 and including the C-MN configuration to release field/IE. The UE 102 releases 581 the first C-MN configuration or the first conditional configuration in response to the C-MN configuration to release field/IE. The C-MN configuration to release field/IE may include the first configuration ID so that the UE 102 can use the C-MN configuration to release field/IE (or the first configuration ID) to identify and release the first C-MN configuration or the first conditional configuration including the first C-MN configuration.

In some implementations, the MN 104A may include the C-MN configuration to release field/IE in the radio bearer configuration, the cell group configuration or in the second RRC reconfiguration message generated by the MN 104A. In some implementation, the Conditional Handover Cancel message can be a Handover Cancel message defined in 3GPP specification 36.423 or 38.423. In one implementation the MN 104A may include a cell identity associated to the first C-MN configuration in the Handover Cancel message so that the C-MN 104B can use the cell identity to identify the first C-MN configuration based on the cell identity. For example, the cell identity can be a cell global identity (CGI) or a physical cell identity of a cell configured in the first C-MN configuration. In another implementation, the MN 104A may not include the cell identity and includes a conditional handover release indication in the Handover Cancel message. The C-MN 104B releases all of the C-MN configuration(s) (including the first C-MN configuration) configured to the UE 102 in response to the conditional handover release indication. In yet another implementation, the MN 104A neither includes the cell identity nor the conditional handover release indication. The C-MN 104B releases all of the C-MN configuration(s) (including the first C-MN configuration) configured to the UE 102 in response to the Handover Cancel message.

Figure 5C:
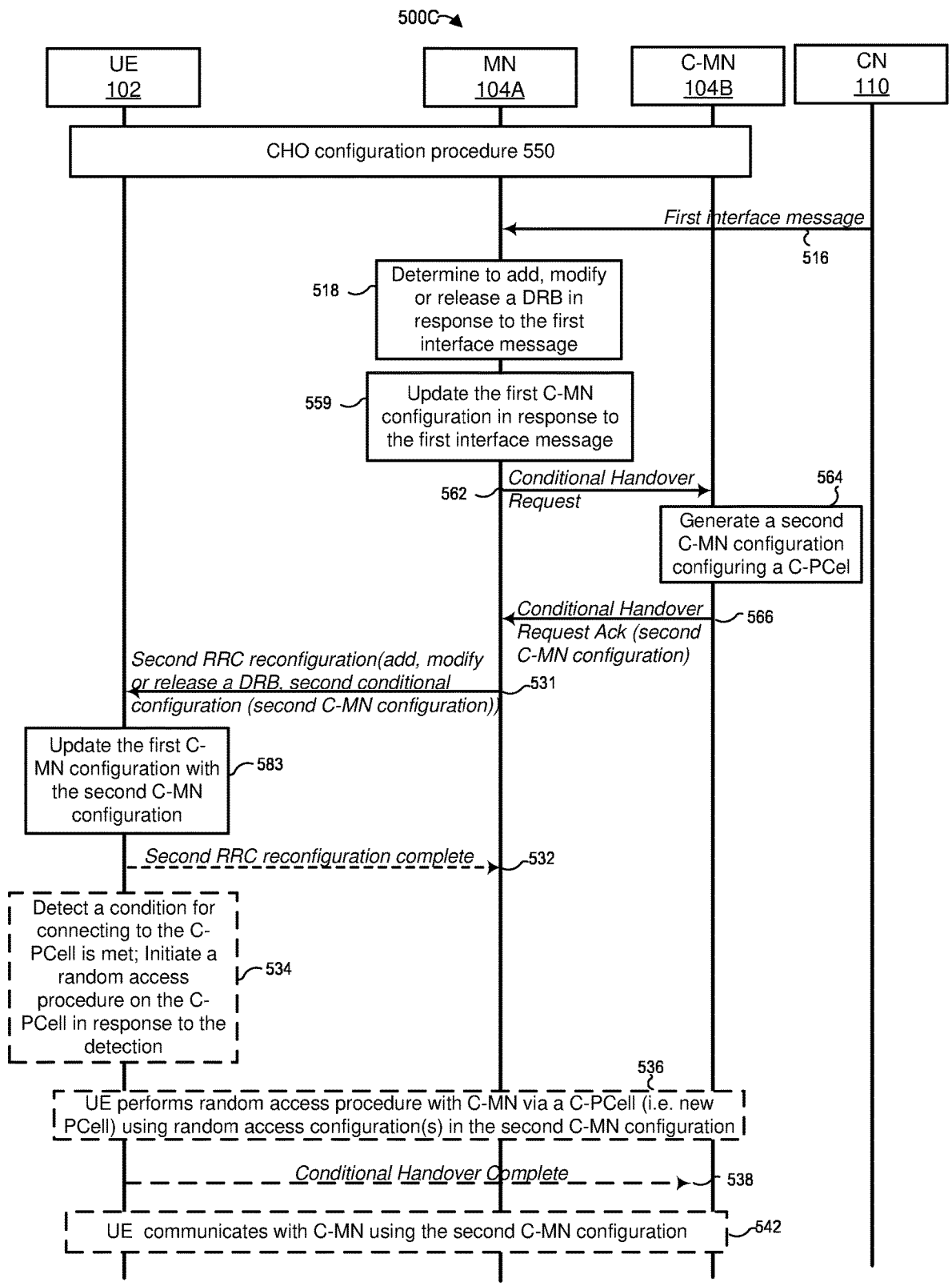
FIG. 5C is a messaging diagram of an example scenario similar to the scenario of FIG. 5A, but where a base station updates a first C-MN configuration in the UE with a second C-NN configuration in response to addition, modification or release of a DRB.

Now referring to FIG. 5C, a scenario 500C involves a conditional handover. In this scenario, the base station 104A operates as an MN, and the base station 104B operates as a candidate base station (C-MN) for the conditional handover. Events in this scenario similar to those discussed above are labeled with the same reference numbers. The differences between the scenarios of FIG. 5A-5B and FIG. 5C are discussed below.

In the scenario 500C, the MN 104A determines 559 to update the first C-MN configuration in response to the first interface message or the determination 518. In response to the determination 559, the MN 104A may send 562 a Conditional Handover Request message to the C-MN 104B. In response to the Conditional Handover Request message, the C-MN 104B generates 564 a second C-MN configuration configuring a C-PCell (e.g., the C-PCell 124B or another C-PCell). The C-MN 104B send 566 a Conditional Handover Request Acknowledge message including the second C-MN configuration to the MN 104A. After receiving the Conditional Handover Request Acknowledge message 518, the MN 104A generates a second conditional configuration field/IE including the second MN configuration and transmits 530 a second RRC reconfiguration message adding, modifying or releasing the DRB to the UE 102 and including the second conditional configuration field/IE. The UE 102 updates 583 the first C-MN configuration with the second C-MN configuration in response to the second RRC reconfiguration message. The second RRC reconfiguration message at event 531 is similar to the second RRC reconfiguration message at event 530 of the scenario, except the second RRC reconfiguration at event 531 includes the second C-MN configuration.

In some implementations, the MN 104A may assign a second configuration ID identifying the second conditional configuration or the second C-MN configuration and include the second configuration ID in the second conditional configuration.

In some implementations, the Conditional Handover Request message 562 can be a Handover Request message and the Conditional Handover Request Acknowledge message 566 can be a Handover Request Acknowledge message as defined in 3GPP specification 36.423 or 38.423. The MN 104A may include a conditional handover request indication in the Handover Request message. In some implementations, the MN 104A may include the MN configuration in the Handover Request message. In other implementations, the MN 104A may not include the MN configuration in the Handover Request message. In one implementation, the MN 104A may include the cell identity associated to the first C-MN configuration in the Handover Request message so that the C-MN 104B can use the cell identity to identify the first C-MN configuration based on the cell identity and update the first C-MN configuration with the second C-MN configuration. In another implementation, the MN 104A may include the first C-MN configuration in the Handover Request message so that the C-MN 104B can identify the first C-MN configuration and update the first C-MN configuration with the second C-MN configuration.

In some implementations, the UE 102 replaces the first C-MN configuration with the second C-MN configuration, i.e., the UE 102 releases the first C-MN configuration and stores the second C-MN configuration. In other implementations, the UE 102 replaces the first conditional configuration with the second conditional configuration, i.e., the UE 102 releases the first conditional configuration and stores the second conditional configuration. In one implementation, the MN 104A may include the C-MN configuration to release field/IE to release the first C-MN configuration in the second RRC reconfiguration message. In another implementation, the MN 104A does not include the C-MN configuration to release field/IE to release the first C-MN configuration in the second RRC reconfiguration message. In this case, the second configuration ID in the second conditional configuration has the same value as the first configuration ID in the first conditional configuration so that the UE 102 can identify the first C-MN configuration or the first conditional configuration to replace based on the second configuration ID.

At a later time, the UE 102 can detect 534 a condition (or conditions) for connecting to the C-PCell 124B is satisfied and initiate 534 a random access procedure on the C-PCell 124B in response to the detection. For convenience, this discussion may refer to the condition or a configuration in singular, but it will be understood that there may be multiple conditions, and that the conditional configuration can include one or multiple configuration parameters to specify the condition or the multiple conditions. In response to the initiation, the UE 102 can perform 536 the random access procedure with the C-MN 104B via the C-PCell 124B using a random access configuration in the second C-MN configuration. The UE 102 may disconnect from the PCell 124A of the MN 104A in response to the initiation or the detection. The UE 102 may transmit 538 a Conditional Handover Complete message via the C-PCell 124B to the C-MN 104B in/after 536 the random access procedure in response to the second C-MN configuration.

After the UE 102 successfully completes the random access procedure 536 or transmits 538 the Conditional Handover Complete message, the UE 102 can communicate 542 with the C-MN 104B via the C-PCell 124B (i.e., new PCell 124B) in accordance with the second C-MN configuration. The UE 102 may transmit 538 the Conditional Handover Complete message during or after the random access procedure.

In some implementations, the random access procedure can be a four-step random access procedure or a two-step random access procedure. In other implementations, the random access procedure can be a contention-based random access procedure or a contention-free random access procedure. In some implementations, the UE 102 may transmit the Conditional Handover Complete message in a message 3 of the four-step random access procedure or in a message A of the two-step random access procedure.

The C-MN 104B can determine the identity of the UE 102 similar to the scenarios discussed above, e.g., using the MAC PDU.

Example implementations of the second C-MN configuration can be similar to the first C-MN configuration. Example implementations of the second conditional configuration can be similar to the first conditional configuration. In some implementations, the MN 104A can include the condition or a new condition for the UE 102 to evaluate in the second conditional configuration. The UE 102 reuses the condition or uses the new condition in the second conditional configuration at event 534. In other implementations, the MN 104A does not include a condition for the UE 102 to evaluate in the second conditional configuration or the second RRC reconfiguration message so that the UE 102 reuses the condition in the first conditional configuration at event 534.

In some implementations, the C-MN 104B can include a CU 172 and one or more DUs 174 as shown in FIG. 1B. The CU 172 receives the Conditional Handover Request message from the MN 104A and sends the Conditional Handover Request Acknowledge message. The CU 172 may send a UE Context Setup Request message or a UE Context Modification Request message to the DU 174 in response to the Conditional Handover Request message. The DU 174 may generate the second C-MN configuration or part of the second C-MN configuration and send the second C-MN configuration or part of the second C-MN configuration to the CU 172 in a UE Context Setup Response message or a UE Context Modification Response message. When the DU 174 generates the part of the second C-MN configuration, the CU 172 may generate the rest of the second C-MN configuration. In one implementation, the DU 174 can perform 536 the random access procedure with the UE 102 and identify the UE 102 in the random access procedure. In response to the identification, the DU 174 communicates with the UE 102 using the second C-MN configuration or part of the second C-MN configuration. The DU 174 may send an indication (e.g., Downlink Data Delivery Status message) to the CU 172 if the DU 174 may identify the UE 102 in the random access procedure. In another implementation, the DU 174 can perform the random access procedure 536 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the rest of the second C-MN configuration and part of the second C-MN configuration respectively. The CU 172 may start to transmit DL PDUs (e.g., PDCP PDUs) to the UE 102 via the DU 174 in response to the indication (e.g., Downlink Data Delivery Status message) or the RRC reconfiguration complete message 538 received from the MN 104A.

If the C-MN 104B (or the DU 174) identifies the UE 102 on the C-PCell 124B at event 536, the C-MN 104B (i.e., becoming the MN 104B) (or the DU 174) begins to transmit downlink control information (DCI) command(s) on physical downlink control channel(s) (PDCCH(s)), reference signal(s) or data to the UE 102 via the C-PCell 124B and/or one or more C-SCells (if configured in the second C-MN configuration) according to some configuration parameters in the second C-MN configuration. If the C-MN 104B (or the DU 174) identifies the UE 102 on the C-PCell 124B at event 536, the C-MN 104B (or the DU 174) may receive signal(s)

on PUCCH(s), sounding reference signal(s) or data from the UE 102 via the C-PCell 124B and/or one or more C-SCells (if configured in the C-MN configuration) according to some configuration parameters in the second C-MN configuration. The UE 102 receives the DCI command(s) on PDCCH(s), reference signal(s) or data from the C-MN 104B (or the DU 174) via the C-PCell 124B and/or one or more C-SCells (if configured in the second C-MN configuration) according to some configuration parameters in the second C-MN configuration. The UE 102 may transmit signal(s) on PUCCH(s), sounding reference signal(s) or data to the C-MN 104B (or the DU 174) via the C-PCell 124B and one or more C-SCells (if configured in the second C-MN configuration) according to some configuration parameters in the second C-MN configuration. In response to the identification, the C-MN 104B becomes MN 104B and determines that the C-PCell 124B becomes PCell 124B and the one or more C-SCells becomes one or more SCells.

Figure 6A:
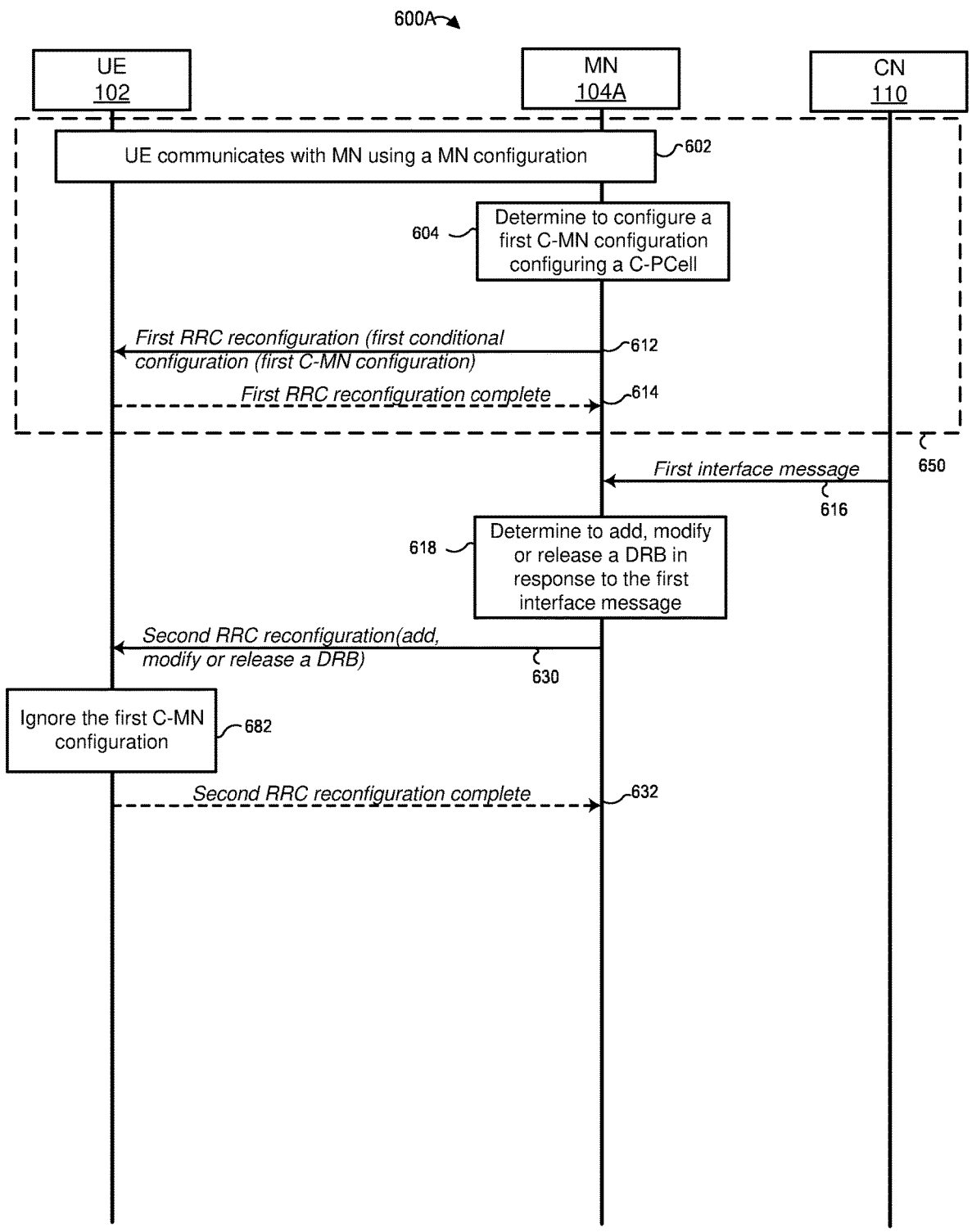
FIG. 6A is a messaging diagram of an example scenario in which the MN of FIG. 1A or 1B initiates a CHO procedure to configure a candidate primary cell (C-PCell) configuration within a C-MN, where the C-MN is the MN and the UE ignores the C-MN configuration in response to addition, modification or release of a DRB, in accordance with the techniques of this disclosure.

Now referring to FIG. 6A, a scenario 600A involves a conditional handover where the base station 104 operates as an MN which includes a cell 124A that operates as a C-PCell for the conditional handover. Events 616 and 618 are similar to events 316 and 318.

In this scenario, the UE 102 communicates 602 with the MN 104A in accordance with an MN configuration. The UE 102 may be in SC with the MN 104A or in DC with the MN 104A and SN 106A. The MN 104A determines 604 that it should request a first C-MN configuration for the UE 102. The first C-MN configuration configures a C-PCell 124A of the MN 104A. The MN 104A can make this determination based on one or more measurement results received from the UE directly (e.g., via an SRB established between the UE 102 and the MN 104A or via a physical control channel), or obtained by the MN 104A from measurements of signals, control channels or data channels received from the UE 102, for example, or another suitable event. More intelligently, the MN 104A can derive or estimate the UE 102 is moving toward coverage of the cell 124A according to uplink signals received from the UE 102 or positioning measurement result(s) received from the UE 102.

The MN 104A generates a first C-MN configuration and includes the first C-MN configuration in a first conditional configuration and transmits 612 a first RRC reconfiguration message including the first conditional configuration to the UE 102. The UE 102 may transmit 614 a first RRC reconfiguration complete message to the MN 104A in response to the first RRC reconfiguration message 612. The events 602-614 collectively can define a conditional handover procedure 650.

In this example scenario, the MN 104A can transmit the first RRC reconfiguration message including the first conditional configuration including the first C-MN configuration only or, alternatively, the first conditional configuration including (i) the first C-MN configuration and (ii) at least one trigger condition. In some implementations, the MN 104A may assign a first configuration ID for identifying the first conditional configuration or the first C-MN configuration and include the first configuration ID in the first conditional configuration. Additionally, the MN 104A can include a configuration ID in the first conditional configuration for identifying the first C-MN configuration or the first conditional configuration.

At a later time, the MN 104A receives 616 a first interface message from a CN 110 (e.g., MME 114 or AMF 164). In response to the first interface message, the MN 104A determines 618 to add, modify, or release a DRB. The MN 104A may send a second interface message to the CN 110 in response to the first interface message. In one implementation, the MN 104A determines to add a new DRB in response to the first interface message. In another implementation, the MN 104A determines to modify or release an existing DRB configured to the UE 102 in response to the first interface message. For example, the MN 104A may determine to modify the DRB by modifying or releasing radio resources for the DRB. The radio resources may include one or more RLC bearers or quality of service (QoS) mapping configurations (e.g., adding a new QoS flow and mapping the new QoS flow to the existing DRB or releasing an existing QoS flow). In one implementation, the DRB can be an MN-terminated DRB. In another implementation, the DRB can be an SN-terminated DRB which utilizes radio resources of the SN 106A. The UE 102 may release or modify the radio resources in response to the second RRC reconfiguration message. In the following description, "add, modify or release a DRB" can represent "add a new DRB" or "modify or release an existing DRB".

In response to the determination6, the MN 104A transmits 630 a second RRC reconfiguration message adding, modifying or releasing the DRB to the UE 102. The UE 102 ignores 682 the first C-MN configuration in response to adding, modifying or releasing the DRB. The UE 102 transmits 632 a second RRC reconfiguration complete message in response to the second RRC reconfiguration message. In the second RRC reconfiguration, the MN 104A does not include a C-MN configuration to release field/IE indicating to the UE 102 to release the first C-MN configuration.

The second RRC reconfiguration message can be generated by the MN 104A as described below. In some implementations, the MN 104A may generate a radio bearer configuration (e.g., RadioBearerConfig) IE which adds, modifies or releases a DRB. The MN 104A may generate the second RRC reconfiguration message and include the radio bearer configuration in the second RRC reconfiguration message.

In yet other implementations, the MN 104A may generate a cell group configuration (e.g., CellGroupConfig IE or RadioResourceConfigDedicated IE) which modifies a DRB, i.e., an existing DRB configured to the UE 102. The MN 104A includes the cell group configuration in the second RRC reconfiguration message.

The first C-MN configuration can include multiple configuration parameters for the UE 102 to communicate with the MN 104A via the C-PCell 124A. The multiple configuration parameters may configure radio resources for the UE 102 to communicate with the MN 104A via the C-PCell 124A and zero, one, or more candidate secondary cells (C-SCells) of the MN 104A. The multiple configuration parameters may configure zero, one, or more radio bearers. The one or more radio bearers can include SRB(s) and/or DRB(s). The SRB(s) may include SRB1 and/or SRB2. The MN 104A can include the condition for the UE 102 to evaluate in the first conditional configuration or the first RRC reconfiguration message.

In some implementations, the MN 104A can include a CU 172 and one or more DUs 174 as shown in FIG. 1B. The UE communicates 302 with the MN 104A via a first DU 174 operating the PCell. The CU 172 may send a UE Context Setup Request message to the DU 174 in response to the determination 604. In response to the UE Context Setup Request message, the second DU 174 may generate the first C-MN configuration or part of the first C-MN configuration and send the first C-MN configuration or part of the first C-MN configuration to the CU 172 in a UE Context Setup Response message. When the second DU 174 generates the part of the first C-MN configuration, the CU 172 may generate the rest of the first C-MN configuration. The CU 172 may send a UE Context Modification Request message to the first DU 174 if the first DU 174 also operates the C-PSCell 126A. In response to the UE Context Modification Request message, the first DU 174 may generate the first C-MN configuration or part of the first C-MN configuration and send the first C-MN configuration or part of the first C-MN configuration to the CU 172 in a UE Context Modification Response message. When the first DU 174 generates a portion of the first C-MN configuration, the CU 172 may generate the rest of the first C-MN configuration.

Figure 6B:
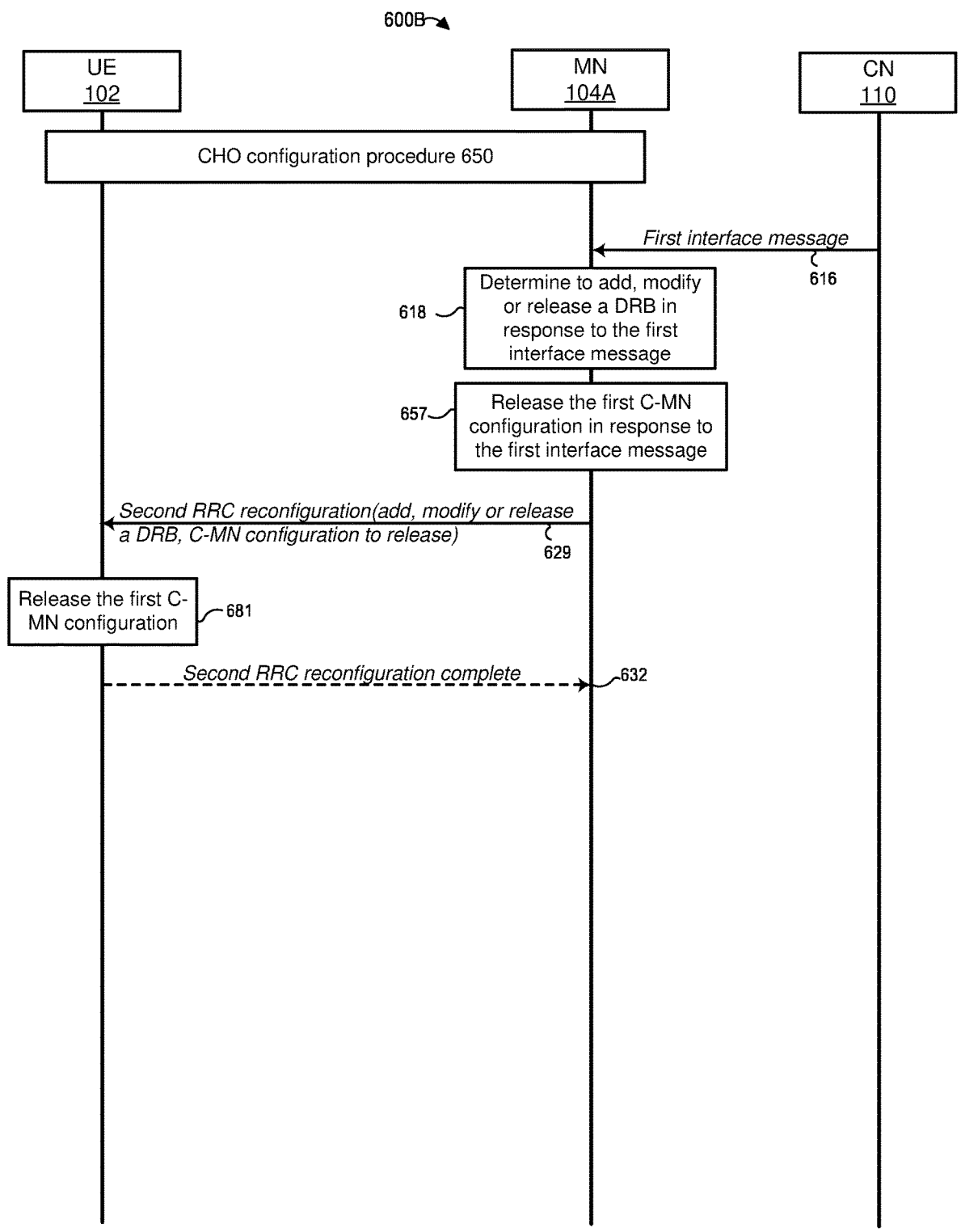
FIG. 6B is a messaging diagram of an example scenario similar to the scenario of FIG. 6A, but where a base station configures the UE to release a C-MN configuration in response to addition, modification or release of a DRB.

Now referring to FIG. 6B, a scenario 600B involves a conditional handover. In this scenario, the base station 104A operates as an MN which includes a cell 124A that operates as a C-PCell for the conditional handover. Events in this scenario similar to those discussed above are labeled with the same reference numbers. The differences between the scenarios of FIG. 6A and FIG. 6B are discussed below.

In the scenario 600B, the MN 104A determines 657 to release the first C-MN configuration in response to the first interface message or the determination 618. In response to the determination 657, the MN 104A may generate a C-MN configuration to release field/IE which indicates the UE 102 to release the first C-MN configuration or the first conditional configuration. In response to the determination 618, the MN 104A transmits 629 a second RRC reconfiguration message adding, modifying or releasing the DRB to the UE 102 and including the C-MN configuration to release field/IE. The UE 102 releases 681 the first C-MN configuration or the first conditional configuration in response to the C-MN configuration to release field/IE. The C-MN configuration to release field/IE may include the first configuration ID so that the UE 102 can use the C-MN configuration to release field/IE (or the first configuration ID) to identify and release the first C-MN configuration or the first conditional configuration including the first C-MN configuration.

In some implementations, the MN 104A may include the C-MN configuration to release field/IE in the radio bearer configuration, the cell group configuration or in the second RRC reconfiguration message generated by the MN 104A. The MN 104A may release all of the C-MN configuration(s) (including the first C-MN configuration) configured to the UE 102 in response to determining to release the first C-MN configuration.

Figure 6C:
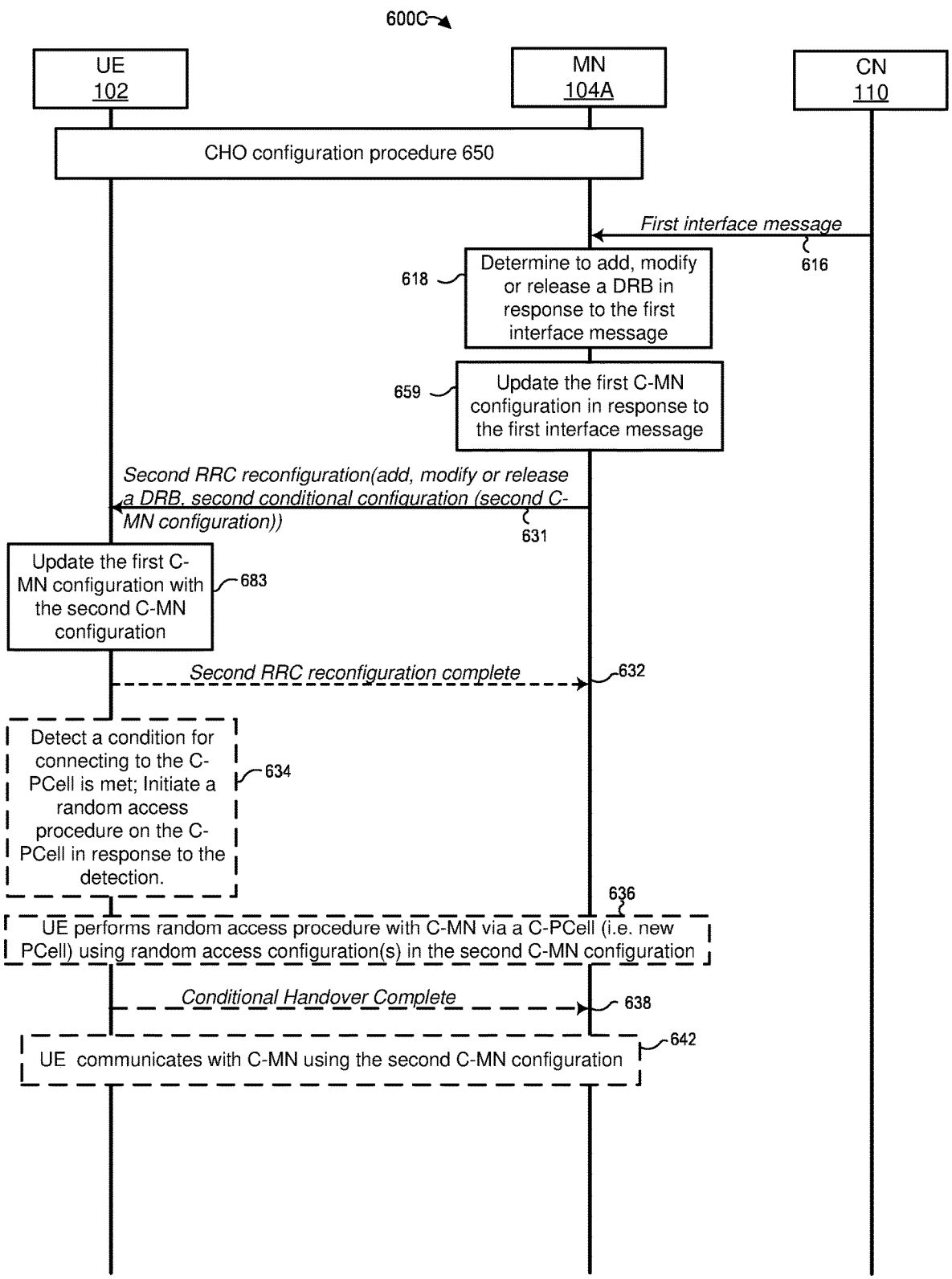
FIG. 6C is a messaging diagram of an example scenario similar to the scenario of FIG. 6A, but where a base station updates a first C-MN configuration in the UE with a second C-MN configuration in response to addition, modification or release of a DRB.

Now referring to FIG. 6C, a scenario 600C involves a conditional handover. In this scenario, the base station 104A operates as a MN which includes a cell 124A that operates as a C-PCell for the conditional handover. Events in this scenario are similar to those discussed above are labeled with the same reference numbers. The differences between the scenarios of FIG. 6A-6B and FIG. 6C are discussed below.

In the scenario 600C, the MN 104A determines 659 to update the first C-MN configuration in response to the first interface message or the determination 618. In response to the determination 559, the MN 104A may generate a second C-MN configuration configuring a C-PCell (e.g., the C-PCell 124A or another C-PCell). The MN 104A generates a second conditional configuration field/IE including the second C-MN configuration and transmits 631 a second RRC reconfiguration message adding, modifying or releasing the DRB to the UE 102 and including the second conditional configuration field/IE. The UE 102 updates 683 the first C-MN configuration with the second C-MN configuration in response to the second RRC reconfiguration message. The second RRC reconfiguration message at event 631 is similar to the second RRC reconfiguration message at event 630 of the scenario, except the second RRC reconfiguration at event 631 includes the second C-MN configuration.

In some implementations, the MN 104A may assign a second configuration ID identifying the second conditional configuration or the second C-MN configuration and include the second configuration ID in the second conditional configuration.

In some implementations, the UE 102 replaces the first C-MN configuration with the second C-MN configuration, i.e., the UE 102 releases the first C-MN configuration and stores the second C-MN configuration. In other implementations, the UE 102 replaces the first conditional configuration with the second conditional configuration, i.e., the UE 102 releases the first conditional configuration and stores the second conditional configuration. In one implementation, the MN 104A may include the C-MN configuration to release field/IE to release the first C-MN configuration in the second RRC reconfiguration message. In another implementation, the MN 104A does not include the C-MN configuration to release field/IE to release the first C-MN configuration in the second RRC reconfiguration message. In this case, the second configuration ID in the second conditional configuration has the same value as the first configuration ID in the first conditional configuration so that the UE 102 can identify the first C-MN configuration or the first conditional configuration to replace based on the second configuration ID.

At a later time, the UE 102 can detect 634 a condition (or conditions) for connecting to the C-PCell 124A is satisfied and initiate 634 a random access procedure on the C-PCell 124A in response to the detection. For convenience, this discussion may refer to the condition or a configuration in singular, but it will be understood that there may be multiple conditions, and that the conditional configuration can include one or multiple configuration parameters to specify the condition or the multiple conditions. In response to the initiation, the UE 102 can perform 636 the random access procedure with the MN 104A via the C-PCell 124A using a random access configuration in the second C-MN configuration. The UE 102 may disconnect from another PCell (i.e., an initial PCell) of the MN 104A in response to the initiation or the detection. The UE 102 may transmit 638 a Conditional Handover Complete message via the C-PCell 124A to the MN 104A in/after 636 the random access procedure in response to the second C-MN configuration.

After the UE 102 successfully completes the random access procedure 636 or transmits 538 the Conditional Handover Complete message, the UE 102 can communicate 642 with the MN 104A via the C-PCell 124A (i.e., new PCell 124A) in accordance with the second C-MN configuration. The UE 102 may transmit 638 the Conditional Handover Complete message during or after the random access procedure.

In some implementations, the random access procedure can be a four-step random access procedure or a two-step random access procedure. In other implementations, the random access procedure can be a contention-based random access procedure or a contention-free random access procedure. In some implementations, the UE 102 may transmit the Conditional Handover Complete message in a message 3 of the four-step random access procedure or in a message A of the two-step random access procedure.

The MN 104A can determine the identity of the UE 102 similar to the scenarios discussed above, e.g., using the MAC PDU.

Example implementations of the second C-MN configuration can be similar to the first C-MN configuration. Example implementations of the second conditional configuration can be similar to the first conditional configuration. In some implementations, the MN 104A can include the condition or a new condition for the UE 102 to evaluate in the second conditional configuration. The UE 102 reuses the condition or uses the new condition in the second conditional configuration at event 634. In other implementations, the MN 104A does not include a condition for the UE 102 to evaluate in the second conditional configuration or the second RRC reconfiguration message so that the UE 102 reuses the condition in the first conditional configuration at event 634.

In some implementations, the MN 104A can include a CU 172 and one or more DUs 174 as shown in FIG. 1B. The UE communicates 602 with the SN via the first DU 174 operating the PCell. The CU 172 may send a UE Context Setup Request message or a UE Context Modification Request message to the second DU 174 in response to the determination 659. The DU 174 may generate the second C-MN configuration or part of the second C-MN configuration and send the second C-MN configuration or part of the second C-MN configuration to the CU 172 in a UE Context Setup Response message or a UE Context Modification Response message. When the second DU 174 generates the part of the second C-MN configuration, the CU 172 may generate the rest of the second C-MN configuration. In one implementation, the second DU 174 can perform 636 the random access procedure with the UE 102 and identify the UE 102 in the random access procedure. In response to the identification, the second DU 174 communicates with the UE 102 using the second C-MN configuration or part of the second C-MN configuration. The second DU 174 may send an indication (e.g., Downlink Data Delivery Status message) to the CU 172 if the second DU 174 may identify the UE 102 in the random access procedure. In another implementation, the second DU 174 can perform the random access procedure 636 with the UE 102 and forward the identity of the UE 102 received in the MAC PDU in the random access procedure to the CU 172. The CU 172 identifies the UE 102 according to the identity of the UE 102. In response to the identification, the CU 172 and second DU 174 communicates with the UE 102 using the rest of the second C-MN configuration and part of the second C-MN configuration respectively. The CU 172 may start to transmit DL PDUs (e.g., PDCP PDUs) to the UE 102 via the second DU 174 in response to the indication (e.g., Downlink Data Delivery Status message) or the RRC reconfiguration complete message 638 received from the MN 104A. If the first DU 174 operates the C-PCell 124A, the second DU 174 and the first DU 174 are the same DU. Otherwise, the second DU 174 and the first DU 174 are the different DUs.

If the MN 104A (or the second DU 174) identifies the UE 102 on the C-PCell 124A (i.e., becoming the PCell 124A) at event 636, the MN 104A begins to transmit downlink control information (DCI) command(s) on physical downlink control channel(s) (PDCCH(s)), reference signal(s) or data to the UE 102 via the C-PCell 124A and/or one or more C-SCells (if configured in the second C-MN configuration) according to some configuration parameters in the second C-MN configuration. If the MN 104A (or the second DU 174) identifies the UE 102 on the C-PCell 124A at event 636, the MN 104A (or the second DU 174) may receive signal(s) on PUCCH(s), sounding reference signal(s) or data from the UE 102 via the C-PCell 124A and/or one or more C-SCells (if configured in the C-MN configuration) according to some configuration parameters in the second C-MN configuration. The UE 102 receives the DCI command(s) on PDCCH(s), reference signal(s) or data from the MN 104A (or the second DU 174) via the C-PCell 124A and/or one or more C-SCells (if configured in the second C-MN configuration) according to some configuration parameters in the second C-MN configuration. The UE 102 may transmit signal(s) on PUCCH(s), sounding reference signal(s) or data to the C-MN 104A (or the second DU 174) via the C-PCell 124A and one or more C-SCells (if configured in the second C-MN configuration) according to some configuration parameters in the second C-MN configuration. In response to the identification, the C-PCell 124A becomes PCell 124A and the one or more C-SCells becomes one or more SCells.

For further clarity, several example methods which the devices operating in the systems of FIGS. 1A and 1B can implement are discussed next with reference to FIGS. 7A-8D.

Figure 7A:
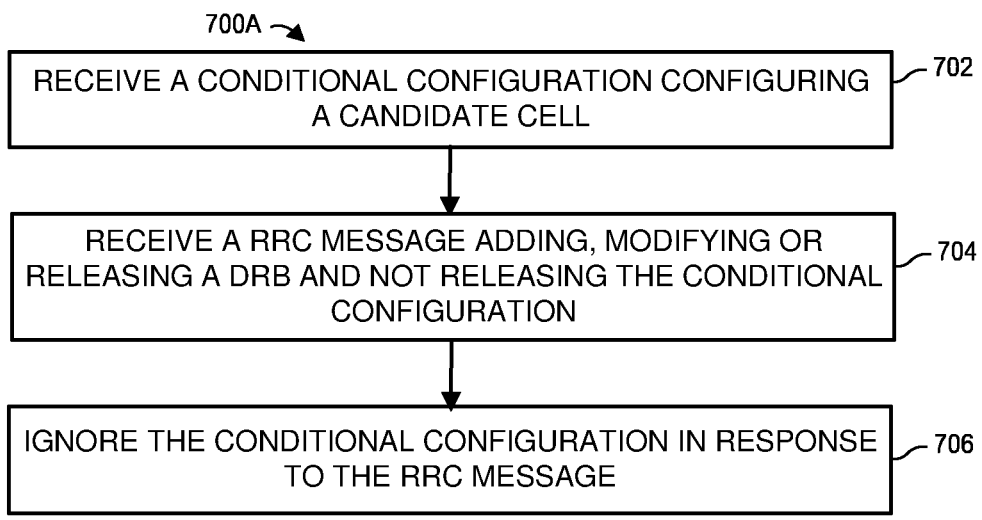
FIG. 7A is a flow diagram of an example method for managing a conditional configuration after receiving an indication that a DRB is to be added, modified, or released, which can be implemented in a UE of this disclosure.

Referring first to FIG. 7A, an example method 700A for managing a conditional configuration can be implemented in a suitable UE such as the UE 102 of FIGS. 1A and 1B, as a set of instructions stored on a computer-readable medium and executable by processing hardware (e.g., one or more processors). For convenience, the method 700A is discussed below with reference to the UE 102.

The method 700A begins at block 702, where the UE 102 receives a conditional configuration for a conditional procedure such as CPAC (event 320A or 320B of FIGS. 3A-H), CSAC (event 450 of FIGS. 4A-C), or CHO (event 550 of FIGS. 5A-C, event 650 of FIGS. 6A-C), for example. Next, at block 704, the UE 102 receives an RRC message adding, modifying, or releasing a DRB (event 356, 357, 366, 376, or 377 of FIGS. 3A-H, event 456 of FIGS. 4A-C, event 529, 530, or 531 of FIGS. 5A-C, event 629, 630, or 631 of FIGS. 6A-C). The RRC message may not include an indication to release the conditional configuration.

At block 706, the UE 102 ignores the conditional configuration in response to receiving the RRC message with an indication for the UE 102 to add, modify, or release the DRB (event 382, 383, or 385 of FIGS. 3A-H, event 481, 482, or 483 of FIGS. 4A-C, event 581, 582, or 583 of FIGS. 5A-C, event 681, 682, or 683 of FIGS. 6A-C). In particular, the UE 102 determines that it should not apply the conditional configuration for a candidate base station. In some implementations, the UE 102 releases the conditional configuration by removing the corresponding configuration parameters and the one or more conditions from the memory of the UE 102.

Figure 7B:
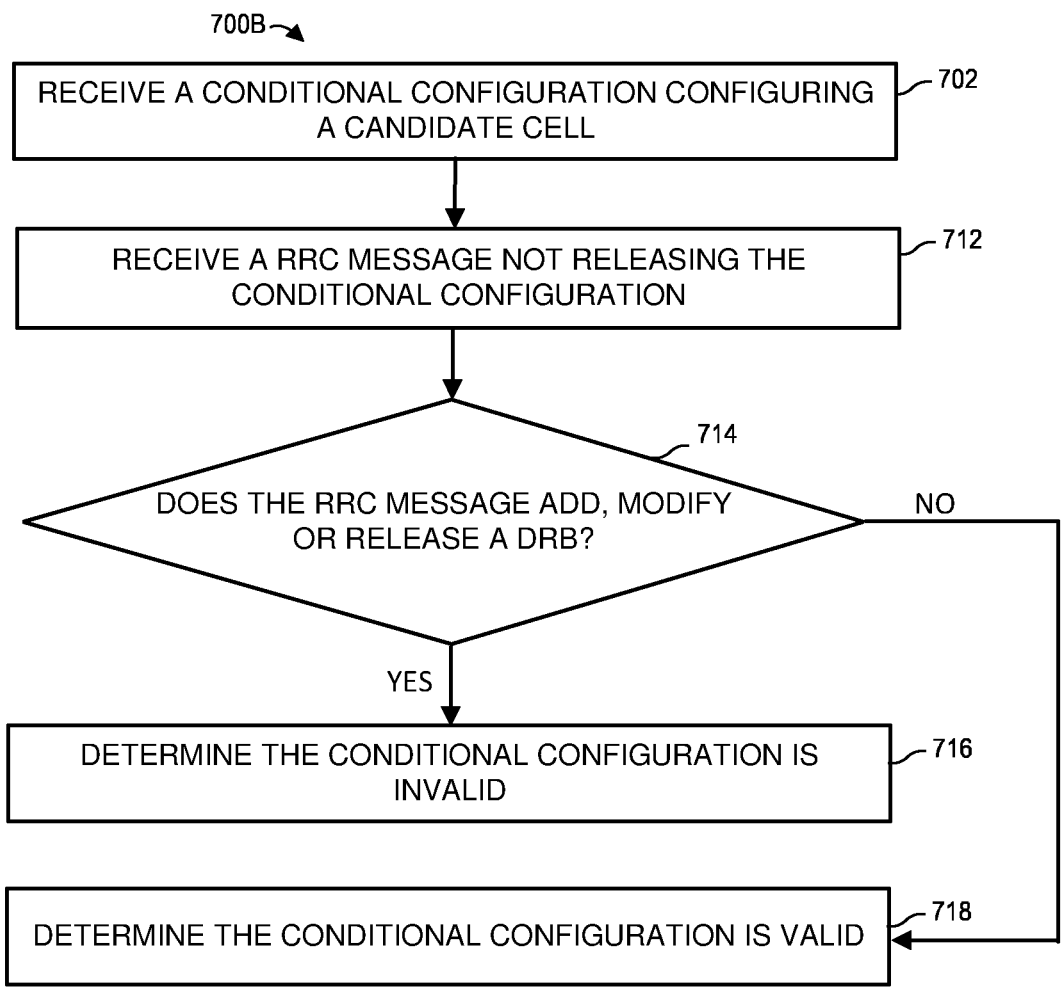
FIG. 7B is a flow diagram of another example method for managing a conditional configuration after receiving an indication that a DRB is to be added, modified, or released, which can be implemented in a UE of this disclosure.

FIG. 7B illustrates another example method 700B for managing a conditional configuration which can be implemented in a suitable UE such as the UE 102 of FIGS. 1A and 1B. As in the method 700A in FIG. 7A, the UE 102 receives a conditional configuration for a conditional procedure (block 702) such as CPAC (event 320A or 320B of FIGS. 3A-H), CSAC (event 450 of FIGS. 4A-C), or CHO (event 550 of FIGS. 5A-C, event 650 of FIGS. 6A-C), for example. The UE 102 also receives an RRC message which may not include an indication to release the conditional configuration (event 356 of FIGS. 3A-B, event 456 of FIG. 4A, event 530 of FIG. 5A, event 630 of FIG. 6A) (block 712).

At block 714, the UE 102 determines whether the RRC message includes an indication for the UE 102 to add, modify, or release a DRB. If the RRC message includes an indication for the UE 102 to add, modify, or release a DRB, the UE 102 may determine that the conditional configuration is invalid (block 716). Accordingly, the UE 102 ignores or releases the conditional configuration (event 382, 383, or 385 of FIGS. 3A-H, event 481, 482, or 483 of FIGS. 4A-C, event 581, 582, or 583 of FIGS. 5A-C, event 681, 682, or 683 of FIGS. 6A-C).

If the RRC message does not include an indication for the UE 102 to add, modify, or release a DRB, the UE 102 may determine that the conditional configuration is valid (block 718). Accordingly, the UE 102 retains the conditional configuration.

Figure 7C:
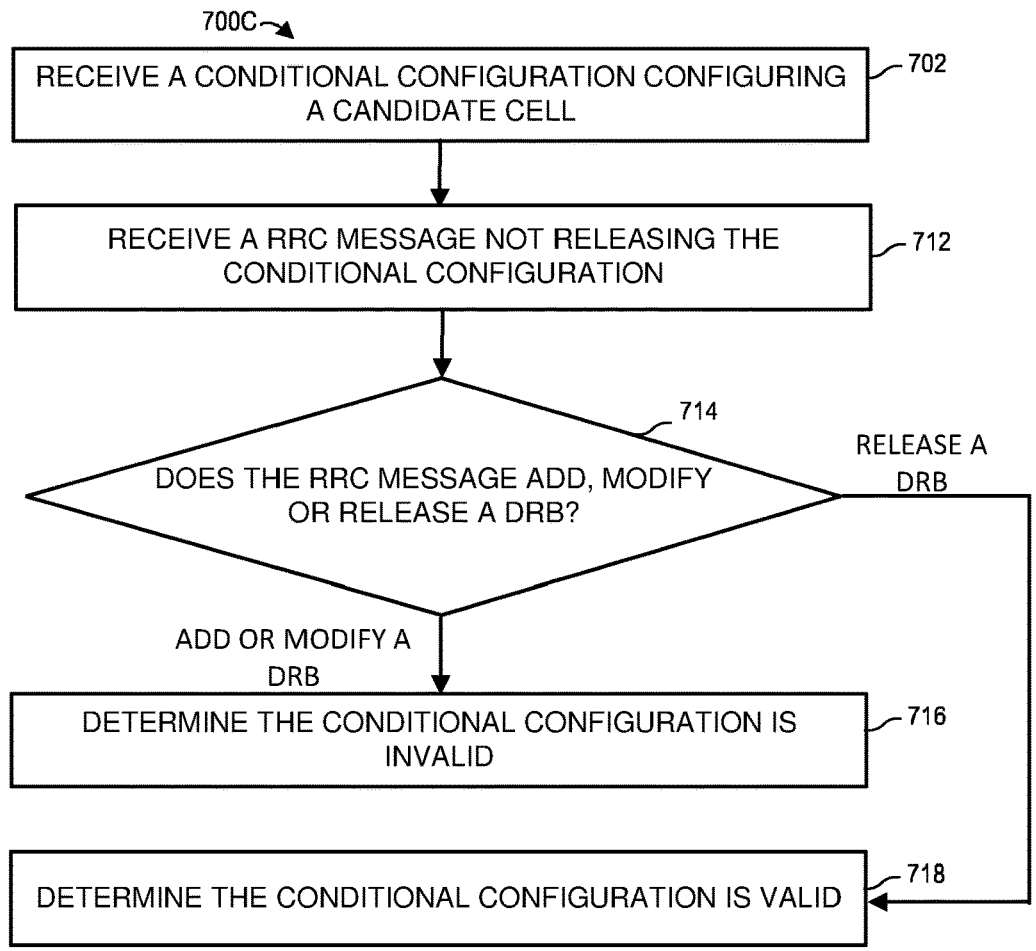
FIG. 7C is a flow diagram of yet another example method for managing a conditional configuration after receiving an indication that a DRB is to be added, modified, or released, which can be implemented in a UE of this disclosure.

FIG. 7C illustrates yet another example method 700C for managing a conditional configuration which can be implemented in a suitable UE such as the UE 102 of FIGS. 1A and 1B. As in the method 700B in FIG. 7B, the UE 102 receives a conditional configuration for a conditional procedure (block 702) such as CPAC (event 320A or 320B of FIGS. 3A-H), CSAC (event 450 of FIGS. 4A-C), or CHO (event 550 of FIGS. 5A-C, event 650 of FIGS. 6A-C), for example. Also, as in the method 700B, the UE 102 receives an RRC message which may not include an indication to release the conditional configuration (event 356 of FIGS. 3A-B, event 456 of FIG. 4A, event 530 of FIG. 5A, event 630 of FIG. 6A) (block 712), and determines whether the RRC message includes an indication for the UE 102 to add, modify, or release a DRB (block 714).

If the RRC message includes an indication for the UE 102 to add or modify a DRB, the UE 102 may determine that the conditional configuration is invalid (block 716). Accordingly, the UE 102 ignores or releases the conditional configuration (event 382, 383, or 385 of FIGS. 3A-H, event 481, 482, or 483 of FIGS. 4A-C, event 581, 582, or 583 of FIGS. 5A-C, event 681, 682, or 683 of FIGS. 6A-C).

If the RRC message includes an indication for the UE 102 to release a DRB, the UE 102 may determine that the conditional configuration is valid (block 718). Accordingly, the UE 102 retains the conditional configuration.

Figure 7D:
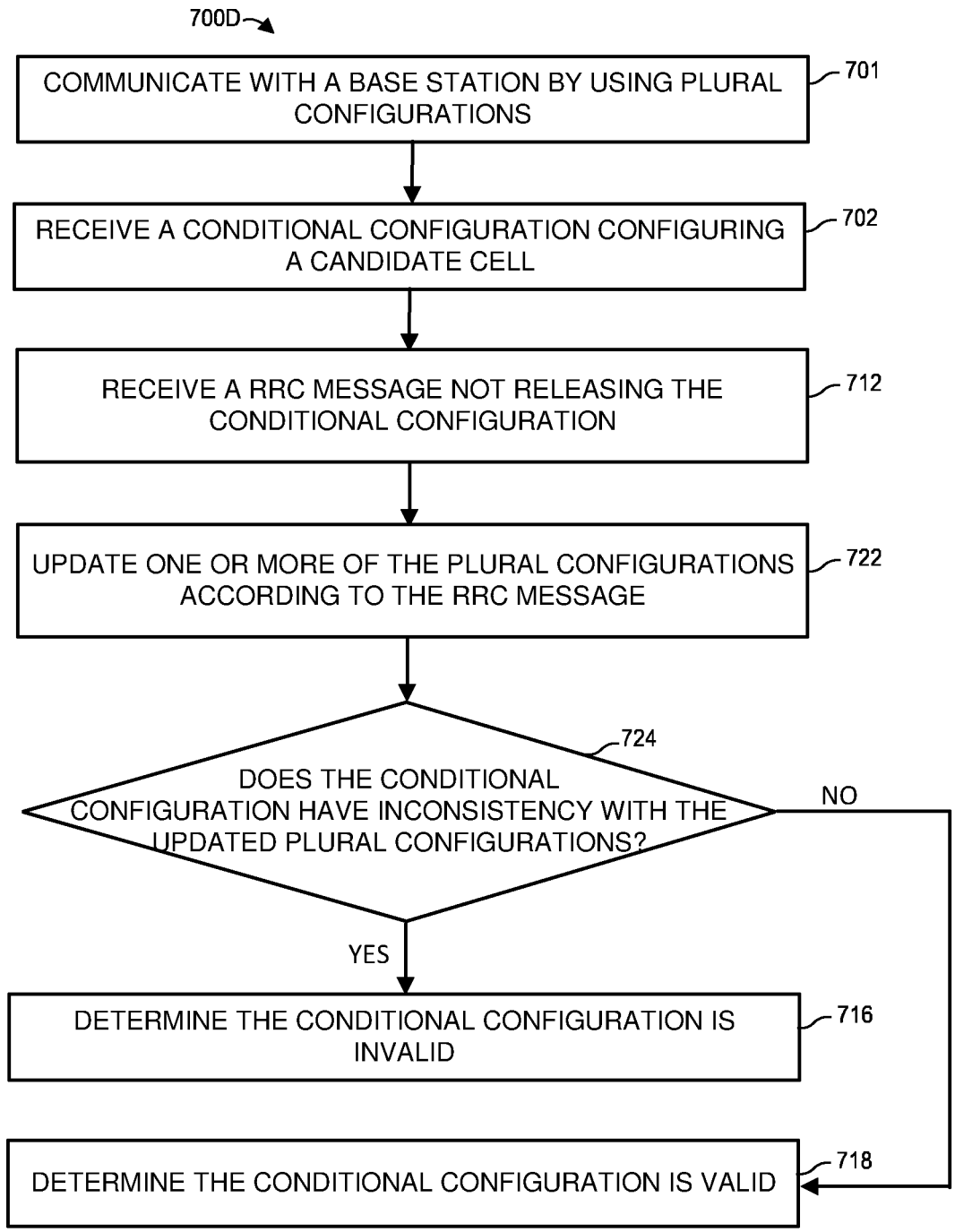
FIG. 7D is a flow diagram of an example method for managing a conditional configuration after receiving an indication that a DRB is to be added, modified, or released, and receiving a second conditional configuration as an update to the first conditional configuration, which can be implemented in a UE of this disclosure.

FIG. 7D illustrates an example method 700D for managing a conditional configuration after receiving an indication that a DRB is to be added, modified, or released, and receiving a second conditional configuration as an update to the first conditional configuration, which can be implemented in a suitable UE such as the UE 102 of FIGS. 1A and 1B, as a set of instructions stored on a computer-readable medium and executable by processing hardware (e.g., one or more processors). For convenience, the method 700D is discussed below with reference to the UE 102.

At block 701, the UE 102 communicates with a base station using several configurations, which may be conditional configurations. Then at block 702, the UE 102 receives a conditional configuration for a conditional procedure such as CPAC (event 320A or 320B of FIGS. 3A-H), CSAC (event 450 of FIGS. 4A-C), or CHO (event 550 of FIGS. 5A-C, event 650 of FIGS. 6A-C), for example. The UE 102 also receives an RRC message which may not include an indication to release the conditional configuration (event 356, 376, or 377 of FIGS. 3F-H, event 465 of FIG. 4C, event 531 of FIG. 5C, event 631 of FIG. 6C) (block 712).

The UE 102 may then update one of the configurations according to the RRC message (event 385 of FIGS. 3F-H, event 483 of FIG. 4C, event 583 of FIG. 5C, event 683 of FIG. 6C). For example, the RRC message may include a new conditional configuration (block 722). At block 724, the UE 102 may compare the new conditional configuration with the current configurations. If the new conditional configuration is consistent with one of the current configurations, the UE 102 may determine that the current configuration is valid (block 718), and may retain the current configuration. On the other hand, if the new conditional configuration is inconsistent with each of the current configurations, the UE 102 may determine that the current configurations are invalid (block 716). The UE 102 may then update one of the current configurations with the new conditional configuration by replacing the current configuration with the new conditional configuration. In some implementations, the UE 102 may determine that the new conditional configuration is consistent with one of the current configurations, when the new conditional configuration is the same as the current configuration. If the new conditional configuration includes new or modified DRBs from the current configuration, then the new conditional configuration is inconsistent with the current configuration. In other implementations, the UE 102 may determine that the new conditional configuration is consistent with one of the current configurations when the new conditional configuration is a delta configuration that augments one of the current configurations.

Figure 8A:
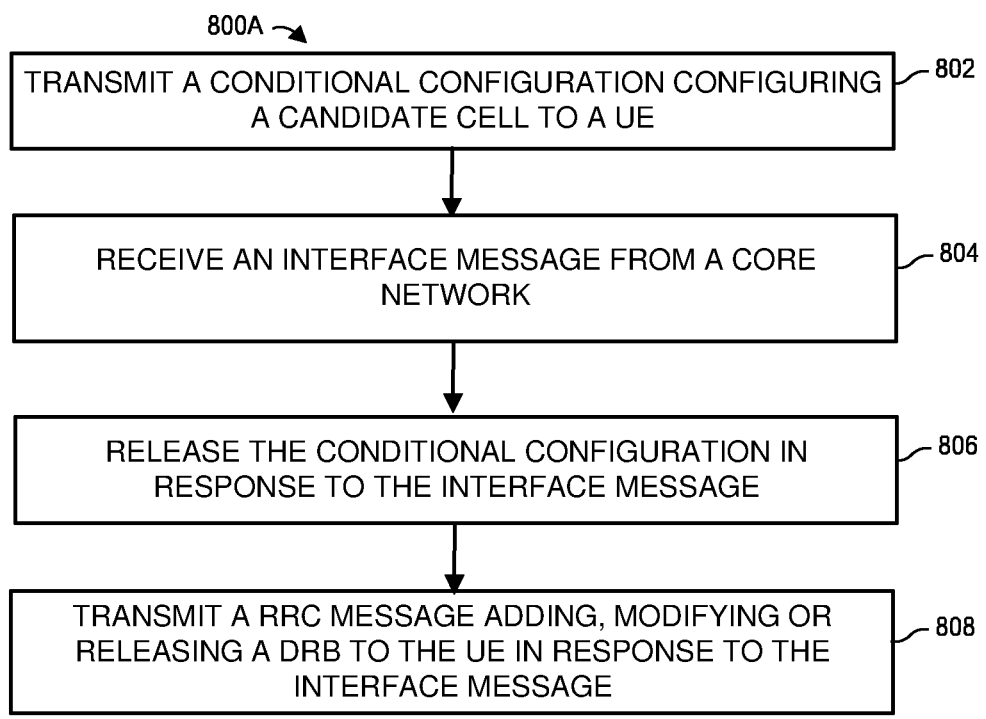
FIG. 8A is a flow diagram of an example method for managing a conditional configuration after determining that a DRB is to be added, modified, or released, which can be implemented in an MN of this disclosure.

FIG. 8A is a flow diagram of an example method 800A for managing a conditional configuration after determining that a DRB is to be added, modified, or released which can be implemented in an MN of the disclosure, as a set of instructions stored on a computer-readable medium and executable by processing hardware (e.g., one or more processors), for example. For convenience, the method 800A is discussed below with reference to the MN 104A.

The method 800A begins at block 802, where the MN 104A transmits a conditional configuration for a conditional procedure such as CPAC (event 320A or 320B of FIGS. 3A-H), CSAC (event 450 of FIGS. 4A-C), or CHO (event 550 of FIGS. 5A-C, event 650 of FIGS. 6A-C), for example. Next, at block 804, the MN 104A receives an interface message from a CN 110 (event 316 of FIGS. 3A-H, event 416 of FIGS. 4A-C, event 516 of FIGS. 5A-C, event 616 of FIGS. 6A-C). The MN 104A may determine to add, modify, or release a DRB in response to the interface message (event 318 of FIGS. 3A-H, event 418 of FIGS. 4A-C, event 518 of FIGS. 5A-C, event 618 of FIGS. 6A-C), and may determine to release the conditional configuration (event 457 of FIG. 4B, event 557 of FIG. 5B, event 657 of FIG. 6B) (block 806). Then the MN 104A may transmit an RRC message adding, modifying, or releasing a DRB (event 356, 357, 366, 376, or 377 of FIGS. 3A-H, event 456 of FIGS. 4A-C, event 529, 530, or 531 of FIGS. 5A-C, event 629, 630, or 631 of FIGS. 6A-C). The RRC message may not include an indication to release the conditional configuration.

Figure 8B:
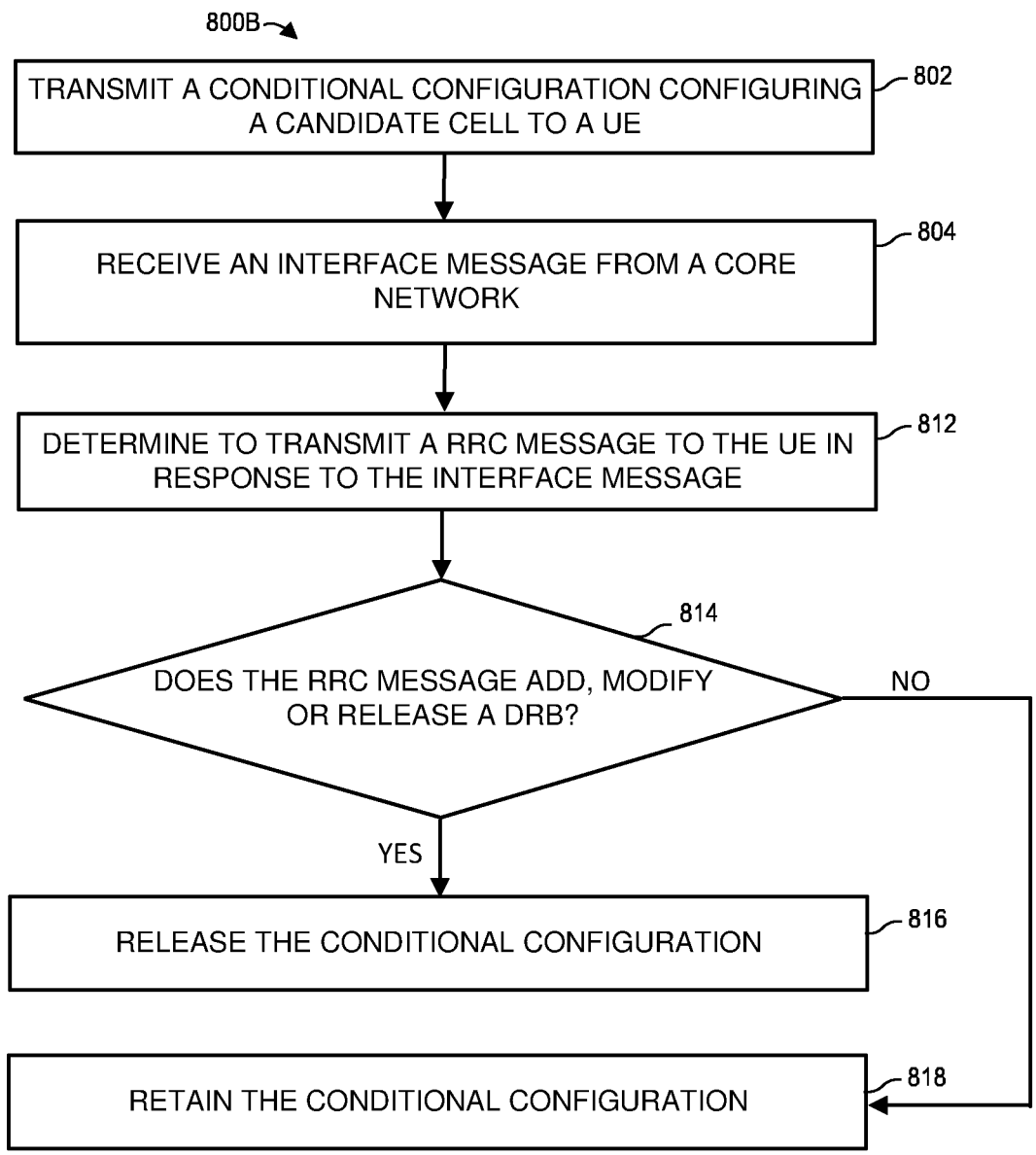
FIG. 8B is a flow diagram of another example method for managing a conditional configuration after determining that a DRB is to be added, modified, or released, which can be implemented in an MN of this disclosure.

FIG. 8B illustrates another example method 800B for managing a conditional configuration which can be implemented in a suitable MN such as the MN 104A of FIGS. 1A and 1B. As in the method 800A in FIG. 8A, the MN 104A transmits a conditional configuration for a conditional procedure (block 802) such as CPAC (event 320A or 320B of FIGS. 3A-H), CSAC (event 450 of FIGS. 4A-C), or CHO (event 550 of FIGS. 5A-C, event 650 of FIGS. 6A-C), for example. Next, at block 804, the MN 104A receives an interface message from a CN 110 (event 316 of FIGS. 3A-H, event 416 of FIGS. 4A-C, event 516 of FIGS. 5A-C, event 616 of FIGS. 6A-C). The MN 104A may transmit an RRC message to the UE 102 in response to receiving the interface message (event 356, 357, 366, 376, or 377 of FIGS. 3A-H, event 456 of FIGS. 4A-C, event 529, 530, or 531 of FIGS. 5A-C, event 629, 630, or 631 of FIGS. 6A-C) (block 812). The RRC message may include an indication for the UE 102 to add, modify, or release a DRB.

If the RRC message includes an indication for the UE 102 to add, modify, or release a DRB, the MN 104A may determine to release the conditional configuration (event 457 of FIG. 4B, event 557 of FIG. 5B, event 657 of FIG. 6B) (block 816). For example, the MN 104A may include an explicit indication that the UE 102 is to release the conditional configuration in the RRC message or in a second RRC message. Otherwise, the MN 104 may determine to retain the conditional configuration (block 818).

Figure 8C:
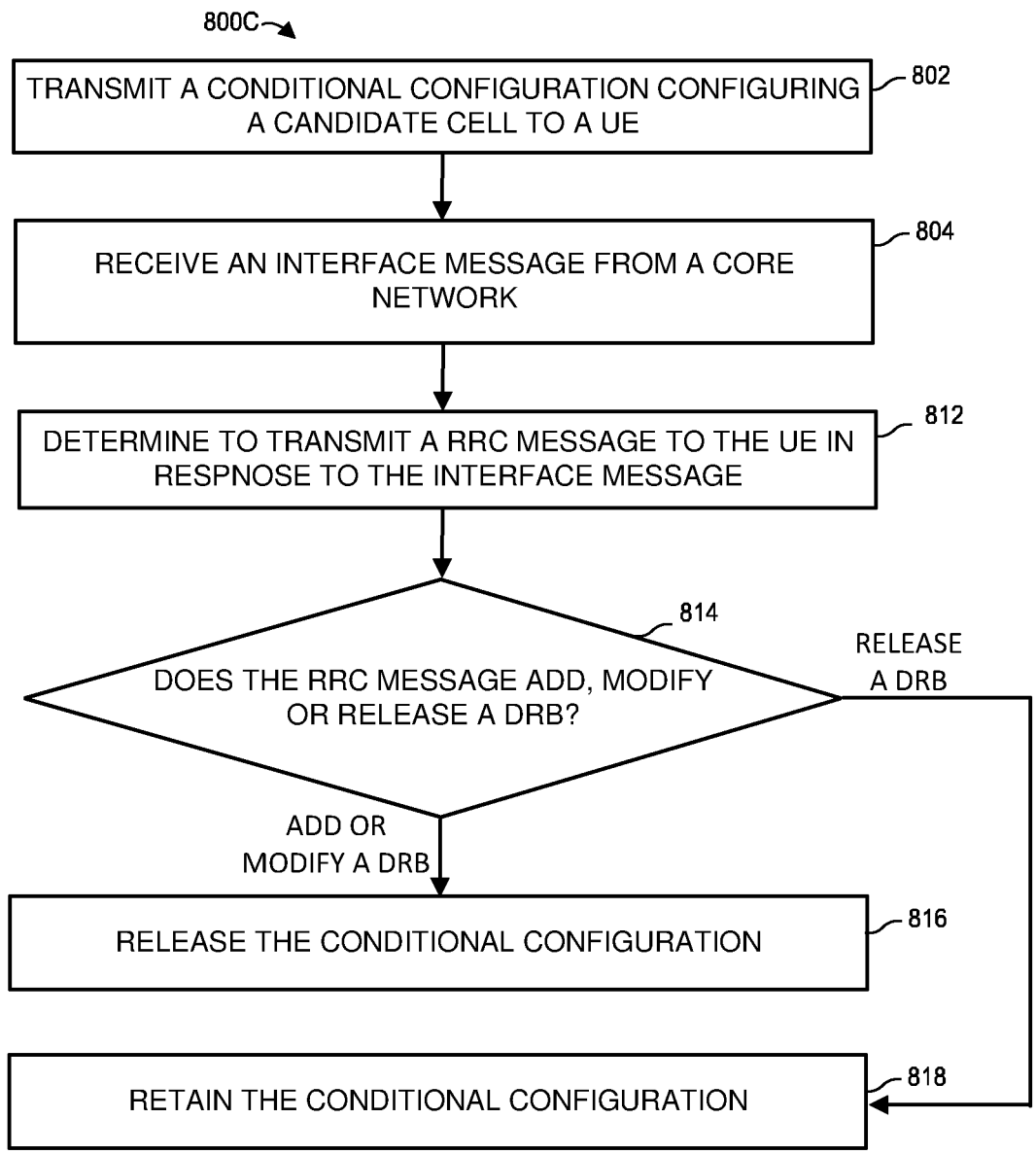
FIG. 8C is a flow diagram of yet another example method for managing a conditional configuration after determining that a DRB is to be added, modified, or released, which can be implemented in an MN of this disclosure.

FIG. 8C illustrates yet another example method 800C for managing a conditional configuration which can be implemented in a suitable MN such as the MN 104A of FIGS. 1A and 1B. As in the method 800B in FIG. 8B, the MN 104A transmits a conditional configuration for a conditional procedure (block 802) such as CPAC (event 320A or 320B of FIGS. 3A-H), CSAC (event 450 of FIGS. 4A-C), or CHO (event 550 of FIGS. 5A-C, event 650 of FIGS. 6A-C), for example. Next, at block 804, the MN 104A receives an interface message from a CN 110 (event 316 of FIGS. 3A-H, event 416 of FIGS. 4A-C, event 516 of FIGS. 5A-C, event 616 of FIGS. 6A-C). The MN 104A may transmit an RRC message to the UE 102 in response to receiving the interface message (event 356, 357, 366, 376, or 377 of FIGS. 3A-H, event 456 of FIGS. 4A-C, event 529, 530, or 531 of FIGS. 5A-C, event 629, 630, or 631 of FIGS. 6A-C) (block 812). The RRC message may include an indication for the UE 102 to add, modify, or release a DRB.

If the RRC message includes an indication for the UE 102 to add or modify a DRB, the MN 104A may determine to release the conditional configuration (event 457 of FIG. 4B, event 557 of FIG. 5B, event 657 of FIG. 6B) (block 816). For example, the MN 104A may include an explicit indication that the UE 102 is to release the conditional configuration in the RRC message or in a second RRC message. Otherwise, if the RRC message includes an indication for the UE 102 to release a DRB, the MN 104 may determine to retain the conditional configuration (block 818).

Figure 8D:
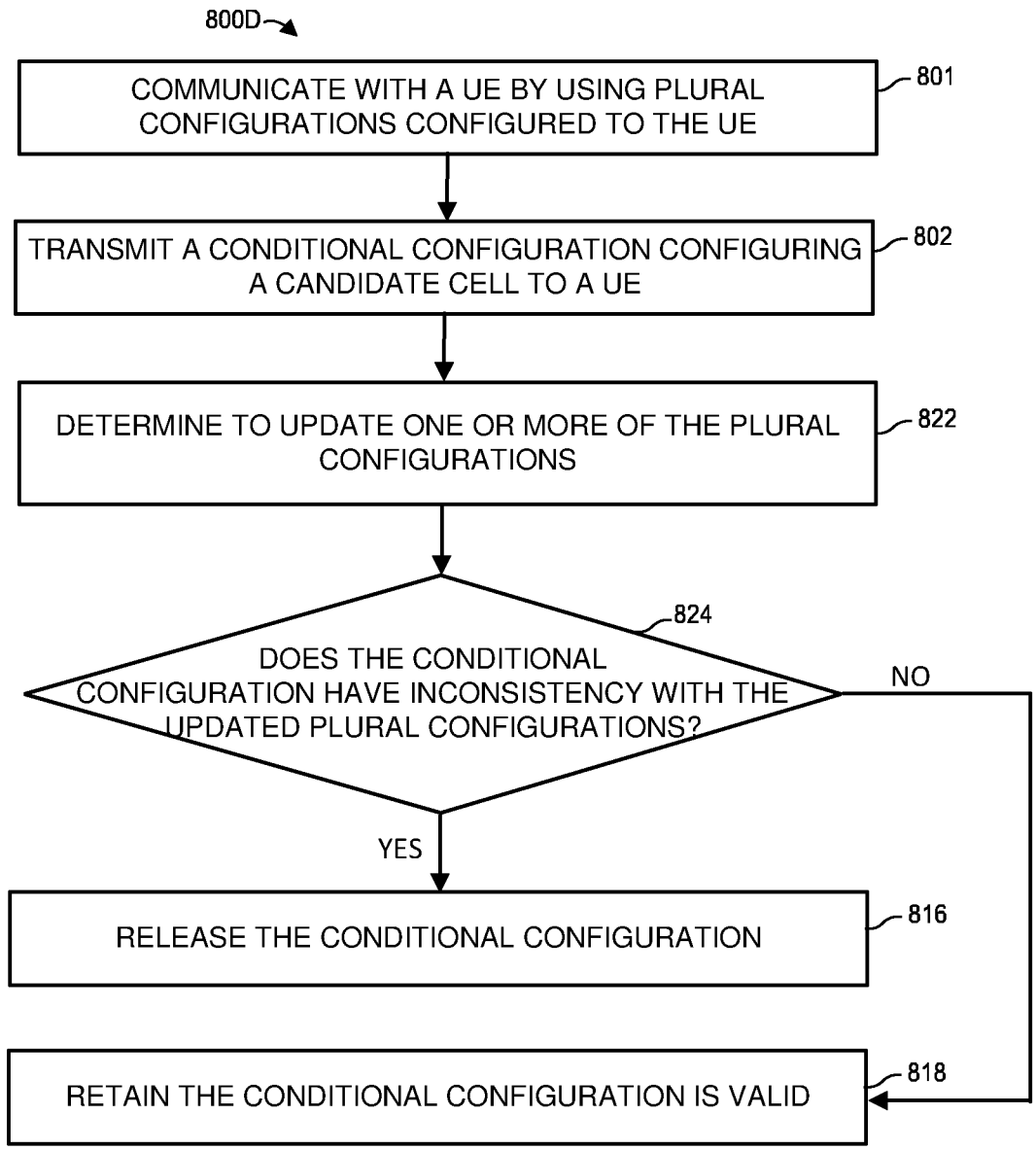
FIG. 8D is a flow diagram of another example method for managing a conditional configuration after determining that a DRB is to be added, modified, or released, and determining to update the first conditional configuration with a second conditional configuration, which can be implemented in an MN of this disclosure.

FIG. 8D illustrates an example method 800D for managing a conditional configuration after receiving an indication that a DRB is to be added, modified, or released, and receiving a second conditional configuration as an update to the first conditional configuration, which can be implemented in an MN of the disclosure, as a set of instructions stored on a computer-readable medium and executable by processing hardware (e.g., one or more processors), for example. For convenience, the method 800D is discussed below with reference to the MN 104A.

At block 801, the MN 104A communicates with a UE 102 using several configurations, which may be conditional configurations. Then at block 802, the MN 104A transmits a conditional configuration for a conditional procedure such as CPAC (event 320A or 320B of FIGS. 3A-H), CSAC (event 450 of FIGS. 4A-C), or CHO (event 550 of FIGS. 5A-C, event 650 of FIGS. 6A-C), for example.

At block 822, the MN 104A may determine to update one of the configurations according to a new conditional configuration (event 459 of FIG. 4C, event 559 of FIG. 5C, event 659 of FIG. 6C). At block 824, the MN 104A may compare the new conditional configuration with the current configurations. If the new conditional configuration is consistent with one of the current configurations, the MN 104A may determine that the current configuration is valid, and may retain the current configurations (block 818). On the other hand, if the new conditional configuration is inconsistent with each of the current configurations, the MN 104A may determine that the current configurations are invalid, and may release at least one of the current configurations (block 816). In some implementations, the MN 104A may determine that the new conditional configuration is consistent with one of the current configurations, when the new conditional configuration is the same as the current configuration. If the new conditional configuration includes new or modified DRBs from the current configuration, then the new conditional configuration is inconsistent with the current configuration. In other implementations, the MN 104A may determine that the new conditional configuration is consistent with one of the current configurations when the new conditional configuration is a delta configuration that augments one of the current configurations.

The following description may be applied to the description above.

In some implementations, "ignore" can be replaced by "discard" or "release." When the UE ignores, discards or releases a candidate base station configuration or a conditional configuration, the UE determines the candidate base station configuration or conditional configuration as invalid. If the candidate base station configuration or conditional configuration as invalid, the UE does not use the candidate base station configuration or the conditional configuration for conditional procedures or operations.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Embodiments of the techniques described in the present disclosure may include any number of the following aspects, either alone or combination:

1. A method in a user equipment (UE) for configuration management, the method comprising: receiving, by processing hardware and from a radio access network (RAN), conditional configuration information including (i) a conditional configuration related to a base station operating in the RAN, and (ii) a condition to be satisfied before the UE applies the conditional configuration; receiving, by the processing hardware and from the RAN, a message including an indication that the UE is to add, modify, or release a radio bearer (RB); and determining, by the processing hardware, to ignore the conditional configuration in response to receiving the message.

2. The method according to aspect 1, wherein receiving the message includes: receiving, by the processing hardware from the RAN, a radio connection reconfiguration message that does not include an indication that the UE is to release the conditional configuration, wherein determining to ignore the conditional configuration is in response to receiving the radio connection reconfiguration message.

3. The method according to any of the preceding aspects, further comprising: determining, by the processing hardware, whether the conditional configuration is valid in response to receiving the indication that the UE is to add, modify, or release the RB; wherein determining to ignore the conditional configuration is in response to determining that the conditional configuration is not valid.

4. The method according to any of the preceding aspects, wherein determining whether the conditional configuration is valid includes: in a first instance, determining, by the processing hardware, that the conditional configuration is not valid in response to receiving an indication that the UE is to add or modify the RB; and in a second instance, determining, by the processing hardware, that the conditional configuration is valid in response to receiving an indication that the UE is to release the RB.

5. The method according to any of the preceding aspects, wherein receiving the message includes: receiving, by the processing hardware from the RAN, a radio connection reconfiguration message including a conditional configuration release indicator instructing the UE to release the conditional configuration.

6. The method according to any of the preceding aspects, wherein: the radio connection reconfiguration message is a first radio connection reconfiguration message and the indication that the UE is to add, modify, or release the RB is included in a second radio connection reconfiguration message.

7. The method according to any of the preceding aspects, wherein the conditional configuration is a first conditional configuration, wherein receiving the message includes receiving, by the processing hardware from the RAN, a radio connection reconfiguration message including a second conditional configuration, and further comprising: updating, by the processing hardware, the first conditional configuration with the second conditional configuration.

8. The method according to any of the preceding aspects, wherein updating the first conditional configuration with the second conditional configuration includes: applying, by the processing hardware, the second conditional configuration as a delta configuration to the first conditional configuration.

9. The method according to any of the preceding aspects, wherein: the radio connection reconfiguration message is a first radio connection reconfiguration message and the indication that the UE is to add, modify, or release the RB is included in a second radio connection reconfiguration message.

10. The method according to any of the preceding aspects, wherein updating the first conditional configuration with the second conditional configuration includes: releasing, by the processing hardware, the first conditional configuration; and storing, by the processing hardware, the second conditional configuration.

11. The method according to any of the preceding aspects, wherein receiving the radio connection reconfiguration message includes receiving, by the processing hardware from the RAN, the second conditional configuration including a same identifier as an identifier for the first conditional configuration for the processing hardware to identify a conditional configuration to replace.

12. The method according to any of the preceding aspects, wherein the UE operates in multi-radio dual connectivity (MR-DC), and wherein the message is received from a base station operating as a master node (MN) to support the MR-DC at the UE.

13. The method according to any of the preceding aspects, wherein the UE operates in MR-DC, and wherein the message is received from a base station operating as a secondary node (SN) to support the MR-DC at the UE.

14. The method according to any of the preceding aspects, wherein the conditional configuration is for a candidate primary secondary cell (C-PSCell) of an SN during a conditional PSCell addition or change (CPAC) configuration procedure.

15. The method according to any of the preceding aspects, wherein the conditional configuration is for a candidate secondary node (C-SN) during a conditional SN addition or change (CSAC) configuration procedure.

16. The method according to any of the preceding aspects, wherein the UE operates in single connectivity (SC), and wherein the message is received from a base station operating as an MN.

17. The method according to any of the preceding aspects, wherein the second conditional configuration is received from the MN.

18. The method according to any of the preceding aspects, wherein the conditional configuration is for a candidate master node (C-MN) during a conditional handover (CHO) procedure.

19. The method according to any of the preceding aspects, wherein the conditional configuration is for a candidate primary cell (C-PCell) of the MN during a CHO procedure.

20. A user equipment (UE) comprising processing hardware and configured a method according to any of the preceding aspects.

21. A method in a radio access network (RAN) for configuring a user equipment (UE), the method comprising: transmitting, by the processing hardware and to the UE, (i) a conditional configuration related to a base station operating in the RAN, and (ii) a condition to be satisfied before the UE applies the conditional configuration during a conditional procedure; receiving, by the processing hardware, an interface message from a core network (CN); determining, by the processing hardware, to add, modify, or release a radio bearer (RB) in response to the interface message; and transmitting, by the processing hardware, a message including an indication that the UE is to add, modify, or release the RB.

22. The method according to aspect 21, wherein transmitting the message includes: transmitting, by the processing hardware, a radio connection reconfiguration message that does not include an indication that the UE is to release the conditional configuration.

23. The method according to either aspect 21 or aspect 22, wherein transmitting the message includes: transmitting, by the processing hardware, a radio connection reconfiguration message including a conditional configuration release indicator instructing the UE to release the conditional configuration.

24. The method according to any of aspects 21-23, further comprising: determining, by the processing hardware, whether the conditional configuration is valid in response to determining to add, modify, or release the RB; wherein transmitting the conditional configuration release indicator is in response to determining the conditional configuration is not valid.

25. The method according to any of aspects 21-24, wherein determining whether the conditional configuration is valid includes: in a first instance, determining, by the processing hardware, that the conditional configuration is not valid in response to determining to add or modify the RB; and in a second instance, determining, by the processing hardware, that the conditional configuration is valid in response to determining to release the RB.
26. The method according to any of aspects 21-25, further comprising: determining, by the processing hardware, to release the conditional configuration in response to determining that the conditional configuration is not valid.
27. The method according to any of aspects 21-26, wherein the conditional configuration is a first conditional configuration, and wherein transmitting the message includes transmitting, by the processing hardware, a radio connection reconfiguration message including a second conditional configuration.
28. The method according to any of aspects 21-27, further comprising: determining, by the processing hardware, to update the first conditional configuration with the second conditional configuration.
29. The method according to any of aspects 21-28, wherein determining to update the first conditional configuration with the second conditional configuration includes: determining, by the processing hardware, whether the second conditional configuration is consistent with the first conditional configuration; and determining, by the processing hardware, to update the first conditional configuration with the second conditional configuration is response to determining that the second conditional configuration is inconsistent with the first conditional configuration.
30. The method according to any of aspects 21-29, wherein the message is sent to the UE.
31. The method according to any of aspects 21-30, wherein the RAN operates in multi-radio dual connectivity (MR-DC), and wherein the message is from a base station operating as a master node (MN) to a base station operating as a secondary node (SN).
32. The method according to any of aspects 21-31, wherein the RAN operates in multi-radio dual connectivity (MR-DC), and wherein the conditional configuration is for a candidate primary secondary cell (C-PSCell) of an SN during a conditional PSCell addition or change (CPAC) configuration procedure.
33. The method according to any of aspects 21-32, wherein the RAN operates in multi-radio dual connectivity (MR-DC), wherein the conditional configuration is for a candidate secondary node (C-SN) during a conditional SN addition or change (CSAC) configuration procedure.
34. The method according to any of aspects 21-33, wherein the RAN operates in single connectivity (SC), and wherein the message is from a base station operating as an MN.
35. The method according to any of aspects 21-34, further including transmitting the second conditional configuration from the MN.
36. The method according to any of aspects 21-35, wherein the conditional configuration is for a candidate master node (C-MN) during a conditional handover (CHO) procedure.
37. The method according to any of aspects 21-36, wherein the conditional configuration is for a candidate primary cell (C-PCell) of the MN during a CHO procedure.
38. A base station comprising processing hardware and configured to implement a method of according to any of aspects 21-37.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:
1. A method in a user equipment (UE) for configuration management, the method comprising:
receiving, from a radio access network (RAN), a first message including conditional configuration information including (i) a first conditional configuration related to a base station operating in the RAN, and (ii) a condition to be satisfied before the UE applies the first conditional configuration;
receiving, from the RAN, a second message including either: an indication that the UE is to update the first conditional configuration based on a second conditional configuration, or an indication that the UE is to release the first conditional configuration before the condition is satisfied to apply the first conditional configuration; and
updating the first conditional configuration with the second conditional configuration or releasing the first conditional configuration in response to receiving the second message.
2. The method of claim 1, wherein the receiving the second message includes:
receiving, from the RAN, a radio connection reconfiguration message including a conditional configuration release indicator instructing the UE to release the first conditional configuration.
3. The method of claim 2, further comprising:
receiving, from the RAN, an indication that the UE is to add, modify, or release a radio bearer (RB).
4. The method of claim 3, wherein:
the radio connection reconfiguration message is a first radio connection reconfiguration message and the indication that the UE is to add, modify, or release the RB is included in a second radio connection reconfiguration message.
5. The method of claim 1, wherein receiving the second message includes receiving, from the RAN, a radio connection reconfiguration message including the second conditional configuration, wherein the receiving the radio connection reconfiguration message includes receiving, from the RAN, the second conditional configuration including a same identifier as an identifier for the first conditional configuration for the UE to identify a conditional configuration to replace.

6. The method of claim 5, wherein the updating the first conditional configuration with the second conditional configuration includes:
applying the second conditional configuration as a delta configuration to the first conditional configuration; or
releasing the first conditional configuration, and storing the second conditional configuration.

7. The method of claim 1, wherein:
the UE operates in multi-radio dual connectivity (MR-DC), and the second message is received from a base station operating as a master node (MN) to support the MR-DC at the UE; or
the UE operates in MR-DC, and the second message is received from a base station operating as a secondary node (SN) to support the MR-DC at the UE; or
the first conditional configuration is for a candidate primary secondary cell (C-PSCell) of an SN during a conditional PSCell addition or change (CPAC) configuration procedure; or
the first conditional configuration is for a candidate secondary node (C-SN) during a conditional SN addition or change (CSAC) configuration procedure.

8. The method of claim 1, wherein the UE operates in single connectivity (SC), and wherein the second message is received from a base station operating as an MN; or
wherein the second conditional configuration is received from the MN; or
wherein the first conditional configuration is for a candidate master node (C-MN) during a conditional handover (CHO) procedure or for a candidate primary cell (C-PCell) of the MN during a CHO procedure.

9. A method in a radio access network (RAN) for configuring a user equipment (UE), the method comprising:
transmitting, to the UE, a first message including (i) a first conditional configuration related to a base station operating in the RAN, and (ii) a condition to be satisfied before the UE applies the first conditional configuration during a conditional procedure; and
transmitting, to the UE, a second message including either: an indication that the UE is to update the first conditional configuration based on a second conditional configuration, or an indication that the UE is to release the first conditional configuration before the condition is satisfied to apply the first conditional configuration.

10. The method of claim 9, wherein the transmitting the second message includes:
transmitting, to the UE, a radio connection reconfiguration message including a conditional configuration release indicator instructing the UE to release the first conditional configuration.

11. The method of claim 9, wherein the transmitting the second message includes transmitting a radio connection reconfiguration message including the second conditional configuration.

12. The method of claim 11, wherein the updating the first conditional configuration with the second conditional configuration includes:
determining whether the second conditional configuration is consistent with the first conditional configuration; and updating the first conditional configuration with the second conditional configuration in response to determining that the second conditional configuration is inconsistent with the first conditional configuration.

13. The method of claim 9, wherein:
the RAN operates in multi-radio dual connectivity (MR-DC), and the second message is from a base station operating as a master node (MN) to a base station operating as a secondary node (SN); or
the RAN operates in multi-radio dual connectivity (MR-DC), and the first conditional configuration is for a candidate primary secondary cell (C-PSCell) of an SN during a conditional PSCell addition or change (CPAC) configuration procedure; or
the first conditional configuration is for a candidate secondary node (C-SN) during a conditional SN addition or change (CSAC) configuration procedure.

14. The method of claim 9, wherein the RAN operates in single connectivity (SC), and wherein the second message is from a base station operating as an MN; and further including transmitting the second conditional configuration from the MN; or
wherein the first conditional configuration is for a candidate master node (C-MN) during a conditional handover (CHO) procedure or for a candidate primary cell (C-PCell) of the MN during a CHO procedure.

15. The method of claim 9, further comprising:
adding, modifying, or releasing a radio bearer (RB); and
transmitting, to the UE, an indication that the UE is to add, modify, or release the RB.

16. A base station comprising processing hardware and configured to:
transmit, to a user equipment (UE), a first message including (i) a first conditional configuration related to the base station operating in a radio access network (RAN), and (ii) a condition to be satisfied before the UE applies the first conditional configuration during a conditional procedure; and
transmit, to the UE, a second message including either: an indication that the UE is to update the first conditional configuration based on a second conditional configuration, or an indication that the UE is to release the first conditional configuration before the condition is satisfied to apply the first conditional configuration.

17. The base station of claim 16, wherein the second message includes a radio connection reconfiguration message including a conditional configuration release indicator instructing the UE to release the first conditional configuration.

18. The base station of claim 16, wherein the second message includes a radio connection reconfiguration message including the second conditional configuration.

19. The base station of claim 18, wherein to update the first conditional configuration with the second conditional configuration, the base station is configured to:
determine whether the second conditional configuration is consistent with the first conditional configuration; and
update the first conditional configuration with the second conditional configuration in response to determining that the second conditional configuration is inconsistent with the first conditional configuration.

20. The base station of claim 16, wherein:
the RAN operates in multi-radio dual connectivity (MR-DC), and the second message is from the base station operating as a master node (MN) to a base station operating as a secondary node (SN); or the RAN operates in multi-radio dual connectivity (MR-DC), and the first conditional configuration is for a candidate primary secondary cell (C-PSCell) of an SN during a conditional PSCell addition or change (CPAC) configuration procedure; or the first conditional configuration is for a candidate secondary node (C-SN) during a conditional SN addition or change (CSAC) configuration procedure.

21. The base station of claim 16, wherein the RAN operates in single connectivity (SC), and wherein the second message is from the base station operating as an MN.

* * * * *